(12) United States Patent
Stewart

(10) Patent No.: US 8,669,330 B2
(45) Date of Patent: Mar. 11, 2014

(54) OLEFIN TRIBLOCK POLYMERS VIA RING-OPENING METATHESIS POLYMERIZATION

(75) Inventor: Ian C. Stewart, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 474 days.

(21) Appl. No.: 13/072,432

(22) Filed: Mar. 25, 2011

(65) Prior Publication Data

US 2012/0245294 A1  Sep. 27, 2012

(51) Int. Cl.
    C08F 255/00    (2006.01)
    C08F 293/00    (2006.01)
    C08F 4/80      (2006.01)
    C08G 61/08     (2006.01)
    C08F 8/04      (2006.01)

(52) U.S. Cl.
    USPC .......... 525/245; 525/289; 525/290; 525/297; 525/338; 525/915

(58) Field of Classification Search
    USPC ................. 525/245, 289, 290, 297, 338, 915
    See application file for complete search history.

(56) References Cited

U.S. PATENT DOCUMENTS

| | | | |
|---|---|---|---|
| 3,022,305 A | 2/1962 | Carboni | |
| 3,235,484 A | 2/1966 | Colfer | |
| 4,069,023 A | 1/1978 | Brois et al. | |
| 4,110,377 A | 8/1978 | Clerici et al. | |
| 4,197,398 A | 4/1980 | Floyd et al. | |
| 4,619,756 A | 10/1986 | Dickakian | |
| 4,814,540 A | 3/1989 | Watanabe et al. | |
| 4,973,414 A | 11/1990 | Nerger et al. | |
| 4,988,764 A | 1/1991 | Nishio et al. | |
| 5,026,948 A | 6/1991 | Forbus | |
| 5,049,535 A | 9/1991 | Resconi et al. | |
| 5,211,834 A | 5/1993 | Forester | |
| 5,229,022 A | 7/1993 | Song et al. | |
| 5,252,677 A | 10/1993 | Tomita et al. | |
| 5,266,186 A | 11/1993 | Kaplan | |
| 5,382,634 A | 1/1995 | Koyama et al. | |
| 5,439,607 A | 8/1995 | Patil | |
| 5,444,125 A | 8/1995 | Tomita et al. | |
| 5,498,809 A | 3/1996 | Emert et al. | |
| 5,504,172 A | 4/1996 | Imuta et al. | |
| 5,705,577 A | 1/1998 | Rossi et al. | |
| 5,741,946 A | 4/1998 | Wei | |
| 5,744,541 A | 4/1998 | Sawaguchi et al. | |
| 5,750,815 A | 5/1998 | Grubbs et al. | |
| 5,756,428 A | 5/1998 | Emert et al. | |
| 5,811,379 A | 9/1998 | Rossi et al. | |
| 5,859,159 A | 1/1999 | Rossi et al. | |
| 5,936,041 A | 8/1999 | Diana et al. | |
| 6,017,859 A | 1/2000 | Rossi et al. | |
| 6,114,445 A | 9/2000 | Tzoganakis et al. | |
| 6,117,962 A | 9/2000 | Weng et al. | |
| 6,143,686 A | 11/2000 | Vizzini et al. | |
| 6,197,910 B1 | 3/2001 | Weng et al. | |
| 6,225,432 B1 | 5/2001 | Weng et al. | |
| 6,255,426 B1 | 7/2001 | Lue et al. | |
| 6,268,518 B1 | 7/2001 | Resconi et al. | |
| 6,410,666 B1 | 6/2002 | Grubbs et al. | |
| 6,444,773 B1 | 9/2002 | Markel | |
| 6,448,350 B1 | 9/2002 | Dall'Occo et al. | |
| 6,476,167 B2 | 11/2002 | Peters | |
| 6,525,157 B2 | 2/2003 | Cozewith et al. | |
| 6,703,457 B2 | 3/2004 | Van Baar et al. | |
| 6,750,307 B2 | 6/2004 | Weng et al. | |
| 6,897,261 B1 | 5/2005 | Machida et al. | |
| 6,939,930 B2 | 9/2005 | Reinking et al. | |
| 7,126,031 B2 | 10/2006 | Boussie et al. | |
| 7,247,385 B1 | 7/2007 | Tzoganakis et al. | |
| 7,276,567 B2 | 10/2007 | Voskoboynikov et al. | |
| 7,294,681 B2 | 11/2007 | Jiang et al. | |
| 2,261,292 A1 | 12/2007 | Jiang et al. | |
| 7,524,910 B2 | 4/2009 | Jiang et al. | |
| 7,541,413 B2 | 6/2009 | Crowther et al. | |
| 7,589,160 B2 | 9/2009 | Resconi et al. | |
| 7,790,810 B2 | 9/2010 | Coates et al. | |
| 7,820,607 B2 | 10/2010 | Matsuda et al. | |
| 7,897,679 B2 | 3/2011 | Stevens et al. | |

(Continued)

FOREIGN PATENT DOCUMENTS

| | | |
|---|---|---|
| CN | 101011062 | 8/2007 |
| EP | 0 767 182 | 4/1997 |

(Continued)

OTHER PUBLICATIONS

Amin et al., "*Versatile Pathways for In Situ Polyolefin Functionalization with Heteroatoms: Catalytic Chain Transfer*", Angewandte Chemie International Edition, 2008, vol. 47, pp. 2006-2025.

Ayinla et al., "Chiral Tantalum and Zironium Biphenyl Amidate Complexes: New Catalysts for the Assymetric Synthesis of Amines", Abstracts of Papers, 238th ACS National Meeting, Washington DC, United States, Aug. 16-20, 2009, INOR-252.

Babu et al., "*Microstructure of Poly(1-hexene) Produced by ansa-Zirconocenium Catalysis*", Macromolecules, 1994, vol. 27, pp. 3383-3388.

Baldwin et al., "*Cationic Alkylaluminum-Complexed Zirconocene Hydrides as Participants in Olefin Polymerization Catalysis*", JACS, 2010, vol. 132, pp. 13969-13971.

Bhriain et al., "*Polymeryl-Exchange Between Ansa-Zirconocene Catalysts for Norbornene-Ethene Copolymerization and Aluminum or Zinc Alkyls*", Macromolecules, 2005, vol. 38, pp. 2056-2063.

(Continued)

Primary Examiner — Fred M Teskin

(74) Attorney, Agent, or Firm — Catherine L. Bell

(57) ABSTRACT

This invention relates to a composition comprising a multi-block polyolefin represented by the formula:

$$PO\text{-}(\text{—}C\text{=}C\text{—}Z\text{—})_n\text{—}C\text{=}C\text{-}PO^* \quad (I)$$

or $$PO\text{-}(\text{—}C\text{—}C\text{—}Z\text{—})_n\text{—}C\text{—}C\text{-}PO^* \quad (Ia)$$

wherein Z is the portion of a cyclic monomer having at least one internal double bond that remains after a ring-opening metathesis reaction; PO and PO* are each independently polyolefins; and n is 1 to 10,000; and a process to produce such comprising contacting an alkene metathesis catalyst with a dimer of vinyl terminated polyolefins, and a cyclic hydrocarbyl monomer comprising at least one internal double bond.

36 Claims, No Drawings

(56) References Cited

U.S. PATENT DOCUMENTS

| | | | |
|---|---|---|---|
| 7,943,716 B2 | 5/2011 | Resconi et al. | |
| 7,960,487 B2 | 6/2011 | Yang et al. | |
| 8,058,351 B2 | 11/2011 | Pawlow et al. | |
| 2002/0137978 A1 | 9/2002 | Grubbs et al. | |
| 2003/0161752 A1 | 8/2003 | Luk et al. | |
| 2004/0054086 A1 | 3/2004 | Schauder et al. | |
| 2004/0127649 A1 | 7/2004 | Arjunan | |
| 2004/0214953 A1 | 10/2004 | Yamada et al. | |
| 2004/0249046 A1 | 12/2004 | Abhari et al. | |
| 2005/0054793 A1 | 3/2005 | Reinking et al. | |
| 2005/0159299 A1 | 7/2005 | Rodriguez et al. | |
| 2005/0176906 A1* | 8/2005 | Maughon et al. | 526/264 |
| 2005/0261440 A1 | 11/2005 | Dickakian et al. | |
| 2006/0052553 A1 | 3/2006 | Resconi et al. | |
| 2006/0270814 A1 | 11/2006 | Makio et al. | |
| 2008/0228017 A1 | 9/2008 | Burdett et al. | |
| 2008/0234451 A1 | 9/2008 | Kenwright et al. | |
| 2009/0198089 A1 | 8/2009 | Burton et al. | |
| 2009/0221750 A1 | 9/2009 | Tsunogae et al. | |
| 2009/0247441 A1 | 10/2009 | Baum | |
| 2009/0318640 A1 | 12/2009 | Brant et al. | |
| 2009/0318644 A1 | 12/2009 | Brant et al. | |
| 2009/0318646 A1 | 12/2009 | Brant et al. | |
| 2009/0318647 A1 | 12/2009 | Hagadorn et al. | |
| 2010/0069573 A1 | 3/2010 | Arriola et al. | |
| 2010/0152388 A1 | 6/2010 | Jiang et al. | |
| 2010/0170829 A1 | 7/2010 | Ng et al. | |

FOREIGN PATENT DOCUMENTS

| | | |
|---|---|---|
| EP | 0 802 216 | 10/1997 |
| EP | 0 958 309 | 11/1999 |
| EP | 1 361 232 | 11/2003 |
| EP | 1 849 757 | 10/2007 |
| EP | 1 862 491 | 12/2007 |
| GB | 1 310 847 | 3/1973 |
| JP | 02-064115 | 3/1990 |
| JP | 1993/320260 | 3/1993 |
| JP | 2000/038420 | 2/2000 |
| JP | 2005/139284 | 6/2005 |
| JP | 2005-336092 | 12/2005 |
| JP | 2007/169340 | 7/2007 |
| JP | 2007/246433 | 9/2007 |
| JP | 2008/050278 | 3/2008 |
| JP | 2009-299046 | 12/2009 |
| JP | 2010/037555 | 2/2010 |
| JP | 2010-202628 | 9/2010 |
| JP | 2011/026448 | 2/2011 |
| JP | 2012/051859 | 3/2012 |
| JP | 2012/052062 | 3/2012 |
| WO | WO 95/27717 | 10/1995 |
| WO | WO 97/47665 | 12/1997 |
| WO | WO 99/05182 | 2/1999 |
| WO | WO 99/46270 | 9/1999 |
| WO | WO 00/00576 | 1/2000 |
| WO | WO 00/55218 | 9/2000 |
| WO | WO 03/040095 | 5/2003 |
| WO | WO 03/040233 | 5/2003 |
| WO | WO 03/040442 | 5/2003 |
| WO | WO 2004/031250 | 4/2004 |
| WO | WO 2004/046214 | 6/2004 |
| WO | WO 2005/090425 | 9/2005 |
| WO | WO 2005/090426 | 9/2005 |
| WO | WO 2005/090427 | 9/2005 |
| WO | WO 2005/092935 | 10/2005 |
| WO | WO 2006/127483 | 11/2006 |
| WO | WO 2007/003238 | 1/2007 |
| WO | WO 2008/027268 | 3/2008 |
| WO | WO 2008/080081 | 7/2008 |
| WO | WO 2008/141941 | 11/2008 |
| WO | WO 2009/009158 | 1/2009 |
| WO | WO 2009/155517 | 12/2009 |
| WO | WO 2010/037059 | 4/2010 |

OTHER PUBLICATIONS

Bielawski et al., "Synthesis of ABA Triblock Copolymers Via a Tandem Ring-Opening Metathesis Polymerization: Atom Transfer Radical Polymerization Approach", Macromolecules, 2000, vol. 33, pp. 678-680.

Brant et al., "Effect of Tacticity on the Dilute Solution Coil Dimensions of Poly(a-olefin)s", Macromolecules, 2005, vol. 38, pp. 7178-7183.

Cherian et al., "Synthesis of Allyl-Terminated Syndiotactic Polypropylene: Macromonomers for the Synthesis of Branched Polyolefins", Macromolecules, 2005, vol. 38, pp. 6259-6268.

Chung, "Synthesis of Functional Polyolefin Copolymers with Graft and Block Structures", Progress in Polymer Science, 2002, vol. 27, pp. 39-85.

Clerici et al., "Catalytic C-Alkylation of Secondary Amines With Alkenes", Synthesis, 1980, vol. 4, pp. 305-306.

Corey et al., "Reactions of Hydrosilanes and Olefins in the Presence of $Cp_2MCl_2/nBuLi$", Organometallics, 1992, vol. 11, pp. 672-683.

Crowther et al., "Group 4 Metal Dicarbollide Chemistry. Synthesis, Structure, and Reactivity of Electrophilie Alkyl Complexes $(Cp^*)(C2B9H_{11})M(R)$ (M = Hf, Zr)", JACS, 1991, vol. 113, pp. 1455-1457.

Eisenberger et al., "Tantalum-amidate Complexes for the Hydroaminoalkylation of Secondary Amines: Enhanced Substrate Scope and Enantioselective Chiral Amine Synthesis", Angewandte Chemie International Edition, 2009, vol. 48, pp. 8361-8365.

Eshuis et al., "Catalytic Olefin Oligomerization and Polymerization with Cationic Group IV Metal Complexes $[Cp^*_2Mme(THT)]^+[BPh_4]^-$, M=Ti, Zr and Hf", Journal of Molecular Catalysis, 1990, vol. 62, pp. 277-287.

Frauenrath et al., "Polymerization of 1-Hexene Catalyzed by Bis(Cyclopentadienyl)Zirconium Dichloride/Methylaluminoxane; Effect of Temperature on the Molecular Weight and the Microstructure of Poly(1-Hexene)", Macromol. Rapid Commun., 1998, vol. 19, pp. 391-395.

Furuyama et al., "New High-Performance Catalysts Developed at Mitsui Chemicals for Polyolefins and Organic Synthesis", Catalysis Surveys from Asia, 2004, vol. 8, No. 1, pp. 61-71.

Galeotti et al., "Self-Functionalizing Polymer Film Surfaces Assisted by Specific Polystyrene End-Tagging" ,Chem. Mater., 2010, vol. 22, pp. 2764-2769.

Harney et al., "End-Group-Confined Chain Walking Within A Group 4 Living Polyolefin and Well-Defined Cationic Zirconium Alkyl Complexes for Modeling This Behavior", JACS, 2004, vol. 126, pp. 4536-4537.

Herzon et al., "Direct, Catalytic Hydroaminoalkylation of Unactivated Olefins with N-Alkyl Arylamines", JACS, 2007, vol. 129, pp. 6690-6691.

Herzon et al., "Hydroaminoalkylation of Unactivated Olefins with Dialkylamines", JACS, 2007, vol. 130, pp. 14940-14941.

Janiak et al., "Analyses of Propene and 1-Hexene Oligomers from Zirconium/MAO Catalysts—Mechanistic Implications by NMR, SEC, and MALDI-TOF MS", Macromol. Chem. Phys., 2002, vol. 203, pp. 129-138.

Janiak et al., "Metallocene Catalysts for Olefin Oligomerization", Macromol. Symp., 2006, vol. 236, pp. 14-22.

Janiak et al., "Metallocene and Related Catalysts for Olefin, Alkyne and Silane Dimerization and Oligomerization", Coordination Chemistry Reviews, 2006, vol. 250, pp. 66-94.

Jiang et al., "Highly Z-Selective Metathesis Homocoupling of Terminal Olefins", JACS, 2009, vol. 131, pp. 16630-16631.

Jones et al., "Synthesis and Reactive Blending of Amine and Anhydride End-Functional Polyolefins", Polymer, 2004, vol. 45, pp. 4189-4201.

Kaneyoshi et al., "Synthesis of Block and Graft Copolymers with Linear Polyethylene Segments by Combination of Degenerative Transfer Coordination Polymerization and Atom Transfer Radical Polymerization", Macromolecules, 2005, vol. 38, pp. 5425-5435.

Kesti et al., "Group 4 Metallocene Olefin Hydrosilyation Catalysts", Organometallics, 1992, vol. 11, pp. 1095-1103.

Kissin et al., "Post-Oligomerization of a-Olefin Oligomers: A Route to Single-Component and Multicomponent Synthetic Lubricating Oils", Journal of Applied Polymer Science, 2009, vol. 111, pp. 273-280.

(56) References Cited

OTHER PUBLICATIONS

Kobayashi, "*Routes to Functionalized Polyolefins*", The Dow Chemical Company, (1 page).

Kolodka et al., "*Copolymerization of Propylene with Poly(Ethylene-Co-Propylene) Macromonomer and Branch Chain-Length Dependence of Rheological Properties*", Macromolecules, 2002, vol. 35, pp. 10062-10070.

Kolodka et al., "*Synthesis and Characterization of Long-Chain-Branched Polyolefins with Metallocene Catalysts: Copolymerization of Ethylene with Poly(Ethylene-Co-Propylene) Macromonomer*", Macromol. Rapid Commun., 2003, vol. 24, pp. 311-315.

Koo et al., "*Efficient New Routes to Functionalized Polyolefins*", ChemTech. 1999, pp. 13-19.

Kostalik et al., "*Solvent Processable Tetraalkylammonium-Functionalized Polyethylene for Use as an Alkaline Anion Exchange Membrane*", Macromolecules, 2010, vol. 43, pp. 7147-7150.

Kubiak et al., "*Titanium-Catalyzed Hydroaminoalkylation of Alkenes by C-H Bond Activation at SP3 Centers in the Alpha-Position to a Nitrogen Atom*", Angewandte Chemie International Edition, 2009, vol. 48, No. 6, pp. 1153-1156.

Langston et al., "*One-Pot Synthesis of Long Chain Branch PP (LCBPP) Using Ziegler-Natta Catalyst and Branching Reagents*", Macromol. Symp., 2007, vol. 260, pp. 34-41.

Lehmus et al., "*Chain End Isomerization as a Side Reaction in Metallocene-Catalyzed Ethylene and Propylene Polymerizations*", Macromolecules, 2000, vol. 33, pp. 8534-8540.

Lopez et al., "*Synthesis of Well-Defined Polymer Architectures by Successive Catalytic Olefin Polymerization and Living/Controlled Polymerization Reactions*", Progress In Polymer Science, 2007, vol. 32, pp. 419-454.

Lu et al., "*Reactivity of Common Functional Groups with Urethanes: Models for Reactive Compatibilization of Thermoplastic Polyurethane Blends*", Journal of Polymer Science: Part A: Polymer Chemistry, 2002, vol. 40, pp. 2310-2328.

Markel et al., "*Metallocene-Based-Branch—Block Thermoplastic Elastomers*", Macromolecules, 2000, vol. 33, pp. 8541-8548.

Mathers et al., "*Cross Metathesis Functionalization of Polyolefins*", Chem. Commun., 2004, pp. 422-423.

Moscardi et al., "*Propene Polymerization with the Isospecific, Highly Regioselective rac-Me$_2$ C(3-t-Bu-1-Ind)$_2$ZrCl$_2$/MAO Catalyst. 2. Combined DFT/MM Analysis of Chain Propagation and Chain Release Reactions*", Organometallics, 2001, vol. 20, pp. 1918-1931.

Negishi et al., "*Reaction of Zirconocene Dichloride with Alkyllithiums or Alkyl Grignard Reagents as a Convenient Method for Generating a "Zirconocene" Equivalent and its Use in Zirconium-Promoted Cyclization of Alkenes, Alkynes, Dienes, Enynes, and Diynes*[1]", Tetrahedron Letters, 1986, vol. 27, No. 25, pp. 2829-2832.

Nilsson et al., "*Structural Effects on Thermal Properties and Morphology in XLPE*", European Polymer Journal, 2010, vol. 46, pp. 1759-1769.

Ornealis et al., "*Cross Olefin Metathesis for the Selective Functionalization, Ferrocenylation, and Solubilization in Water of Olefin-Terminated Dendrimers, Polymers, and Gold Nanoparticles and for a Divergent Dendrimer Construction*", JACS, 2008, vol. 130, pp. 1495-1506.

Ornealis et al., "*Efficient Mono- and Bifunctionalization of Polyolefin Dendrimers by Olefin Metathesis*", Angewandte Chemie International Edition, 2005, vol. 44, pp. 7399-7404.

Parks et al., "*Studies on the Mechanism of B(C$_6$F$_5$)$_3$-Catalyzed Hydrosilation of Carbonyl Functions*", J. Org. Chem., 2000, vol. 65, pp. 3090-3098.

Prochnow et al., "*Tetrabenzyltitanium: An Improved Catalyst for the Activation of SP3 C-H Bonds Adjacent to Nitrogen Atoms*", ChemCatChem, 2009, vol. 1, No. 1, pp. 162-172.

Resconi et al., "*Chain Transfer Reactions in Propylene Polymerization with Zirconocene Catalysts*", Topics in Catalysis, 1999, vol. 7, pp. 145-163.

Resconi et al., "*Olefin Polymerization at Bis(pentamethylcyclopentadienyl)zirconium and -hafnium Centers: Chain-Transfer Mechanisms*", JACS, 1992, vol. 114, pp. 1025-1032.

Reznichenko et al., "*Group 5 Metal Binaptholate Complexes for Catalytic Asymmetric Hydroaminoalkylation and Hydroamination/Cyclization*", Organometallics, 2011, vol. 30, pp. 921-924.

Roesky, "*Catalytic Hydroaminoalkylation*", Angewandte Chemie International Edition, 2009, vol. 48, pp. 4892-4894.

Rose et al., "*Poly(Ethylene-Co-Propylene Macromonomer)s: Synthesis and Evidence for Starlike Conformations in Dilute Solution*", Macromolecules, 2008, vol. 41, pp. 559-567.

Rossi et al., "*End Groups in 1-Butene Polymerization Via Methylaluminoxane and Zirconocene Catalyst*", Macromolecules, 1995, vol. 28, pp. 1739-1749.

Rulhoff et al., "*Synthesis and Characterization of Defined Branched Poly(propylene)s with Different Microstructures by Copolymerization of Propylene and Linear Ethylene Oligomers ($C_n$=26-28) with Metallocenes/MAO Catalysts*", Macromolecules, 2006, vol. 16, pp. 1450-1460.

Scherman et al., "*Synthesis and Characterization of Stereoregular Ethylene-Vinyl Alcohol Copolymers Made by Ring-Opening Metathesis Polymerization*", Macromolecules, 2005, vol. 38, pp. 9009-9014.

Seayed et al., "Hydroaminomethylation of Olefins Using a Rhodium Carbene Catalyst", Tetrahedron Letters, 2003, vol. 44, No. 8, pp. 1679-1683.

Segawa et al., "*Catalytic Hydroaminoalkylation of Alkene*", Yuki Gosei Kagaku Kyokaishi, 2009, vol. 67, No. 8, pp. 834-844. (Abstract only).

Shiono et al., "*Additive Effects of Trialkylaluminum on Propene Polymerization with (t-BuNSiMe$_2$Flu)TiMe$_2$-Based Catalysts*", Applied Catalysis A: General, 2000, vol. 200, pp. 145-152.

Shiono et al., "*Copolymerization of Atactic Polypropene Macromonomer with Propene by an Isospecific Metallocene Catalyst*", Macromolecules, 1999, vol. 32, pp. 5723-5727.

Sill et al., "*Bis-Dendritic Polyethylene Prepared by Ring-Opening Metathesis Polymerization in the Presence of Bis-Dendritic Chain Transfer Agents*", Journal of Polymer Science: Part A: Polymer Chemistry, 2005, vol. 43, pp. 5429-5439.

Small et al., "*Polymerization of Propylene by a New Generation of Iron Catalysts: Mechanisms of Chain Initiation, Propagation, and Termination*", Macromolecules, 1999, vol. 32, pp. 2120-2130.

Stadler et al., "*Long-Chain Branches in Syndiotactic Polypropene Induced by Vinyl Chloride*", Macromolecular Chemistry and Physics, 2010, vol. 211, pp. 1472-1481.

Sun et al., "*Effect of Short Chain Branching on the Coil Dimensions of Polyolefins in Dilute Solution*", Macromolecules, 2001, vol. 34, pp. 6812-6820.

Sunderhaus et al., "*Oxidation of Carbon-Silicon Bonds: The Dramatic Advantage of Strained Siletanes*", Organic Letters, 2003, vol. 5, No. 24, pp. 4571-4573.

Switek et al., "*ABA Triblock Copolymers with a Ring-Opening Metathesis Polymerization/Macromolecular Chain-Transfer Agent Approach*", Journal of Polymer Science: Part A: Polymer Chemistry, 2007, vol. 45, pp. 361-373.

Thomas et al., "*Synthesis of Telechelic Polyisoprene via Ring-Opening Metathesis Polymerization in the Presence of Chain Transfer Agent*", Macromolecules, 2010, vol. 43, pp. 3705-3709.

Wei et al., "*Aufbaureaktion Redux: Scalable Production of Precision Hydrocarbons from AIR$_3$ (R=Et or iBu) by Dialkyl Zinc Mediated Ternary Living Coordinative Chain-Transfer Polymerization*", Angewandte Chemie Inernational Edition, 2010, vol. 49, pp. 1768-1772.

Weng et al., "*Long Chain Branched Isotactic Polypropylene*", Macromolecules, 2002, vol. 35, pp. 3838-3843.

Weng et al., "*Synthesis of Vinly-Terminated Isotactic Poly(Propylene)*", Macromol. Rapid Commun., 2000, vol. 21, pp. 1103-1107.

Yang et al., "*Catatonic Metallocene Polymerization Catalysts, Synthesis and Properties of the First Base-Free Zirconocene Hydride*", Angewandte Chemie International Edition Engl., 1992, vol. 31, pp. 1375-1377.

(56) References Cited

OTHER PUBLICATIONS

Yin et al., "Scope and Mechanism of Allylic C-H Amination of Terminal Alkenes by the Palladium/PhL(OPiv)$_2$ Catalyst System: Insights into the Effect of Naphthoquinone", JACS, 2010, vol. 132, pp. 11978-11987.

Zhang et al., "Functionalization of Polyolefins Through Catalytic Hydrosilylation and Imidation Reactions", ANTEC, 2005, pp. 2686-2690.

Balboni et al., C$_2$-Symmetric Zirconocenes for High Molecular Weight Amorphous Poly(propylene), Macromolecular Chemistry and Physics, 2001, vol. 202, No. 10, pp. 2010-2028.

Brzezinska et al., "Synthesis of ABA Triblock Copolymers via Acyclic Diene Metathesis Polymerization and Living Polymerization of a-Amino Acid-N-Carboxyanhydrides", Macromolecules, 2001, vol. 34, pp. 4348-4354.

Bujadoux et al., Use of Bridged and Non-bridged Metallocene Catalysts in High Pressure/High Temperature Ethylene/α-olefin Copolymerization, Metallocene Polymers, 1995, pp. 377-402.

Koo et al., "Silicon-Modified Ziegler-Natta Polymerization. Catalytic Approaches to Silyl-Capped and Silyl-Linked Polyolefins Using "Single-Site" Cationic Ziegler-Natta Catalysts", JACS, 1999, vol. 121, pp. 8791-8802.

Passaglia et al., "Grafting of Diethyl Maleate and Maleic Anhydride Onto Styrene-b-(Ethylene-co-1-Butene)-b-Styrene Triblock Copolymer (SEBS)", Polymer, 2000, vol. 41, pp. 4389-4400.

Quirk et al., "Anionic Synthesis of Secondary Amine Functionalized Polymers by Reaction of Polymeric Organolithiums with N-Benzylidenemethylamine", Macromolecular Chemistry and Physics, 2002, vol. 203, pp. 1178-1187.

Rybak et al., "Acyclic Diene Metathesis with a Monomer with a Monomer from Renewable Resources: Control of Molecular Weight and One-Step Preparation of Block Copolymers", ChemSusChem, 2008, vol. 1, pp. 542-547.

Britovsek et al., Novel Olefin Polymerization Catalysts Based on Iron and Cobalt, Chemical Communications, 1998, No. 7, pp. 849-850.

Britovsek et al., Iron and Cobalt Ethylene Polymerization Catalysts Bearing 2,6-Bis(Imino)Pyridyl Ligands: Synthesis, Structures, and Polymerization Studies, Journal of the American Chemical Society, 1999, vol. 121, No. 38, pp. 8728-8740.

Chen et al., Preparation of Epoxy-modified Polyethylene by Graft Extrusion and its Applications to Polyphenylene Sulfide Alloys as a Compatibilizer, Reactive & Functional Polymers, 2008, vol. 68, No. 9, pp. 1307-1313.

Cossy et al., "Cross-Metathesis reaction. Generation of Highly Functionalized Olefins from Unsaturated Alcohols", Journal of Organometallic Chemistry, 2001, vol. 634, Issue 2, pp. 216-221.

Hansell et al., Additive-Free Clicking for Polymer Functionalization and Coupling by Tetrazine-Norbornene Chemistry, Journal of the American Chemical Society, 2011, vol. 133, No. 35, pp. 13828-13831.

Liu et al., Kinetics of Initiation, Propagation, and Termination for the [rac-(C2H4(1-indenyl)2)ZrMe]{MeB(C6F5)3}-Catalyzed Polymerization of 1-Hexene, Journal of the American Chemical Society, 2001, vol. 123, pp. 11193-11207.

Nagai et al., Novel Well-defined Funcationalized Polyolefins and Polyolefin-polar Polymer Block Copolymers: Formations and Their Features, Poly Preprints, 2008, vol. 49, No. 2, 776-777.

Nakatsuka et al., Creation and Application of New Materials by a Fusion of FI-catalyst Technology and Fine Organic Synthesis Technology, Shokubai, 2010, vol. 52, No. 8, pp. 569-574.

Rodriguez et al., Poly(4-vinylpyridazine). First Synthesis, Characterization and Properties, Polymeric Materials Science and Engineering, Proceedings of the ACS Division of Polymeric Materials Science and Engineering, 1990, vol. 63, pp. 376-382 (Abstract).

Shiono et al., Copolymerization of poly(propylene) macromonomer with ethylene by (tert-butanamide)dimethyl(tetramethyl-qscyclopentadienyl) silane titanium dichloride/methylaluminoxane catalyst, Macromol. Chem. Phys., 1997, vol. 198, pp. 3229-3237.

Weng et al., Synthesis of Long-Chain Branched Propylene Polymers via Macromonomer Incorporation, Macromol. Rapid Commun., 2001, vol. 22, No. 18, pp. 1488-1492.

Xu et al., Ethylene Copolymerization with 1-Octene Using a 2-Methylbenz[e]indenyl-Based ansa-Monocyclopentadienylamido Complex and Methylaluminoxane Catalyst, Macromolecules, 1998, vol. 31, pp. 4724-4729.

* cited by examiner

OLEFIN TRIBLOCK POLYMERS VIA RING-OPENING METATHESIS POLYMERIZATION

RELATED APPLICATIONS

This application is related to U.S. Ser. No. 12/143,663, filed on Jun. 20, 2008 (Published as WO 2009/155471); U.S. Ser. No. 12/487,739, filed on Jun. 19, 2009 (Published as WO 2009/155472); U.S. Ser. No. 12/488,066, filed on Jun. 19, 2009 (Published as WO 2009/155510); U.S. Ser. No. 12/488,093 filed on Jun. 19, 2009 (Published as WO 2009/155517); and U.S. Ser. No. 12/642,453, filed Dec. 18, 2009; which is a continuation-in-part application of U.S. Ser. No. 12/533,465, filed on Jul. 31, 2009, which claims priority to and the benefit of U.S. Ser. No. 61/136,172, filed on Aug. 15, 2008; which are all incorporated by reference herein.

This invention also relates to the following concurrently filed applications:

a) U.S. Ser. No. 13/072,280, filed Mar. 25, 2011, entitled "Novel Catalysts and Methods of Use Thereof to Produce Vinyl Terminated Polymers";

b) U.S. Ser. No. 13/072,189, filed Mar. 25, 2011, entitled "Amine Functionalized Polyolefin and Methods for Preparation Thereof";

c) U.S. Ser. No. 13/072,279, filed Mar. 25, 2011, entitled "Enhanced Catalyst Performance for Production of Vinyl Terminated Propylene and Ethylene/Propylene Macromers";

d) U.S. Ser. No. 13/072,383, filed Mar. 25, 2011, entitled "Diblock Copolymers Prepared by Cross Metathesis";

e) U.S. Ser. No. 13/072,261, filed Mar. 25, 2011, entitled "Amphiphilic Block Polymers Prepared by Alkene Metathesis";

f) U.S. Ser. No. 13/072,288, filed Mar. 25, 2011, entitled "Vinyl Terminated Higher Olefin Polymers and Methods to Produce Thereof";

g) U.S. Ser. No. 13/072,305, filed Mar. 25, 2011, entitled "Hydrosilyation of Vinyl TefFftifbated-Macromers with Metallocenes";

h) U.S. Ser. No. 13/072,330, filed Mar. 25, 2011, entitled "Block Copolymers from Silylated Vinyl Terminated Macromers";

i) U.S. Ser. No. 13/072,249, filed Mar. 25, 2011, entitled "Vinyl Terminated Higher Olefin Copolymers and Methods to Produce Thereof"; and j) U.S. Ser. No. 61/467,681, filed Mar. 25, 2011, entitled "Branched Vinyl Terminated Polymers and Methods for Production Thereof".

FIELD OF THE INVENTION

This invention relates to metathesis preparation of triblock polymers from vinyl-terminated polyolefins.

BACKGROUND OF THE INVENTION

Metathesis is generally thought of as the interchange of radicals between two compounds during a chemical reaction. There are several varieties of metathesis reactions, such as ring opening metathesis, acyclic diene metathesis, ring closing metathesis and cross metathesis.

Methods for the production of polyolefins with end-functionalized groups are typically multi-step processes that often create unwanted by-products and waste of reactants and energy.

R. T. Mathers and G. W. Coates *Chem. Commun.* 2004, pp. 422-423 disclose examples of using cross-metathesis to functionalize polyolefins containing pendant vinyl groups to form polar-functionalized products with a graft-type structure.

D. Astruc et al. *J. Am. Chem. Soc.* 2008, 130, pp. 1495-1506 and D. Astruc et al. *Angew. Chem. Int. Ed.* 2005, 44, pp. 7399-7404 disclose examples of using cross metathesis to functionalize non-polymeric molecules containing vinyl groups.

For reviews of methods to form end-functionalized polyolefins, see: (a) S. B. Amin and T. J. Marks *Angew. Chem. Int. Ed.* 2008, 47, pp. 2006-2025; (b) T. C. Chung *Prog. Polym. Sci.* 2002, 27, pp. 39-85; (c) R. G. Lopez, F. D'Agosto, C. Boisson *Prog. Polym. Sci.* 2007, 32, pp. 419-454.

U.S. Ser. No. 12/487,739, filed Jun. 19, 2009 discloses certain vinyl terminated oligomers and polymers that are functionalized for use in lubricant applications.

U.S. Ser. No. 12/143,663, filed on Jun. 20, 2008 discloses certain vinyl terminated oligomers and polymers that are functionalized in U.S. Ser. No. 12/487,739, filed Jun. 19, 2009.

Additional references of interest include: U.S. Pat. No. 4,988,764.

Thus, metathesis reactions can provide functionalized polyolefins that have end-functionalization. However, to date it has not been feasible to polymerize polyolefins having end-functionalization to each other.

Thus, a need exists for a method to prepare polyolefins that utilize end-functionalization to provide new polymers with unique physical properties.

Triblock polymers prepared by metathesis from multiblocks of vinyl-terminated polyolefins feature a chemically reactive internal site of unsaturation and are of interest for use in a broad range of applications as compatibilizers, tie-layer modifiers, surfactants, and surface modifiers. Hydrogenation leads to unique triblock polymers that can be used in applications such as those noted for the unhydrogenated materials. Herein is described a novel method for their production by the metathesis of multiblocks of vinyl-terminated polyolefins. This method is useful in a range of polyolefins, including isotactic polypropylene (iPP), atactic polypropylene (aPP), ethylene propylene copolymer (EP), and polyethylene (PE).

SUMMARY OF THE INVENTION

This invention relates to a composition comprising a multiblock polyolefin represented by the formula:

PO-(—C=C—Z—)$_n$—C=C-PO*   (I) or

PO-(—C—C—Z—)$_n$—C—C-PO*   (Ia)

wherein Z is the portion of a "cyclic monomer having at least one internal double bond" that remains after a ring-opening metathesis reaction, preferably a $C_1$ to $C_{18}$ hydrocarbyl or substituted hydrocarbyl; PO and PO* are polyolefins, preferably PO and PO* are each, independently, a substituted or unsubstituted hydrocarbyl group having 9 to 10,000 carbon atoms; and n is 1 to about 10,000. This invention also relates to multiblock polyolefins represented by the formula Ia that have been hydrogenated.

DETAILED DESCRIPTION

Definitions

The term "polyolefin" as used herein means an oligomer or polymer of two or more olefin mer units and specifically includes oligomers and polymers as defined below. An "olefin," alternatively referred to as "alkene," is a linear, branched, or cyclic compound of carbon and hydrogen having at least one double bond. A higher olefin is an olefin having four or more carbon atoms. Ethylene shall be considered an alpha-olefin.

A propylene polymer or oligomer contains at least 50 mol % of propylene, an ethylene polymer or oligomer contains at least 50 mol % of ethylene, and so on.

For purposes of this specification and the claims appended thereto, when a polymer or copolymer is referred to as comprising an olefin, including, but not limited to ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. The term "different" as used to refer to mer units indicates that the mer units differ from each other by at least one atom or are different isomerically. Accordingly, the definition of copolymer, as used herein, includes terpolymers and the like. An oligomer is typically a polymer having a low molecular weight (such an Mn of less than 25,000 g/mol, preferably less than 2,500 g/mol) or a low number of mer units (such as 75 mer units or less).

As used herein, Mn is number average molecular weight (measured by $^1$H NMR unless stated otherwise), Mw is weight average molecular weight (measured by Gel Permeation Chromatography), and Mz is z average molecular weight (measured by Gel Permeation Chromatography), wt % is weight percent, and mol % is mole percent. Molecular weight distribution (MWD) is defined to be Mw (measured by Gel Permeation Chromatography) divided by Mn (measured by $^1$H NMR). Unless otherwise noted, all molecular weight units (e.g., Mw, Mn, Mz) are g/mol.

"Allyl chain ends" (also referred to as "vinyl termination", "vinyl chain ends" "allylic vinyl end group" or "vinyl content") is defined to be a polyolefin (oligomer or polymer) having at least one terminus represented by formula I:

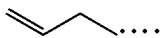

allylic vinyl end group where the "····" represents the polyolefin chain. In a preferred embodiment the allyl chain end is represented by the formula II:

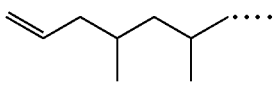

allylic vinyl end group

The amount of allyl chain ends is determined using $^1$H NMR at 120° C. using deuterated tetrachloroethane as the solvent on a 500 MHz machine. and in selected cases confirmed by $^{13}$C NMR. Resconi has reported proton and carbon assignments (neat perdeuterated tetrachloroethane used for proton spectra while a 50:50 mixture of normal and perdeuterated tetrachloroethane was used for carbon spectra; all spectra were recorded at 100° C. on a Bruker AM 300 spectrometer operating at 300 MHz for proton and 75.43 MHz for carbon) for vinyl terminated propylene oligomers in J American Chemical Soc., 114, 1992, pp. 1025-1032 that are useful herein.

"Isobutyl chain end", also referred to as an "isobutyl end group" is defined to be a polyolefin (oligomer or polymer) having at least one terminus represented by the formula:

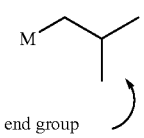

isobutyl end group where M represents the polyolefin (oligomer or polymer) chain. In a preferred embodiment, the isobutyl chain end is represented by one of the following formulae:

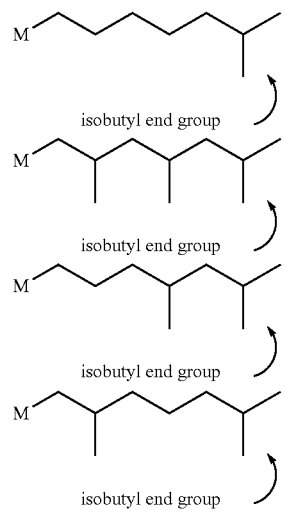

where M represents the polyolefin chain.

The percentage of isobutyl end groups is determined using $^{13}$C NMR (as described in the example section) and the chemical shift assignments in Resconi et al, J. Am. Chem. Soc., 1992, 114, pp. 1025-1032 for 100% propylene oligomers (and polymers) and set forth in FIG. 2 of WO 2009/155471 for E-P oligomers (and polymers).

The "isobutyl chain end to allylic vinyl group ratio" is defined to be the ratio of the percentage of isobutyl chain ends to the percentage of allylic vinyl groups.

Unless otherwise indicated, the term "internal unsaturation" means a double bond that is not an allyl chain end as defined above, a vinylene, or vinylidene unsaturation.

The term "diblock" is defined to mean that there are at least two polyolefin different portions in the multiblock polyolefin, e.g., PO and PO* are different. The term "different" as used to refer to polyolefins indicates that the mer units of the polyolefins differ from each other by at least one atom, the mer units of the polyolefins differ isomerically, or the polyolefins differ in Mn, Mw, Mz, tacticity, Mw/Mn, g'vis, vinyl, vinylidene, vinylene, or internal unsaturation content, amount of comonomer (when the comonomer is the same or different in the polyolefins), density (ASTM D 1505), melting point, heat of fusion, Brookfield viscosity, specific gravity (ASTM D 4052), or any other fluid or polyolefin property described in US 2008/0045638, paragraphs [0593] to [0636] (in event of conflict between test procedures in the instant specification and US 2008/0045638, the instant specification shall control). The term "multiblock" is defined to mean more than one polyolefin portion is present in the multiblock polyolefin. The term "vinyl terminated polyolefin" also referred to as "vinyl terminated macromer" or "VTM" is defined to be a polyolefin (oligomer or polymer) having at least 30% allyl chain ends (relative to total unsaturation), preferably having an Mn of at least 300 g/mol, preferably from 500 to 100,000 g/mol.

As used herein, the new notation for the Periodic Table Groups is used as described in Chemical and Engineering News, 63(5), pg. 27 (1985).

The term "substituted" means that a hydrogen group has been replaced with a hydrocarbyl group, a heteroatom or a heteroatom containing group. For example, methyl cyclopentadiene (Cp) is a Cp group substituted with a methyl group and ethyl alcohol is an ethyl group substituted with an —OH group.

The terms "hydrocarbyl radical," "hydrocarbyl" and "hydrocarbyl group" are used interchangeably throughout this document. Likewise, the terms "group" and "substituent" are also used interchangeably in this document. For purposes of this disclosure, "hydrocarbyl radical" is defined to be $C_1$-$C_{20}$ radicals, that may be linear, branched, or cyclic (aromatic or non-aromatic); and include substituted hydrocarbyl radicals as defined below.

Substituted hydrocarbyl radicals are radicals in which at least one hydrogen atom has been substituted with a heteroatom or heteroatom containing group, preferably with at least one functional group, such as halogen (Cl, Br, I, F), $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like or where at least one heteroatom has been inserted within the hydrocarbyl radical, such as halogen (Cl, Br, I, F), O, S, Se, Te, $NR^*$, $PR^*$, $AsR^*$, $SbR^*$, $BR^*$, $SiR^*_2$, $GeR^*_2$, $SnR^*_2$, $PbR^*_2$, and the like, where $R^*$ is, independently, hydrogen or a hydrocarbyl.

A "substituted alkyl" or "substituted aryl" group is an alkyl or aryl radical made of carbon and hydrogen where at least one hydrogen is replaced by a heteroatom, a heteroatom containing group, or a linear, branched, or cyclic substituted or unsubstituted hydrocarbyl group having 1 to 30 carbon atoms.

By "reactive termini" is meant a polymer having a vinyl, vinylidene, vinylene or other terminal group that can be polymerized into a growing polymer chain.

The following abbreviations may be used through this specification: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, nBu is normal butyl, TMS is trimethylsilyl, TIBAL is triisobutylaluminum, TNOAL is triisobutyl n-octylaluminum, MAO is methylalumoxane, pMe is para-methyl, Ar* is 2,6-diisopropylaryl, Bz is benzyl, THF is tetrahydrofuran, RT is room temperature, and tol is toluene.

Multiblock Polyolefins

This invention relates multiblock polyolefins and processes to prepare a multiblock polyolefin represented by the formula:

  (I) or

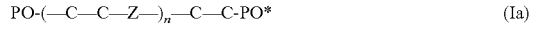  (Ia)

wherein Z is the portion of a cyclic monomer having at least one internal double bond that remains after a ring-opening metathesis reaction, preferably Z is a $C_1$ to $C_{18}$ hydrocarbyl or substituted hydrocarbyl, preferably a $C_1$ to $C_{12}$ hydrocarbyl or substituted hydrocarbyl, preferably a $C_1$ to $C_{10}$ hydrocarbyl or substituted hydrocarbyl (preferably the substituent on the substituted hydrocarbyl is a $C_1$ to $C_5$ hydrocarbyl or a $C_1$ to $C_5$ substituted hydrocarbyl (such as methyl, ethyl, propyl, butyl, pentyl or an isomer thereof), a halogen (such as Br, Cl, I or F) or an ether (such as an alkyl ether or an aryl ether, where the alkyl is a $C_1$ to $C_{20}$ alkyl group and the aryl is a $C_6$ to $C_{20}$ aryl group, preferably methyl ether, ethyl ether, methyl ethyl ether, butyl ether, propyl ether, and the like);

PO and PO* are polyolefins, preferably PO and PO* are each, independently, a substituted or unsubstituted hydrocarbyl group having 9 to 10,000 carbon atoms (preferably 20 to 7500 carbon atoms, preferably 30 to 4000, preferably from 40 to 2000), preferably at least one of PO and PO* has from 20 to 10,000 carbon atoms, preferably 30 to 2000; and n is 1 to about 10,000, in particular from about 10 to about 7500, more particularly from about 50 to about 5000 and in one aspect from about 100 to about 2000.

A preferred embodiment, for the multiblock polyolefin of formula (I), has PO and PO* being different. An example of this would be having PO being isotactic PP and PO* being an EP copolymer, with the ethylene content in the PO* being about 50% by weight. A preferred embodiment for the multiblock polyolefin of formula (X) has PO and PO* being different, with PO being immiscible with PO*. By immiscible is meant that if the vinyl terminated polyolefins that became PO and PO* were blended together they would form a heterogeneous composition.

By homogeneous composition it is meant a composition having substantially one morphological phase. (A co-continuous morphology is considered a single state for purposes of this invention and the claims thereto.) For example, a blend of two polymers where one polymer is miscible with another polymer is said to be homogeneous in the solid state. Such morphology is determined using optical microscopy, scanning electron microscopy (SEM) or atomic force microscopy (AFM), in the event the optical microscopy, SEM and AFM provide different data, then the SEM data shall be used. By contrast, two separate phases would be observed for an immiscible blend. A miscible blend is homogeneous, while an immiscible blend is heterogeneous.

In a preferred embodiment, for the multiblock polyolefin of formula (I) or formula (Ia), PO and PO* comprise about 15 wt % to about 95 wt % ethylene and have more than 80% allyl chain ends (relative to total unsaturations).

In a preferred embodiment, for the multiblock polyolefin of formula (I) or formula (Ia), PO and PO* comprise about 30 wt % to about 95 wt % ethylene and have more than 70% allyl chain ends (relative to total unsaturations).

In a preferred embodiment, for the multiblock polyolefin of formula (I) or formula (Ia), PO and PO* comprise about 30 wt % to about 95 wt % ethylene and have more than 90% allyl chain ends (relative to total unsaturations).

In a preferred embodiment, for the multiblock polyolefin of formula (I) or formula (Ia), PO and PO* comprise about 15 wt % to about 95 wt % propylene and have more than 80% allyl chain ends (relative to total unsaturations).

In a preferred embodiment, for the multiblock polyolefin of formula (I) or formula (Ia), PO and PO* comprise about 30 wt % to about 95 wt % propylene and have more than 70% allyl chain ends (relative to total unsaturations).

In a preferred embodiment, for the multiblock polyolefin of formula (I) or formula (Ia), PO and PO* comprise about 30 wt % to about 95 wt % propylene and have more than 90% allyl chain ends (relative to total unsaturations).

In a preferred embodiment for the multiblock polyolefin of formula (I) or formula (Ia), PO and PO* comprise about 15 wt % to about 95 wt % ethylene-propylene copolymer and have more than 80% allyl chain ends (relative to total unsaturations).

In a preferred embodiment, for the multiblock polyolefin of formula (I) or formula (Ia), PO and PO* comprise about 30 wt % to about 95 wt % ethylene-propylene copolymer and have more than 70% allyl chain ends (relative to total unsaturations).

In a preferred embodiment, for the multiblock polyolefin of formula (I) or formula (Ia), PO and PO* comprise about 30 wt % to about 95 wt % ethylene-propylene copolymer and have more than 90% allyl chain ends (relative to total unsaturations).

In certain embodiments, the multiblock polyolefin has an average of about 0.75 to about 4.0 internal unsaturation sites per polyolefin chain, as determined by $^1$H NMR of the polyolefin for multiblock polymers having an Mn of up to 60,000 g/mol as determined by $^1$H NMR. Preferably the multiblock polyolefin is hydrogenated and the multiblock polyolefin has an average of less than 1.25 internal unsaturation sites per polyolefin chain, as determined by $^1$H NMR of the polyolefin for multiblock polymers having an Mn of up to 60,000 g/mol as determined by $^1$H NMR.

In a preferred embodiment, PO* is PO and/or PO is PO*. In another preferred embodiment, the multiblock polyolefin is polyolefin is a mixture of at least three forms of formula I, for example: the multiblock polyolefin can be a mixture of:

  (I)

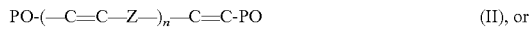  (II), or

  (III)

Preferably, the mixture of I, II and III comprises about 30% to about 70% of multiblock polyolefin (I), about 1% to about 30% of multiblock polyolefin (II), and about 1% to about 30% multiblock polyolefin (III).

In another preferred embodiment, the multiblock polyolefin is polyolefin is a mixture of at least three forms of formula Ia, for example: the multiblock polyolefin can be a mixture of:

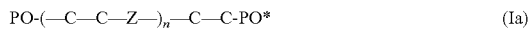  (Ia)

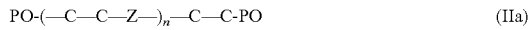  (IIa)

  (IIIa).

Preferably, the mixture of Ia, IIa, and IIIa comprises about 30% to about 70% of multiblock polyolefin (Ia), about 1% to about 30% of multiblock polyolefin (IIa), and about 1% to about 30% multiblock polyolefin (IIIa), where Z, PO, PO*, and n are as described above. As described above, PO and PO* may be the same or different.

The multiblock polyolefin mixture of I, II, and III or of Ia, IIa, and Ms may be fractionated into the three individual components (I), (II), and (III) or Ia, IIa, or Ma using preparative fractionation by dissolution or crystallization temperature, which includes preparative temperature rising elution fractionation (Prep-TREF) and related methods (e.g., using a PREP-mc2 instrument from Polymer ChAR in the TREF or CRYSTAF mode). If the Mn of PO and PO* are significantly different, then three individual components may be separated by preparative fractionation by molecular weight, which includes using a solvent-nonsolvent extraction or precipitation method (e.g., using the PREP-mc2 instrument from Polymer ChAR in the MW mode).

When TREF is employed to fractionate the multiblock polyolefin mixture into three fractions, the fraction of intermediate crystallinity will also have a number average molecular weight (Mn), as determined by gel permeation chromatography with a triple detector (GPC-3D), that is intermediate to the Mn of each of the other two fractions. Typical separations can be accomplished when the elution temperature of the intermediate crystalline fraction is at least 5° C., in particular about 10° C., more particularly 20° C. different than the elution temperature of each of the other two fractions.

In an alternate embodiment, the various components of the multiblock polyolefin can be separated from each other (e.g., (I) can be separated from (II) and (III)) using the preparative TREF procedure below. In a preferred embodiment, once the multiblock polyolefin has been fractionated, the fraction containing the largest mass is selected (and is presumed to be the multiblock polyolefin produced herein) and subjected to characterization, such as DSC (as described below). Preferably, the multiblock polyolefin (e.g., the selected fraction with the largest mass) shows two or more peak melting temperatures (Tm), preferably three Tm's, according to the DSC and the Tm's are different by at least 5° C. each from the other, preferably by at least 10° C., preferably by at least 20° C., preferably by at least 30° C., preferably by at least 40° C., preferably by at least 50° C., preferably by at least 60° C., preferably by at least 70° C., preferably by at least 80° C.

Likewise, preferably the multiblock polyolefin (e.g., the selected fraction with the largest mass) shows at least two crystallization temperatures (Tc) according to the DSC, preferably three Tc's, and the Tc's are different by at least 5° C. each from the other, preferably by at least 10° C., preferably by at least 20° C., preferably by at least 30° C., preferably by at least 40° C., preferably by at least 50° C., preferably by at least 60° C., preferably by at least 70° C., preferably by at least 80° C.

Further, in a preferred embodiment, the heat of fusion (Hf), determined by DSC, of the multiblock polyolefin (e.g., the selected fraction with the largest mass) is between the Hf's of the starting dimer polyolefins. Preferably, the Hf of the multiblock polyolefin (e.g., the selected fraction with the largest mass) is at least 5 J/g different than the Hf of the starting dimer polyolefin (if two or more dimers are used, then the Hf of the dimer having the highest Hf is used), preferably at least 10 J/g different, preferably at least 20 J/g different, preferably at least 50 J/g different, preferably at least 80 J/g different.

In a preferred embodiment, the Hf of the multiblock polyolefin (e.g., the selected fraction with the largest mass) is at least 5 J/g less than the Hf of the starting dimer polyolefin having the highest Hf, preferably at least 10 J/g less, preferably at least 20 J/g less, preferably at least 30 J/g less, preferably at least 40 J/g less, preferably at least 50 J/g less, preferably at least 60 J/g less, preferably at least 70 J/g less, preferably at least 80 J/g less, preferably at least 90 J/g less.

In another embodiment, the comonomer content of the multiblock polyolefin (e.g., the selected fraction with the largest mass) is at least 5 mol % different than the comonomer content of the starting dimer polyolefin (if two or more dimers are present then the dimer having the highest comonomer content is used for this comparison), preferably at least 10 mol % different, preferably at least 20 mol % different, preferably at least 30 mol % different, preferably at least 40 mol % different. A homopolymer shall be considered to have 0 mol % comonomer. Comonomer content can be measured by Fourier Transform Infrared Spectroscopy (FTIR) in conjunction with samples collected by GPC as described in Wheeler and Willis, Applied Spectroscopy, 1993, vol. 47, pp. 1128-1130.

A commercial preparative TREF instrument (Model MC2, Polymer Char S.A.) is used to fractionate the resin into Chemical Composition Fractions. Approximately 2 g of polymer is placed into a reactor and dissolved in 200 mL of xylene, stabilized with 600 ppm of BHT, at 130° C. for approximately 60 minutes. The mixture is allowed to equilibrate for 45 minutes at 90° C., and then cooled to either 30° C. (standard procedure) or 15° C. (cryo procedure) using a cooling rate of 0.1° C./min. The temperature of the cooled mixture is increased until it is within the lowest Isolation Temperature Range to be used (see Table 2) and the mixture is heated to maintain its temperature within the specified range for 20 minutes. The mixture is sequentially filtered through a 75 micron column filter and then a 2 micron disk filter using 10 psi to 50 psi of pressurized nitrogen. The reactor is washed twice with 50 ml of xylene heated to maintain the temperature of the wash mixture within the designated temperature range and held at that temperature for 20 minutes during each wash cycle. The fractionation process is continued by introducing fresh xylene (200 mL of xylene, stabilized with 600 ppm of BHT) into the reactor, increasing the temperature of the mixture until it reaches the next highest Isolation Temperature Range in the sequence indicated in Table 2 and heating the mixture to maintain its temperature within the specified range for 20 minutes prior to filtering it as described above. The extraction cycle is sequentially repeated in this manner until the mixture has been extracted at all Isolation Temperature Ranges shown in Table 2. The extracts are independently precipitated with methanol to recover the individual polymer fractions.

TABLE 2

Preparative TREF Fractionation Isolation Temperature Ranges

| Chemical Composition Fraction Designation | | Isolation Temperature |
|---|---|---|
| Cryo Procedure | Standard Procedure | Range (° C.) |
| 1 | — | 0 to 15 |
| 2 | 1 | 15 to 36* |
| 3 | 2 | 36 to 51 |
| 4 | 3 | 51 to 59 |
| 5 | 4 | 59 to 65 |
| 6 | 5 | 65 to 71 |
| 7 | 6 | 71 to 77 |
| 8 | 7 | 77 to 83 |
| 9 | 8 | 83 to 87 |
| 10 | 9 | 87 to 91 |
| 11 | 10 | Greater than 91 |

*The Isolation Temperature Range for the Standard Procedure is 0 to 36° C.

In a preferred embodiment, the multiblock polyolefin has an Mn of up to 200,000 g/mol, preferably from 400 to 120,000 g/mol, preferably 1000 to about 60,000 g/mol, preferably 10,000 to 45,000 g/mol, preferably from 20,000 to 42,000 g/mol, preferably about 40,000 g/mol, alternately about 20,000 alternately about 1000 g/mol.

In an embodiment, PO is has an Mn of greater than 300, preferably from 400 to 120,000, preferably from 500 to 100,000, preferably form 600 to 60,000 g/mol.

In an embodiment, PO, and optionally PO*, is a polypropylene of a Mn of about 300 to about 20,000 g/mol or PO is an ethylene/propylene copolymer of a Mn of about 300 to about 20,000 g/mol. In a preferred embodiment, at least one of the substituted or unsubstituted hydrocarbyl groups of PO and PO* contain from about 2 to about 18 carbon atoms. In a preferred embodiment, the PO is tactic, preferably isotactic, alternately syndiotactic. Particularly useful PO and PO*'s may be isotactic, highly isotactic, syndiotactic, or highly syndiotactic propylene polymer, particularly isotactic polypropylene. As used herein, "isotactic" is defined as having at least 10% isotactic pentads, preferably having at least 40% isotactic pentads of methyl groups derived from propylene according to analysis by $^{13}$C-NMR. As used herein, "highly isotactic" is defined as having at least 60% isotactic pentads according to analysis by $^{13}$C-NMR. In a desirable embodiment, PO, and/or PO* and/or the vinyl terminated polyolefins used to produce PO and PO* have at least 85% isotacticity. As used herein, "syndiotactic" is defined as having at least 10% syndiotactic pentads, preferably at least 40%, according to analysis by $^{13}$C-NMR. As used herein, "highly syndiotactic" is defined as having at least 60% syndiotactic pentads according to analysis by $^{13}$C-NMR. In another embodiment, PO, and/or PO* and/or the vinyl terminated polyolefins used to produce PO and PO* have has at least 85% syndiotacticity.

In an embodiment, PO is a polypropylene of a Mn of about 300 to about 20,000 g/mol and PO* is not a polypropylene.

This invention presumes that PO and PO* are derived from dimers of one or more vinyl terminated polyolefins used to make the dimers that are used to make the multiblock polyolefins.

In another embodiment, the multiblock polyolefin is a liquid at 25° C. In another embodiment, the multiblock polyolefin has a viscosity index (ASTM 2270) of 120 or more, alternately 130 or more, alternately 150 or more, alternately 200 or more, alternately 250 or more, alternately 300 or more.

In another embodiment, the multiblock polyolefins described herein have a viscosity at 60° C. of greater than 1000 cP, greater than 12,000 cP, or greater than 100,000 cP. In other embodiments, the multiblock polyolefins have a viscosity of less than 200,000 cP, less than 150,000 cP, or less than 100,000 cP. Viscosity is measured using a Brookfield Digital Viscometer.

In another embodiment, one or both of PO and PO* are not a polyaromatic monomer material, such as polystyrene. Likewise, preferably PO and PO* comprise less than 0.1 wt % aromatic monomer, such as a vinyl aromatic, such as styrene or derivatives thereof.

Likewise, in a preferred embodiment, "—(—C=C—Z—)$_n$—" is not a polyvinyl aromatic, such as styrene or derivatives thereof. In a preferred embodiment, the multiblock polyolefin produced herein comprises less than 0.1 wt % aromatic monomer (such as styrene), preferably 0 wt %.

The polyolefin multiblock product containing internal unsaturation, such as those described by Formulae I, II, or III can be catalytically hydrogenated using typical conditions to afford a fully saturated polyolefin product of interest due to increased stability toward unwanted oxidation and other chemical reactions. Hydrogenation may be performed in the melt state, in solution, or as a slurry in the presence of 0.01 to 100 MPa of hydrogen and a suitable hydrogenation catalyst, such as Group 8 through 10 supported metals.

In another embodiment, any of the multiblock polyolefins described herein may be hydrogenated. In particular the multiblock polyolefin is optionally treated to reduce heteroatom containing compounds to less than 600 ppm, and then contacted with hydrogen and a hydrogenation catalyst to produce a multiblock polyolefin having a bromine number less than 1.8. In a preferred embodiment, the treated multiblock polyolefins comprises 100 ppm of heteroatom containing compounds or less, preferably 50 ppm of heteroatom containing compounds or less. (A heteroatom containing compound is a compound containing at least one atom other than carbon and hydrogen.) Preferably the hydrogenation catalyst is selected from the group consisting of supported Group 7, 8, 9, and 10 metals, preferably the hydrogenation catalyst selected from the group consisting of one or more of Ni, Pd, Pt, Co, Rh, -74-Fe, Ru, Os, Cr, Mo, and W, supported on silica, alumina, clay, titania, zirconia, or mixed metal oxide supports. A preferred hydrogenation catalyst is nickel supported on kieselguhr, or platinum or palladium supported on alumina, or cobalt-molybdenum supported on alumina. Usually, a high nickel content catalyst, such as 60% Ni on Keiselguhr catalyst is used, or a supported catalyst with high amount of Co—Mo loading. Alternately, the hydrogenation catalyst is nickel supported on keisleghur, silica, alumina, clay or silica-alumina.

In a preferred embodiment, the multiblock polyolefin is contacted with hydrogen and a hydrogenation catalyst at a temperature from 25 to 350° C., preferably 100 to 300° C. In another preferred embodiment the multiblock polyolefin is contacted with hydrogen and a hydrogenation catalyst for a time period from 5 minutes to 100 hours, preferably from 5 minutes to 24 hours. In another preferred embodiment, the multiblock polyolefin is contacted with hydrogen and a hydrogenation catalyst at a hydrogen pressure of from 25 psi to 2500 psi, preferably from 100 to 2000 psi. This hydrogenation process can be accomplished in a slurry reactor in a batch operation or in a continuous stirred tank reactor (CSTR), where the catalyst in 0.001 wt % to 20 wt % of the multiblock polyolefin feed or preferably 0.01 to 10 wt %, hydrogen and the multiblock polyolefins are continuously added to the reactor to allow for certain residence time, usually 5 minutes to 10 hours to allow complete hydrogenation of the unsaturated olefins. The amount of catalyst added is usually very small just to compensate for the catalyst deactivation. The catalyst and hydrogenated multiblock polyolefins are continuously withdrawn from the reactor. The product mixture is then filtered, centrifuged or settled to remove the solid hydrogenation catalyst. The catalyst can be regenerated and reused. The hydrogenated multiblock polyolefins can be used as is or further distilled.

In another embodiment, any of the multiblock polyolefins produced herein are hydrogenated and have a Bromine number of 1.8 or less as measured by ASTM D 1159 (or ASTM 2710 if so directed by ASTM D 1159), preferably 1.7 or less, preferably 1.6 or less, preferably 1.5 or less, -15-preferably 1.4 or less, preferably 1.3 or less, preferably 1. 2 or less, preferably 1.1 or less, preferably 1.0 or less, preferably 0.5 or less, preferably 0.1 or less.

The multiblock polyolefins produced herein may be used in a broad range of applications, such as compatibilizers, tie-layer modifiers, surfactants, surface modifiers, lubricants, detergents, flocculants, viscosity modifiers, Viscosity Index modifiers, emulsifiers, de-emulsifiers, dispersants, plasticizers, surfactants for soaps, detergents, fabric softeners, antistatics, oil additives, anti-fogging or wetting additives, adhesion promoters, adhesives, additives for lubricants and/or fuels, thermoplastic elastomers, thermoplastics, elastomers, and the like.

In certain embodiments, the multiblock polyolefins produced herein may be used in blends and article of manufacture, such as films, fibers, nonwovens, or molded articles (injection molded and/or blow molded), such as those described in paragraphs [0197 to 0257] of US 2004/0106723.

Process to Prepare the Multiblock Polyolefins

The invention also provides suitable methods to prepare multiblock polyolefins of formula (I) comprising contacting an alkene metathesis catalyst, and a cyclic hydrocarbyl monomer comprising at least one internal double bond with dimer(s) of vinyl terminated polyolefin(s) (VTP), each vinyl terminated polyolefins having at least 30% allyl chain ends, relative to total unsaturations (preferably least 40%, preferably at least 50%, preferably at least 60%, preferably at least 65%, preferably at least 75%, preferably at least 80%, preferably at least 85%, preferably at least 90%, preferably at least 95%). The dimer(s) may be dimers of the same VTP or may be dimers of 2, 3, 4 or more VTP's, preferably one or two. For example, if two VTP's (A and B) are used, the dimer(s) may be A-A, A-B, B-B; or if three VTP's (A, B and C) are used then the dimer(s) may be A-A, A-B, A-C, B-B, B-C, C-C; or if four VTP's (A, B, C and D) are used, then the dimer(s) may be A-A, A-B, A-C, A-D, B-B, B-C, B-D, C-C, C-D, D-D, etc.

The reactants (including the dimer of vinyl terminated polyolefins, such as the dimer that PO and PO* are derived from) are typically combined in a reaction vessel at a temperature of 20 to 200° C. (preferably 50 to 160° C., preferably 60 to 140° C.) and a pressure of 1 Pa to 1000 MPa (preferably 0.5 to 500 MPa, preferably 1 to 250 MPa) for a residence time of 0.5 seconds to 10 hours (preferably 1 second to 5 hours, preferably 1 minute to 1 hour).

Typically, 0.00001 to 0.1 moles, preferably 0.0001 to 0.02 moles, preferably 0.0005 to 0.01 moles of catalyst are charged to the reactor per mole of dimer charged. Typically, from about 0.7 to about 4.0 (e.g., 0.8 to 2.6), preferably from about 1.0 to about 2.0, and most preferably from about 1. 1 to about 1.7 moles of cyclic hydrocarbyl monomer comprising at least 1 internal double bond are charged to the reactor per mole of dimer charged.

The process is typically a solution process, although it may be a bulk or high pressure process. Homogeneous processes are preferred. (A homogeneous process is defined to be a process where at least 90 wt % of the product is soluble in the reaction media.) A bulk homogeneous process is particularly preferred. (A bulk process is defined to be a process where reactant concentration in all feeds to the reactor is 70 volume % or more.) Alternately no solvent or diluent is present or added in the reaction medium, (except for the small amounts used as the carrier for the catalyst or other additives, or amounts typically found with the reactants; e.g., propane in propylene).

Suitable diluents/solvents for the process include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. In a preferred embodiment, aliphatic hydrocarbon solvents are preferred, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably at 0.5 wt %, preferably at 0 wt % based upon the weight of the solvents.

In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

In a preferred embodiment, the feed concentration for the process is 60 volume % solvent or less, preferably 40 volume % or less, preferably 20 volume % or less.

The process may be batch, semi-batch, or continuous. As used herein, the term continuous means a system that operates without interruption or cessation. For example, a continuous process to produce a polymer would be one where the reactants are continually introduced into one or more reactors and polymer product is continually withdrawn.

Useful reaction vessels include reactors (including continuous stirred tank reactors, batch reactors, reactive extruder, pipe or pump).

In a preferred embodiment, the productivity of the process is at least 200 g of multiblock polyolefin of formula (I) per mmol of catalyst per hour, preferably at least 5000 g/mmol/hour, preferably at least 10,000 g/mmol/hr, preferably at least 300,000 g/mmol/hr.

A "reaction zone" also referred to as a "polymerization zone" is defined as an area where activated catalysts and monomers are contacted and a polymerization reaction takes place. When multiple reactors are used in either series or parallel configuration, each reactor is considered as a separate polymerization zone. For a multi-stage polymerization in both a batch reactor and a continuous reactor, each polymerization stage is considered as a separate polymerization zone. Room temperature is 23° C. unless otherwise noted.

This invention further relates to a process, preferably an in-line process, preferably a continuous process, to produce multiblock polyolefin of formula (I), comprising introducing monomer and catalyst system into a reactor, obtaining a reactor effluent containing vinyl terminated polyolefins, optionally removing (such as flashing off) solvent, unused monomer and/or other volatiles, obtaining two vinyl terminated polyolefins (such as those described herein), introducing vinyl terminated polyolefins and alkene metathesis catalyst into a reaction zone, obtaining dimer of vinyl terminated polyolefins; introducing said dimer, cyclic monomer having at least one unsaturation and an alkene metathesis catalyst into a reaction zone, (such as a reactor, an extruder, a pipe, and/or a pump) and obtaining multiblock polyolefin of formula (I) (such as those described herein), thereafter optionally hydrogenating the multiblock polyolefin of formula (I) to obtain a multiblock polyolefin of formula (Ia).

Alkene Metathesis Catalysts

The alkene metathesis catalysts described herein are compounds that catalyze: 1) the reaction between a first vinyl terminated polyolefin with a second vinyl terminated polyolefin to produce a dimer, typically with the elimination of ethylene; or 2) the reaction between the dimers with a cyclic monomer having at least one unsaturation to produce the multiblock polyolefins described herein.

In a preferred embodiment, the alkene metathesis catalyst is represented by the Formula (IA):

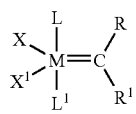

Formula (IA)

where:

M is a Group 8 metal, preferably Ru or Os, preferably Ru;

X and $X^1$ are, independently, any anionic ligand, preferably a halogen (preferably Cl), an alkoxide or a triflate, or X and $X^1$ may be joined to form a dianionic group and may form single ring of up to 30 non-hydrogen atoms or a multinuclear ring system of up to 30 non-hydrogen atoms;

L and $L^1$ are, independently, a neutral two electron donor, preferably a phosphine or a N-heterocyclic carbene, L and $L^1$ may be joined to form a single ring of up to 30 non-hydrogen atoms or a multinuclear ring system of up to 30 non-hydrogen atoms;

L and X may be joined to form a multidentate monoanionic group and may form single ring of up to 30 non-hydrogen atoms or a multinuclear ring system of up to 30 non-hydrogen atoms;

$L^1$ and $X^1$ may be joined to form a multidentate monoanionic group and may form single ring of up to 30 non-hydrogen atoms or a multinuclear ring system of up to 30 non-hydrogen atoms;

R and $R^1$ are, independently, hydrogen or $C_1$ to $C_{30}$ substituted or unsubstituted hydrocarbyl (preferably a $C_1$ to $C_{30}$ substituted or unsubstituted alkyl or a substituted or unsubstituted $C_4$ to $C_{30}$ aryl);

$R^1$ and $L^1$ or $X^1$ may be joined to form single ring of up to 30 non-hydrogen atoms or a multinuclear ring system of up to 30 non-hydrogen atoms; and R and L or X may be joined to form single ring of up to 30 non-hydrogen atoms or a multinuclear ring system of up to 30 non-hydrogen atoms.

Preferred alkoxides include those where the alkyl group is a phenol, substituted phenol (where the phenol may be substituted with up to 1, 2, 3, 4, or 5 $C_1$ to $C_{12}$ hydrocarbyl groups) or a $C_1$ to $C_{10}$ hydrocarbyl, preferably a $C_1$ to $C_{10}$ alkyl group, preferably methyl, ethyl, propyl, butyl, or phenyl.

Preferred triflates are represented by the Formula (IIA):

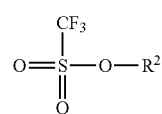

Formula (IIA)

where $R^2$ is hydrogen or a $C_1$ to $C_{30}$ hydrocarbyl group, preferably a $C_1$ to $C_{12}$ alkyl group, preferably methyl, ethyl, propyl, butyl, or phenyl.

Preferred N-heterocyclic carbenes are represented by the Formula (IIIA) or the Formula (IVA):

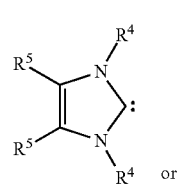

(IIIA)

or

-continued

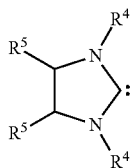

(IVA)

where:
each $R^4$ is independently a hydrocarbyl group or substituted hydrocarbyl group having 1 to 40 carbon atoms, preferably methyl, ethyl, propyl, butyl (including isobutyl and n-butyl), pentyl, cyclopentyl, hexyl, cyclohexyl, octyl, cyclooctyl, nonyl, decyl, cyclodecyl, dodecyl, cyclododecyl, mesityl, adamantyl, phenyl, benzyl, toluoyl, chlorophenyl, phenol, substituted phenol, or $CH_2C(CH_3)_3$; and
each $R^5$ is hydrogen, a halogen, or a $C_1$ to $C_{12}$ hydrocarbyl group, preferably hydrogen, bromine, chlorine, methyl, ethyl, propyl, butyl, or phenyl.

In other useful embodiments, one of the N groups bound to the carbene in formula (IIIA) or (IVA) is replaced with an S, O or P atom, preferably an S atom.

Other useful N-heterocyclic carbenes include the compounds described in Hermann, W. A. Chem. Eur. J. 1996, 2, pp. 772 and 1627; Enders, D. et al. Angew. Chem. Int. Ed. 1995, 34, pg. 1021; Alder R. W., Angew. Chem. Int. Ed. 1996, 35, pg. 1121; and Bertrand, G. et al. Chem. Rev. 2000, 100, pg. 39.

In a preferred embodiment, the alkene metathesis catalyst is one or more of tricyclohexylphosphine[1,3-bis(2,4,6-trimethylphenyl)imidazol-2-ylidene][3-phenyl-1H-inden-1-ylidene]ruthenium(II)dichloride, tricyclohexylphosphine[3-phenyl-1H-inden-1-ylidene][1,3-bis(2,4,6-trimethylphenyl)-4,5-dihydro-imidazol-2-ylidene]ruthenium(II)dichloride, tricyclohexylphosphine[1,3-bis(2,4,6-trimethylphenyl)-4,5-dihydroimidazol-2-ylidene][(phenylthio)methylene]ruthenium(II)dichloride, bis(tricyclohexylphosphine)-3-phenyl-1H-inden-1-ylideneruthenium(II)dichloride, 1,3-Bis(2,4,6-trimethylphenyl)-4,5-dihydroimidazol-2-ylidene[2-(i-propoxy)-5-(N,N-dimethylaminosulfonyl)phenyl]methyleneruthenium(II)dichloride, and [1,3-Bis(2,4,6-trimethylphenyl)-2-imidazolidinylidene]-[2-[[(4-methylphenyl)imino]methyl]-4-nitrophenolyl]-[3-phenyl-1H-inden-1-ylidene]ruthenium(II)chloride.

In another embodiment, the alkene metathesis catalyst is represented in Formula (IA) above, where: M is Os or Ru; $R^1$ is hydrogen; X and $X^1$ may be different or the same and are any anionic ligand; L and $L^1$ may be different or the same and are any neutral electron donor; and R may be hydrogen, substituted or unsubstituted alkyl, or substituted or unsubstituted aryl. R is preferably hydrogen, $C_1$-$C_{20}$ alkyl, or aryl. The $C_1$-$C_{20}$ alkyl may optionally be substituted with one or more aryl, halide, hydroxy, $C_1$-$C_{20}$ alkoxy, or $C_2$-$C_{20}$ alkoxycarbonyl groups. The aryl may optionally be substituted with one or more $C_1$-$C_{20}$ alkyl, aryl, hydroxyl, $C_1$-$C_5$ alkoxy, amino, nitro, or halide groups. L and $L^1$ are preferably phosphines of the formula $PR^{3'}R^{4'}R^{5'}$, where $R^{3'}$ is a secondary alkyl or cycloalkyl, and $R^{4'}$ and $R^{5'}$ are aryl, $C_1$-$C_{10}$ primary alkyl, secondary alkyl, or cycloalkyl. $R^{4'}$ and $R^{5'}$ may be the same or different. L and $L^1$ preferably the same and are —P(cyclohexyl)$_3$, —P(cyclopentyl)$_3$, or —P(isopropyl)$_3$. X and $X^1$ are most preferably the same and are chlorine.

In another embodiment of the present invention, the ruthenium and osmium carbene compounds have the Formula (V):

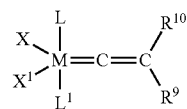

Formula (V)

where M is Os or Ru, preferably Ru; X, $X^1$, L, and $L^1$ are as described above; and $R^9$ and $R^{10}$ may be different or the same and may be hydrogen, substituted or unsubstituted alkyl, or substituted or unsubstituted aryl. The $R^9$ and $R^{10}$ groups may optionally include one or more of the following functional groups: alcohol, thiol, ketone, aldehyde, ester, ether, amine, imine, amide, nitro, carboxylic acid, disulfide, carbonate, isocyanate, carbodiimide, carboalkoxy, and halogen groups. Such compounds and their synthesis are described in U.S. Pat. No. 6,111,121.

In another embodiment, the alkene metathesis catalyst useful herein may be any of the catalysts described in U.S. Pat. Nos. 6,111,121; 5,312,940; 5,342,909; 7,329,758; 5,831,108; 5,969,170; 6,759,537; 6,921,735; and U.S. Publication No. 2005-0261451 A1, including, but not limited to, benzylidenebis(tricyclohexylphosphine)dichlororuthenium, benzylidene[1,3-bis(2,4,6-trimethylphenyl)-2-imidazolidinylidene]dichloro(tricyclohexylphosphine)ruthenium, dichloro(o-isopropoxyphenylmethylene)(tricyclohexylphosphine) ruthenium(II), (1,3-Bis-(2,4,6-trimethylphenyl)-2-imidazolidinylidene)dichloro(o-isopropoxyphenylmethylene)ruthenium, 1,3-Bis(2-methylphenyl)-2-imidazolidinylidene]dichloro(2-isopropoxyphenylmethylene) ruthenium(II), [1,3-Bis(2,4,6-trimethylphenyl)-2-imidazolidinylidene]dichloro[3-(2-pyridinyl)propylidene]ruthenium(II), [1,3-Bis(2-methylphenyl)-2-imidazolidinylidene]dichloro (phenylmethylene)(tricyclohexylphosphine)ruthenium(II), [1,3-Bis(2,4,6-trimethylphenyl)-2-imidazolidinylidene] dichloro(3-methyl-2-butenylidene)(tricyclohexylphosphine) ruthenium(II), and [1,3-Bis(2,4,6-trimethylphenyl)-2-imidazolidinylidene]dichloro(benzylidene)bis(3-bromopyridine) ruthenium(II).

In another embodiment, the alkene metathesis catalyst is represented by the formula:

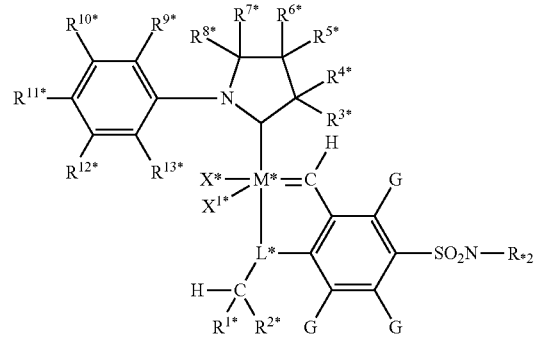

Formula (VI)

where:
M* is a Group 8 metal, preferably Ru or Os, preferably Ru;
X* and $X^{1*}$ are, independently, any anionic ligand, preferably a halogen (preferably $C_1$), an alkoxide or an alkyl sulfonate, or X and $X^1$ may be joined to form a dianionic group and may form single ring of up to 30 non-hydrogen atoms or a multinuclear ring system of up to 30 non-hydrogen atoms;

L* is N, O, P, or S, preferably N or O;

R* is hydrogen or a $C_1$ to $C_{30}$ hydrocarbyl or substituted hydrocarbyl, preferably methyl;

$R^{1*}$, $R^{2*}$, $R^{3*}$, $R^{4*}$, $R^{5*}$, $R^{6*}$, $R^{7*}$, and $R^{8*}$ are, independently, hydrogen or a $C_1$ to $C_{30}$ hydrocarbyl or substituted hydrocarbyl, preferably methyl, ethyl, propyl or butyl, preferably $R^{1*}$, $R^{2*}$, $R^{3*}$, and $R^{4*}$ are methyl;

each $R^{9*}$ and $R^{13*}$ are, independently, hydrogen or a $C_1$ to $C_{30}$ hydrocarbyl or substituted hydrocarbyl, preferably a $C_2$ to $C_6$ hydrocarbyl, preferably ethyl;

$R^{10*}$, $R^{11*}$, $R^{12*}$ are, independently hydrogen or a $C_1$ to $C_{30}$ hydrocarbyl or substituted hydrocarbyl, preferably hydrogen or methyl;

each G, is, independently, hydrogen, halogen or $C_1$ to $C_{30}$ substituted or unsubstituted hydrocarbyl (preferably a $C_1$ to $C_{30}$ substituted or unsubstituted alkyl or a substituted or unsubstituted $C_4$ to $C_{30}$ aryl);

where any two adjacent R groups may form a single ring of up to 8 non-hydrogen atoms or a multinuclear ring system of up to 30 non-hydrogen atoms.

Preferably, any two adjacent R groups may form a fused ring having from 5 to 8 non hydrogen atoms. Preferably the non-hydrogen atoms are C and/or O. Preferably the adjacent R groups form fused rings of 5 to 6 ring atoms, preferably 5 to 6 carbon atoms. By adjacent is meant any two R groups located next to each other, for example $R^{3*}$ and $R^{4*}$ can form a ring and/or $R^{11*}$ and $R^{12*}$ can form a ring.

In a preferred embodiment, the metathesis catalyst compound comprises one or more of: 2-(2,6-diethylphenyl)-3,5,5,5-tetramethylpyrrolidine[2-(i-propoxy)-5-(N,N-dimethylaminosulfonyl)phenyl]methylene ruthenium dichloride; 2-(mesityl)-3,3,5,5-tetramethylpyrrolidine[2-(i-propoxy)-5-(N,N-dimethylaminosulfonyl)phenyl]methylene ruthenium dichloride; 2-(2-isopropyl)-3,3,5,5-tetramethylpyrrolidine[2-(i-propoxy)-5-(N,N-dimethylaminosulfonyl)phenyl]methylene ruthenium dichloride; 2-(2,6-diethyl-4-fluorophenyl)-3,3,5,5-tetramethylpyrrolidine[2-(i-propoxy)-5-(N,N-dimethylaminosulfonyl)phenyl]methylene ruthenium dichloride, or mixtures thereof.

For further information on such alkene metathesis catalysts, please see U.S. Ser. No. 12/939,054, filed Nov. 3, 2010, claiming priority to and the benefit of U.S. Ser. No. 61/259,514, filed Nov. 9, 2009.

The above named catalysts are generally available from Sigma-Aldrich Corp. (St. Louis, Mo.) or Strem Chemicals, Inc. (Newburyport, Mass.).

Cyclic Hydrocarbyl Monomers

Suitable cyclic hydrocarbyl monomers having at least one internal double bond include $C_3$ through $C_{20}$ cyclic hydrocarbyl monomers that have one or more internal double bonds. The cyclic hydrocarbyl monomer can be substituted or unsubstituted. Suitable substituents include $C_1$ through $C_5$ hydrocarbyl substituents, such may also be substituted (such as methyl, ethyl, propyl, butyl, pentyl, and isomers thereof), halogen atoms (such as Br, Cl, I, or F), ether substituents, and the like. Preferred cyclic hydrocarbyl monomers include a $C_3$ to $C_{20}$ hydrocarbyls or substituted hydrocarbyls, preferably $C_3$ to $C_{14}$ hydrocarbyls or substituted hydrocarbyls, preferably $C_3$ to $C_{12}$ hydrocarbyls or substituted hydrocarbyls (preferably the substituent on the substituted hydrocarbyl is a $C_1$ to $C_5$ hydrocarbyl or a $C_1$ to $C_5$ substituted hydrocarbyl (such as methyl, ethyl, propyl, butyl, pentyl, or an isomer thereof), a halogen (such as Br, Cl, I, or F) or an ether (such as an alkyl ether or an aryl ether), where the alkyl is a $C_1$ to $C_{20}$ alkyl group and the aryl is a $C_6$ to $C_{20}$ aryl group, preferably methyl ether, ethyl ether, methyl ethyl ether, butyl ether, propyl ether, and the like). Preferred cyclic hydrocarbyl monomers include bi cyclic and tricylic monomers. Preferred cyclic hydrocarbyl monomers include, for example, cyclopropene, cyclobutene, cyclopentene, cyclohexene, methylcyclohexene, cycloheptene, cyclooctadiene, cyclooctene, norbornadiene, norbornene, cyclobutadiene, cyclohexadiene, cycloheptadiene, cyclooctatetraene, 1,5-cyclooctadiene, 1,5-dimethyl-1,5-cyclooctadiene, dicyclopentadiene, and isomers thereof. By internal double bond is meant that the double bond is within the cyclic structure and is not pendent thereto. For example, vinyl cyclohexane is not a cyclic hydrocarbyl monomers having at least one internal double bond, while cyclohexene is a cyclic hydrocarbyl monomers having at least one internal double bond.

Dimers of Vinyl Terminated Polyolefins

Dimers of vinyl terminated polyolefins useful herein include those represented by the formula: PO-C=C-PO*, where PO and PO* are polyolefins, preferably PO and PO* are each, independently, a substituted or unsubstituted hydrocarbyl group having 9 to 10,000 carbon atoms (preferably 20 to 7500 carbon atoms, preferably 30 to 4000, preferably from 40 to 2000), preferably at least one of PO and PO* has from 20 to 10,000 carbon atoms, preferably 30 to 2000. Preferably, PO and PO* are any combination described herein. For purposes of this invention, when the term dimer is used, it means two mer units which may be the same or different, e.g., PO and PO* may be the same or different.

In a preferred embodiment, useful dimers represented by the formula (X):

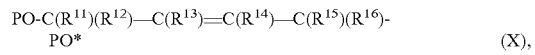

$$PO-C(R^{11})(R^{12})—C(R^{13})=C(R^{14})—C(R^{15})(R^{16})-PO^* \quad (X),$$

or isomers thereof, wherein $R^{11}$, $R^{12}$, $R^{13}$, $R^{14}$, $R^{15}$ and $R^{16}$, are each, independently, a substituted or unsubstituted $C_1$ through $C_4$ hydrocarbyl group or a hydrogen;

PO and PO* are each, independently, polyolefins, preferably derived from vinyl terminated polyolefins, preferably PO and PO* are each, independently, a substituted or unsubstituted hydrocarbyl group having 9 to 4000 carbon atoms, provided that at least one of PO and PO* are $C_{20}$ or greater, said dimer having:

1) an internal unsaturation as shown by the $^{13}C$ NMR peak at between about 128 and about 132 ppm;

2) an Mn ratio "Z"=0.1 to 10, preferably 0.25 to 4, preferably 0.5 to 2, preferably 0.75 to 1.5, where Z is the Mn (as determined by $^{13}C$ NMR) divided by Mn (as determined according to Gel Permeation Chromotography using polystyrene standards); and 3) optionally, from 0.30 (J) and 0.75 (J) (preferably from 0.35 (J) and 0.70 (J), preferably from 0.40 (J) and 0.60 (J)) internal unsaturations per 1000 carbons as determined by $^1H$ NMR spectroscopy, where J is the number of reactive groups per 1000 carbons for the mixture of vinyl terminated polyolefins, that preferably become PO and PO*, before they are coupled by an alkene metathesis catalyst.

A preferred embodiment for the dimer of formula (X) has PO and PO* being different. PO and PO* in Formula (X) may by any PO and PO* as described herein.

In another embodiment, the dimer has 0.10 to 35 internal unsaturations per 1,000 carbon atoms, as determined by $^{13}C$ NMR (as described in concurrently filed U.S. Ser. No. 13/072,383, filed Mar. 25, 2011, entitled "Diblock Copolymers Prepared by Cross Metathesis"), alternately from 0.2 to 20, preferably 0.3 to 10.

Process to Produce Dimers of Vinyl Terminated Polyolefins.

Dimers of vinyl terminated polyolefins can be produced by a process comprising contacting an alkene metathesis catalyst with two or more vinyl terminated polyolefins, each having at least 30% allyl chain ends (relative to total unsaturations).

The reactants (including the vinyl terminated polyolefins, such as the vinyl terminated polyolefins that PO and PO* are derived from) are typically combined in a reaction vessel at a temperature of 20 to 200° C. (preferably 50 to 160° C., preferably 60 to 140° C.) and a pressure of 0 to 1000 MPa (preferably 0.5 to 500 MPa, preferably 1 to 250 MPa) for a residence time of 0.5 seconds to 10 hours (preferably 1 second to 5 hours, preferably 1 minute to 1 hour).

Typically, 0.00001 to 1.0 moles, preferably 0.0001 to 0.05 moles, preferably 0.0005 to 0.01 moles of catalyst are charged to the reactor per mole of vinyl terminated polyolefin charged.

The process is typically a solution process, although it may be a bulk or high pressure process. Homogeneous processes are preferred. (A homogeneous process is defined to be a process where at least 90 wt % of the product is soluble in the reaction media.) A bulk homogeneous process is particularly preferred. (A bulk process is defined to be a process where reactant concentration in all feeds to the reactor is 70 volume % or more.) Alternately no solvent or diluent is present or added in the reaction medium, (except for the small amounts used as the carrier for the catalyst or other additives, or amounts typically found with the reactants; e.g., propane in propylene).

Suitable diluents/solvents for the process include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof such as can be found commercially (Isopar™); perhalogenated hydrocarbons, such as perfluorinated $C_{4\text{-}10}$ alkanes, chlorobenzene, and aromatic and alkylsubstituted aromatic compounds, such as benzene, toluene, mesitylene, and xylene. In a preferred embodiment, aliphatic hydrocarbon solvents are preferred, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably at 0.5 wt %, preferably at 0 wt % based upon the weight of the solvents.

In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

In a preferred embodiment, the feed concentration for the process is 60 volume % solvent or less, preferably 40 volume % or less, preferably 20 volume % or less.

The process may be batch, semi-batch or continuous. As used herein, the term continuous means a system that operates without interruption or cessation. For example, a continuous process to produce a polymer would be one where the reactants are continually introduced into one or more reactors and polymer product is continually withdrawn.

Useful reaction vessels include reactors (including continuous stirred tank reactors, batch reactors, reactive extruder, pipe, or pump).

In a preferred embodiment, the productivity of the process is at least 200 g of dimer of formula (X) per mmol of catalyst per hour, preferably at least 5000 g/mmol/hour, preferably at least 10,000 g/mmol/hr, preferably at least 300,000 g/mmol/hr.

For more information on dimers useful herein and process to make such, please see concurrently filed U.S. Ser. No. 13/072,383, filed Mar. 25, 2011, entitled "Diblock Copolymers Prepared by Cross Metathesis."

Vinyl Terminated Olefin Polyolefins

Vinyl terminated olefin polyolefins (oligomers and polymers) useful herein to make the dimers used herein can include any vinyl-terminated polyolefin including those prepared from one or more of $C_2$, $C_3$, $C_4$ through $C_{12}$ unsaturated monomers. Suitable monomers include but are not limited to, for example, ethylene, propylenes, butylenes, pentylenes, hexylenes, heptylenes, octylenes, nonylenes, decyclenes, and the like, preferably each having at least 30% allyl chain ends, relative to total unsaturations (preferably least 40%, preferably at least 50%, preferably at least 60%, preferably at least 65%, preferably at least 75%, preferably at least 80%, preferably at least 85%, preferably at least 90%, preferably at least 95%).

In a preferred embodiment, the vinyl terminated polyolefin used herein comprises at least 10 mol % (alternately at least 20 mol %, alternately at least 40 mol %, alternately at least 60 mol %) of a $C_4$ or greater olefin (such as butene, pentene, octene, nonene, decene, undecene, dodecene) and has: 1) at least 30% allyl chain ends (relative to total unsaturations), preferably at least 40%, preferably at least 50%, preferably at least 60%, preferably at least 70%, preferably at least 75%, preferably at least 80%, preferably at least 85%, preferably at least 90%, preferably at least 95%; and 2) an Mn of from 200 to 60,000 g/mol, preferably from 200 to 50,000 g/mol, preferably from 500 to 40,000 g/mol.

Vinyl terminated olefin polyolefins useful in this invention include propylene polymers, comprising propylene and less than 0.5 wt % comonomer, preferably 0 wt % comonomer, wherein the oligomer has:
  i) at least 93% allyl chain ends (preferably at least 95%, preferably at least 97%, preferably at least 98%);
  ii) a number average molecular weight (Mn) of about 500 to about 20,000 g/mol, as measured by $^1$H NMR (preferably 500 to 15,000, preferably 700 to 10,000, preferably 800 to 8,000 g/mol, preferably 900 to 7,000, preferably 1000 to 6,000, preferably 1000 to 5,000);
  iii) an isobutyl chain end to allylic vinyl group ratio of 0.8:1 to 1.3:1.0; and
  iv) less than 1400 ppm aluminum, (preferably less than 1200 ppm, preferably less than 1000 ppm, preferably less than 500 ppm, preferably less than 100 ppm).

Vinyl terminated polymers useful in this invention also include propylene co-polymers having an Mn of 300 to 30,000 g/mol as measured by $^1$H NMR (preferably 400 to 20,000, preferably 500 to 15,000, preferably 600 to 12,000, preferably 800 to 10,000, preferably 900 to 8,000, preferably 900 to 7,000 g/mol), comprising 10 to 90 mol % propylene (preferably 15 to 85 mol %, preferably 20 to 80 mol %, preferably 30 to 75 mol %, preferably 50 to 90 mol %) and 10 to 90 mol % (preferably 85 to 15 mol %, preferably 20 to 80 mol %, preferably 25 to 70 mol %, preferably 10 to 50 mol %) of one or more alpha-olefin comonomers (preferably ethylene, butene, hexene, or octene, preferably ethylene), wherein the oligomer has at least X % allyl chain ends (relative to total unsaturations), where: 1) X=(−0.94 (mol % ethylene incorporated)+100{alternately 1.20 (−0.94 (mol % ethylene incorporated)+100), alternately 1.50(−0.94 (mol % ethylene incorporated)+100)}), when 10 to 60 mol % ethylene is present in the co-oligomer; and 2) X=45 (alternately 50, alternately 60), when greater than 60 and less than 70 mol % ethylene is present in the copolymer, and 3) X=(1.83*(mol % ethylene incorporated)−83, {alternately 1.20 [1.83*(mol % ethylene incorporated)−83], alternately 1.50 [1.83*(mol % ethylene incorporated)−83]}), when 70 to 90 mol % ethylene is present in the copolymer. Alternately X is 80% or more, preferably 85% or more, preferably 90% or more, preferably 95% or more. In an alternate embodiment, the polymer has at least 80% isobutyl chain ends (based upon the sum of isobutyl and n-propyl saturated chain ends), preferably at least 85% isobutyl chain ends, preferably at least 90% isobutyl chain ends. Alternately, the polymer has an isobutyl chain end to allylic vinyl group ratio of 0.8:1 to 1.35:1.0, preferably 0.9:1 to 1.20:1.0, preferably 0.9:1.0 to 1.1:1.0.

Vinyl terminated olefin polymers useful in this invention also include propylene polymers, comprising more than 90 mol % propylene (preferably 95 to 99 mol %, preferably 98 to 9 mol %) and less than 10 mol % ethylene (preferably 1 to 4 mol %, preferably 1 to 2 mol %), wherein the polymer has:
  i) at least 93% allyl chain ends (preferably at least 95%, preferably at least 97%, preferably at least 98%);
  ii) a number average molecular weight (Mn) of about 400 to about 30,000 g/mol, as measured by $^1$H NMR (preferably 500 to 20,000, preferably 600 to 15,000, preferably 700 to 10,000 g/mol, preferably 800 to 9,000, preferably 900 to 8,000, preferably 1000 to 6,000);
  iii) an isobutyl chain end to allylic vinyl group ratio of 0.8:1 to 1.35:1.0; and
  iv) less than 1400 ppm aluminum, (preferably less than 1200 ppm, preferably less than 1000 ppm, preferably less than 500 ppm, preferably less than 100 ppm).

Vinyl terminated olefin polymers and polymers useful in this invention also include propylene polymers, comprising: at least 50 (preferably 60 to 90, preferably 70 to 90) mol % propylene and from 10 to 50 (preferably 10 to 40, preferably 10 to 30) mol % ethylene, wherein the polymer has:
  i) at least 90% allyl chain ends (preferably at least 91%, preferably at least 93%, preferably at least 95%, preferably at least 98%);
  ii) an Mn of about 150 to about 20,000 g/mol, as measured by $^1$H NMR (preferably 200 to 15,000, preferably 250 to 15,000, preferably 300 to 10,000, preferably 400 to 9,500, preferably 500 to 9,000, preferably 750 to 9,000); and
  iii) an isobutyl chain end to allylic vinyl group ratio of 0.8:1 to 1.3:1.0, wherein monomers having four or more carbon atoms are present at from 0 to 3 mol % (preferably at less than 1 mol %, preferably less than 0.5 mol %, preferably at 0 mol %).

Vinyl terminated olefin polymers useful in this invention also include propylene polymers, comprising:
at least 50 (preferably at least 60, preferably 70 to 99.5, preferably 80 to 99, preferably 90 to 98.5) mol % propylene, from 0.1 to 45 (alternately at least 35, preferably 0.5 to 30, preferably 1 to 20, preferably 1.5 to 10) mol % ethylene, and from 0.1 to 5 (preferably 0.5 to 3, preferably 0.5 to 1) mol % $C_4$ to $C_{12}$ olefin (such as butene, hexene or octene, preferably butene), wherein the polymer has:
  i) at least 90% allyl chain ends (preferably at least 91%, preferably at least 93%, preferably at least 95%, preferably at least 98%);
  ii) a number average molecular weight (Mn) of about 150 to about 15,000 g/mol, as measured by $^1$H NMR (preferably 200 to 12,000, preferably 250 to 10,000, preferably 300 to 10,000, preferably 400 to 9500, preferably 500 to 9,000, preferably 750 to 9,000); and
  iii) an isobutyl chain end to allylic vinyl group ratio of 0.8:1 to 1.35:1.0.

Vinyl terminated olefin polymers useful in this invention also include propylene polymers, comprising:
at least 50 (preferably at least 60, preferably 70 to 99.5, preferably 80 to 99, preferably 90 to 98.5) mol % propylene, from 0.1 to 45 (alternately at least 35, preferably 0.5 to 30, preferably 1 to 20, preferably 1.5 to 10) mol % ethylene, and from 0.1 to 5 (preferably 0.5 to 3, preferably 0.5 to 1) mol % diene (such as $C_4$ to $C_{12}$ alpha-omega dienes (such as butadiene, hexadiene, octadiene), norbornene, ethylidene norbornene, vinylnorbornene, norbornadiene, and dicyclopentadiene), wherein the polymer has:
  i) at least 90% allyl chain ends (preferably at least 91%, preferably at least 93%, preferably at least 95%, preferably at least 98%);
  ii) a number average molecular weight (Mn) of about 150 to about 20,000 g/mol, as measured by $^1$H NMR (preferably 200 to 15,000, preferably 250 to 12,000, preferably 300 to 10,000, preferably 400 to 9,500, preferably 500 to 9,000, preferably 750 to 9,000); and
  iii) an isobutyl chain end to allylic vinyl group ratio of 0.7:1 to 1.35:1.0.

In another embodiment, the vinyl terminated polyolefin useful herein may be one or more vinyl terminated polymers having an Mn (measured by $^1$H NMR) of 200 g/mol or more, (preferably 300 to 60,000 g/mol, 400 to 50,000 g/mol, preferably 500 to 35,000 g/mol, preferably 300 to 15,000 g/mol, preferably 400 to 12,000 g/mol, or preferably 750 to 10,000 g/mol); and comprising: (i) from about 20 to about 99.9 mol % (preferably from about 25 to about 90 mol %, from about 30 to about 85 mol %, from about 35 to about 80 mol %, from about 40 to about 75 mol %, or from about 50 to about 95 mol %) of at least one $C_5$ to $C_{40}$ olefin (preferably $C_5$ to $C_{30}$ α-olefins, more preferably $C_5$-$C_{20}$ α-olefins, preferably, $C_5$-$C_{12}$ α-olefins, preferably pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexane, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene); and (ii) from about 0.1 to 80 mol % of propylene (preferably from about 5% to 70 mol %, from about 10 to 65 mol %, from about 15 to 55 mol %, from about 25 to 50 mol %, or from about 30 to 80 mol %); wherein the vinyl terminated polyolefin has at least 40% allyl chain ends (preferably at least 50%, at least 60%, at least 70%; at least 80%, at least 90%; at least 95%); and, optionally, an isobutyl chain end to allylic chain end ratio of less than 0.70:1 (preferably less than 0.65:1, less than 0.60:1, less than 0.50:1, or less than 0.25:1); and, further, optionally, an allyl chain end to vinylidene chain end (as determined by $^1$H NMR) ratio of more than 2:1 (preferably more than 2.5:1, more than 3:1, more than 5:1, or more than 10:1); and, further, optionally, an allyl chain end to vinylene chain end ratio of greater than 10:1 (preferably greater than 15:1, or greater than 20:1); and, even further, optionally, preferably substantially no isobutyl chain ends (preferably less than 0.1 wt % isobutyl chain ends). For further information on such vinyl terminated polyolefins please see concurrently filed U.S. Ser. No. 13/072,249, filed Mar. 25, 2011, entitled "Vinyl Terminated Higher Olefin Copolymers and Methods to Produce Thereof."

In another embodiment, the vinyl terminated polyolefins useful herein may be one or more vinyl terminated polyolefins having an Mn (measured by $^1$H NMR) of 200 g/mol or more (preferably 300 to 60,000 g/mol, 400 to 50,000 g/mol, preferably 500 to 35,000 g/mol, preferably 300 to 15,000 g/mol, preferably 400 to 12,000 g/mol, or preferably 750 to 10,000 g/mol) and comprises: (i) from about 80 to 99.9 mol % (preferably 85 to 99.9 mol %, more preferably 90 to 99.9 mol %) of at least one $C_4$ olefin (preferably 1-butene); and (ii) from about 0.1 to 20 mol % of propylene, preferably 0.1 to 15 mol %, more preferably 0.1 to 10 mol %; wherein the vinyl terminated polyolefin has at least 40% allyl chain ends, preferably at least 50%, at least 60%, at least 70%; or at least 80%; and, optionally, an isobutyl chain end to allylic chain end ratio of less than 0.70:1, less than 0.65:1, less than 0.60:1, less than 0.50:1, or less than 0.25:1; and, further, optionally, an allyl chain end to vinylidene chain end ratio of more than 2:1, more than 2.5:1, more than 3:1, more than 5:1, or more than 10:1; and, further, optionally, an allyl chain end to vinylene chain end ratio of greater than 10:1 (preferably greater than 15:1, or greater than 20:1); and, even further, optionally, preferably substantially no isobutyl chain ends (preferably less than 0.1 wt % isobutyl chain ends). For further information on such vinyl terminated polyolefins please see concurrently filed U.S. Ser. No. 13/072,249, filed Mar. 25, 2011, entitled "Vinyl Terminated Higher Olefin Copolymers and Methods to Produce Thereof."

In particular embodiments herein, the invention relates to a composition comprising vinyl terminated polyolefins having an Mn of at least 200 g/mol, (preferably 200 to 100,000 g/mol, preferably 200 to 75,000 g/mol, preferably 200 to 60,000 g/mol, preferably 300 to 60,000 g/mol, or preferably 750 to 30,000 g/mol) (measured by $^1$H NMR) comprising of one or more (preferably two or more, three or more, four or more, and the like) $C_4$ to $C_{40}$ (preferably $C_4$ to $C_{30}$, $C_4$ to $C_{20}$, or $C_4$ to $C_{12}$, preferably butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof) higher olefin derived units, where the vinyl terminated higher olefin polymer comprises substantially no propylene derived units (preferably less than 0.1 wt % propylene); and wherein the higher olefin polymer has at least 5% (at least 10%, at least 15%, at least 20%, at least 30%, at least 40%, at least 50%, at least 60%, at least 70%; at least 80%, at least 90%, or at least 95%) allyl chain ends; and optionally, an allyl chain end to vinylidene chain end ratio of greater than 2:1 (preferably greater than 2.5:1, greater than 3:1, greater than 5:1, or greater than 10:1); and, further, optionally, an allyl chain end to vinylene chain end ratio of greater than 10:1 (preferably greater than 15:1, or greater than 20:1); and, even further, optionally, preferably substantially no isobutyl chain ends (preferably less than 0.1 wt % isobutyl chain ends). In some embodiments, these higher olefin vinyl terminated polymers may comprise ethylene derived units, preferably at least 5 mol % ethylene (preferably at least 15 mol % ethylene, preferably at least 25 mol % ethylene, preferably at least 35 mol % ethylene, preferably at least 45 mol % ethylene, preferably at least 60 mol % ethylene, preferably at least 75 mol % ethylene, or preferably at least 90 mol % ethylene). For further information on such vinyl terminated polyolefins please see concurrently filed U.S. Ser. No. 13/072,288, filed Mar. 25, 2011, entitled "Vinyl Terminated Higher Olefin Polymers and Methods to Produce Thereof."

In another embodiment, the vinyl terminated polyolefin useful herein is a branched polyolefin having an Mn of 7,500 to 60,000 g/mol (and optionally a Tm of greater than 60° C. (preferably greater than 100° C.), and or, optionally, a ΔHf of greater than 7 J/g (preferably greater than 50 J/g)) comprising one or more alpha olefins (preferably ethylene and/or propylene and optionally a $C_4$ to $C_{10}$ alpha olefin), said branched polyolefin having: (i) 50 mol % or greater allyl chain ends, relative to total unsaturated chain ends (preferably 60% or more, preferably 70% or more, preferably 80% or more, preferably 90% or more, preferably 95% or more); (ii) a g'(vis) of 0.90 or less (preferably 0.85 or less, preferably 0.80 or less); (iii) optionally, an allyl chain end to internal vinylidene ratio of greater than 5:1 (preferably greater than 10:1); and (iv) optionally, an allyl chain end to vinylidene chain end ratio of greater than greater than 10:1 (preferably greater than 15:1).

In another embodiment, the vinyl terminated polyolefin useful herein is a branched polyolefin having an Mn of 60,000 g/mol or more (and optionally a Tm of greater than 60° C. (preferably greater than 100° C.), and or, optionally, a ΔHf of greater than 7 J/g (preferably greater than 50 J/g)) comprising one or more alpha olefins (preferably ethylene and/or propylene and optionally a $C_4$ to $C_{10}$ alpha olefin), and having: (i) 50 mol % or greater alkyl chain ends, relative to total unsaturated chain ends (preferably 60% or more, preferably 70% or more, preferably 80% or more, preferably 90% or more, preferably 95% or more); (ii) a g'(vis) of 0.90 or less (preferably 0.85 or less, preferably 0.80 or less); (iii) a bromine number which, upon complete hydrogenation, decreases by at least 50% (preferably at least 75%); (iv) optionally, an allyl chain end to internal vinylidene ratio of greater than 5:1 (preferably greater than 10:1); and (v) optionally, an allyl chain end to vinylidene chain end ratio of greater than greater than 10:1 preferably greater than 15:1).

In another embodiment, the vinyl terminated polyolefin useful herein is a branched polyolefin having an Mn of less than 7,500 g/mol, preferably from 100 to 7,500 g/mol (and optionally a Tm of greater than 60° C. (preferably greater than 100° C.), and/or, optionally, a ΔHf of greater than 7 J/g (preferably greater than 50 J/g)) comprising one or more alpha olefins (preferably ethylene and or propylene and optionally a $C_4$ to $C_{10}$ alpha olefin), and having: (i) 50 mol % or greater allyl chain ends, relative to total unsaturated chain ends (preferably 60% or more, preferably 70% or more, preferably 80% or more, preferably 90% or more, preferably 95% or more); (ii) a ratio of percentage of saturated chain ends to percentage of allyl chain ends of 1.2 to 2.0 (preferably a ratio of percentage of saturated chain ends (preferably isobutyl chain ends) to percentage of allyl chain ends of 1.6 to 1.8, wherein the percentage of saturated chain ends is determined using $^{13}$C NMR as described in WO 2009/155471 at paragraph [0095] and [0096] except that the spectra are referenced to the chemical shift of the solvent, tetrachloroethane-$d_2$; and/or a ratio of Mn(GPC)/Mn($^1$H NMR) of 0.95 or less (preferably 0.90 or less, preferably 0.85 or less, preferably 0.80 or less); (iii) optionally, a bromine number which, upon complete hydrogenation, decreases by at least 50% (preferably by at least 75%); (iv) optionally, an allyl chain end to internal vinylidene ratio of greater than 5:1 (preferably greater than 10:1); and (v) optionally, an allyl chain end to vinylidene chain end ratio of greater than greater than 2:1 (preferably greater than 10:1), preferably the branched vinyl terminated polyolefin has a ratio of Mn(GPC)/Mn($^1$H NMR) of 0.95 or less (preferably 0.90 or less, preferably 0.85 or less, preferably 0.80 or less).

$C_4$ to $C_{10}$ alpha olefin monomers useful in the branched polymers described above include butene, pentene, hexene, heptene, octene, nonene, decene, cyclopentene, cycloheptene, cyclooctene, and isomers thereof.

For more information on useful branched polymers and methods to produce them, please see concurrently filed U.S. Ser. No. 61/467,681, filed Mar. 25, 2011, entitled "Branched Vinyl Terminated Polymers and Methods for Production Thereof".

Particularly useful vinyl terminated polyolefins may be isotactic, highly isotactic, syndiotactic, or highly syndiotactic propylene polymer, particularly isotactic polypropylene. As used herein, "isotactic" is defined as having at least 10% isotactic pentads, preferably having at least 40% isotactic pentads of methyl groups derived from propylene according to analysis by $^{13}$C-NMR. As used herein, "highly isotactic" is defined as having at least 60% isotactic pentads according to analysis by $^{13}$C-NMR. In a desirable embodiment, PO, and/or PO* and/or the vinyl terminated polyolefins used to produce PO and PO* have at least 85% isotacticity. As used herein, "syndiotactic" is defined as having at least 10% syndiotactic pentads, preferably at least 40%, according to analysis by $^{13}$C-NMR. As used herein, "highly syndiotactic" is defined as having at least 60% syndiotactic pentads according to analysis by $^{13}$C-NMR. In another embodiment, PO, and/or PO* and/or the vinyl terminated polyolefins used to produce PO and PO* have has at least 85% syndiotacticity.

Any of the vinyl terminated polyolefins described herein preferably have less than 1400 ppm aluminum, preferably less than 1000 ppm aluminum, preferably less than 500 ppm aluminum, preferably less than 100 ppm aluminum, preferably less than 50 ppm aluminum, preferably less than 20 ppm aluminum, preferably less than 5 ppm aluminum.

The cross-metathesis products disclosed herein have little or no reactive termini as shown by a ratio of 2.0 or greater for the intensity of the internal unsaturation peaks at about 128 to 132 ppm to the reactive termini peaks at about 114 and 137 ppm in the $^{13}$C NMR spectrum.

In a preferred embodiment, any vinyl terminated polyolefin described herein comprises less than 3 wt % of functional groups selected from hydroxide, aryls and substituted aryls, halogens, alkoxys, carboxylates, esters, acrylates, oxygen, nitrogen, and carboxyl, preferably less than 2 wt %, more preferably less than 1 wt %, more preferably less than 0.5 wt %, more preferably less than 0.1 wt %, more preferably O wt %, based upon the weight of the oligomer.

Preferred vinyl terminated polyolefins described herein may have an $M_n$ as determined by $^1$H NMR of 150 to 25,000 g/mole, 200 to 20,000 g/mol, preferably 250 to 15,000 g/mol, preferably 300 to 15,000 g/mol, preferably 400 to 12,000 g/mol, preferably 750 to 10,000 g/mol. Further, a desirable molecular weight range can be any combination of any upper molecular weight limit with any lower molecular weight limit described above. $M_n$ is determined according to the methods described below in the examples section.

Any vinyl terminated polyolefin described herein preferably has a glass transition temperature (Tg) of less than 0° C. or less (as determined by differential scanning calorimetry as described below), preferably −10° C. or less, more preferably −20° C. or less, more preferably −30° C. or less, more preferably −50° C. or less.

Any vinyl terminated polyolefin described herein preferably contains less than 80 wt % of $C_4$ olefin(s), (such as isobutylene n-butene, 2-butene, isobutylene, and butadiene), based upon the weight of the oligomer, preferably less than 10 wt %, preferably 5 wt %, preferably less than 4 wt %, preferably less than 3 wt %, preferably less than 2 wt %, preferably less than 1 wt %, preferably less than 0.5 wt %, preferably less than 0.25 wt % of $C_4$ olefin(s) based upon the weight of the polyolefin.

Alternately, any vinyl terminated polyolefin described herein preferably contains less than 20 wt % of $C_4$ or more olefin(s), (such as $C_4$ to $C_{30}$ olefins, typically such as $C_4$ to $C_{12}$ olefins, typically such as $C_4$, $C_6$, $C_8$, $C_{12}$, olefins, etc.), based upon the weight of the polyolefin, preferably less than 10 wt %, preferably 5 wt %, preferably less than 4 wt %, preferably less than 3 wt %, preferably less than 2 wt %, preferably less than 1 wt %, preferably less than 0.5 wt %, preferably less than 0.25 wt % of $C_4$ olefin(s) based upon the weight of the polyolefin, as determined by $^{13}$C NMR.

In another embodiment, any vinyl terminated polyolefin described herein comprises at least 50 wt % (preferably at least 75 wt %, preferably at least 90 wt %, based upon the weight of the oligomer composition) olefins having at least 36 carbon atoms (preferably at least 51 carbon atoms, preferably at least 102 carbon atoms) as measured by $^1$H NMR assuming one unsaturation per chain.

In another embodiment, any vinyl terminated polyolefin described herein comprises less than 20 wt % dimer and trimer (preferably less than 10 wt %, preferably less than 5 wt %, more preferably less than 2 wt %, based upon the weight of the oligomer composition), as measured by Gas Chromatography. Products are analyzed by gas chromatography (Agilent 6890N with auto-injector) using helium as a carrier gas at 38 cm/sec. A column having a length of 60 m (J & W Scientific DB-1, 60 m×0.25 mm I.D.×1.0 μm film thickness) packed with a flame ionization detector (FID), an Injector temperature of 250° C., and a Detector temperature of 250° C. are used. The sample was injected into the column in an oven at 70° C., then heated to 275° C. over 22 minutes (ramp rate 10° C./min to 100° C., 30° C./min to 275° C., hold). An internal standard, usually the monomer, is used to derive the amount of dimer or trimer product that is obtained. Yields of dimer and trimer product are calculated from the data recorded on the spectrometer. The amount of dimer or trimer product is calculated from the area under the relevant peak on the GC trace, relative to the internal standard.

In another embodiment, any vinyl terminated polyolefin described herein here contains less than 25 ppm hafnium, preferably less than 10 ppm hafnium, preferably less than 5 ppm hafnium based on the yield of polymer produced and the mass of catalyst employed.

In another embodiment, any vinyl terminated polyolefin described herein may have a melting point (DSC first melt) of from 60 to 130° C., alternately 50 to 100° C. In another embodiment, the polyolefins described herein have no detectable melting point by DSC following storage at ambient temperature (23° C.) for at least 48 hours.

Melting temperature ($T_m$) and glass transition temperature (Tg) are measured using Differential Scanning calorimetry (DSC) using commercially available equipment such as a TA Instruments 2920 DSC. Typically, 6 to 10 mg of the sample, that has been stored at room temperature for at least 48 hours, is sealed in an aluminum pan and loaded into the instrument at room temperature. The sample is equilibrated at 25° C., then it is cooled at a cooling rate of 10° C./min to −80° C. The sample is held at −80° C. for 5 min and then heated at a heating rate of 10° C./min to 25° C. The glass transition temperature is measured from the heating cycle. Alternatively, the sample is equilibrated at 25° C., then heated at a heating rate of 10° C./min to 150° C. The endothermic melting transition, if present, is analyzed for onset of transition and peak temperature. The melting temperatures reported are the peak melting temperatures from the first heat unless otherwise specified. For samples displaying multiple peaks, the melting point (or melting temperature) is defined to be the peak melting temperature (i.e., associated with the largest endothermic calorimetric response in that range of temperatures) from the DSC melting trace.

In another embodiment, any vinyl terminated polyolefin described herein is a liquid at 25° C.

Bromine number is determined by ASTM D 1159. ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, eds., Butterworth-Heinemann, Boston, Mass., 1992, pp. 633-644, is used to determine the amount of an element in a material.

In another embodiment, the vinyl terminated polymers described herein have a viscosity at 60° C. of greater than 1000 cP, greater than 12,000 cP, or greater than 100,000 cP. In other embodiments, the vinyl terminated polymers have a viscosity of less than 200,000 cP, less than 150,000 cP, or less than 100,000 cP. Viscosity is measured using a Brookfield Digital Viscometer.

In another embodiment, any of the vinyl terminated polyolefins described or useful herein have 3-alkyl vinyl end groups (where the alkyl is a $C_1$ to $C_{38}$ alkyl), also referred to as a "3-alkyl chain ends" or a "3-alkyl vinyl termination", represented by the formula:

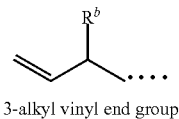

3-alkyl vinyl end group where "·····" represents the polyolefin chain and $R^b$ is a $C_1$ to $C_{38}$ alkyl group, preferably a $C_1$ to $C_{20}$ alkyl group, such as methyl, ethyl, propyl, butyl, pentyl, hexyl, heptyl, octyl, nonyl, decyl, undecyl, docecyl, and the like. The amount of 3-alkyl chain ends is determined using $^{13}C$ NMR as set out below.

In a preferred embodiment, any of the vinyl terminated polyolefins described or useful herein have at least 5% 3-alkyl chain ends (preferably at least 10% 3-alkyl chain ends, at least 20% 3-alkyl chain ends, at least 30% 3-alkyl chain ends; at least 40% 3-alkyl chain ends, at least 50% 3-alkyl chain ends, at least 60% 3-alkyl chain ends, at least 70% 3-alkyl chain ends; at least 80% 3-alkyl chain ends, at least 90% 3-alkyl chain ends; at least 95% 3-alkyl chain ends), relative to total unsaturation.

In a preferred embodiment, any of the vinyl terminated polyolefins described or useful herein have at least 5% of 3-alkyl+allyl chain ends, (e.g., all 3-alkyl chain ends plus all allyl chain ends), preferably at least 10% 3-alkyl+allyl chain ends, at least 20% 3-alkyl+allyl chain ends, at least 30% 3-alkyl+allyl chain ends; at least 40% 3-alkyl+allyl chain ends, at least 50% 3-alkyl+allyl chain ends, at least 60% 3-alkyl+allyl chain ends, at least 70% 3-alkyl+allyl chain ends; at least 80%3-alkyl+allyl chain ends, at least 90% 3-alkyl+allyl chain ends; at least 95% 3-alkyl+allyl chain ends, relative to total unsaturation.

In another embodiment, the vinyl terminated polyolefins described herein have an Mw (measured as described below) of 1,000 to about 30,000 g/mol, alternately 2000 to 25,000 g/mol, alternately 3,000 to 20,000 g/mol and/or an Mz of about 1700 to about 150,000 g/mol, alternately 800 to 100,000 g/mol.

Mw, Mn, Mz, number of carbon atoms, and $g'_{vis}$ are determined by using a High Temperature Size Exclusion Chromatograph (either from Waters Corporation or Polymer Laboratories), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, pp. 6812-6820, (2001) and references therein. Three Polymer Laboratories PLgel 10 mm Mixed-B LS columns are used. The nominal flow rate is 0.5 $cm^3$/min, and the nominal injection volume is 300 µL. The various transfer lines, columns and differential refractometer (the DRI detector) are contained in an oven maintained at 145° C. Solvent for the experiment is prepared by dissolving 6 grams of butylated hydroxy toluene as an antioxidant in 4 liters of Aldrich reagent grade 1, 2, 4 trichlorobenzene (TCB). The TCB mixture is then filtered through a 0.7 µm glass pre-filter and subsequently through a 0.1 µm Teflon filter. The TCB is then degassed with an online degasser before entering the Size Exclusion Chromatograph. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 145° C. The injection concentration is from 0.75 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8 to 9 hours before injecting the first sample. The LS laser is turned on 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and λ=690 nm. For purposes of this invention and the claims thereto (dn/dc)=0.104 for propylene polymers, 0.098 for butene polymers and 0.1 otherwise. Units on parameters throughout this description of the SEC method are such that concentration is expressed in g/$cm^3$, molecular weight is expressed in g/mole, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient for purposes of this invention, $A_2$=0.0006 for propylene polymers, 0.0015 for butene polymers and 0.001 otherwise, (dn/dc)=0.104 for propylene polymers, 0.098 for butene polymers and 0.1 otherwise, P(θ) is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as:

$$g'vis = \frac{[\eta]_{avg}}{kM_v^\alpha}$$

where, for purpose of this invention and claims thereto, α=0.695 and k=0.000579 for linear ethylene polymers, α=0.705 k=0.000262 for linear propylene polymers, and α=0.695 and k=0.000181 for linear butene polymers. $M_v$ is the viscosity-average molecular weight based on molecular weights determined by LS analysis. See Macromolecules, 2001, 34, pp. 6812-6820 and Macromolecules, 2005, 38, pp. 7181-7183, for guidance on selecting a linear standard having similar molecular weight and comonomer content, and determining k coefficients and α exponents.

Molecular weight distribution (Mw/Mn—both by GPC-DRI) is determined by the method above. In some embodiments, the vinyl terminated polyolefins of this invention have an Mw/Mn (by GPC-DRI) of 1.5 to 20, alternately 1.7 to 10.

In another embodiment, this invention can be practiced with any vinyl containing materials, preferably with vinyl terminated materials (including vinyl terminated polymers, vinyl terminated polyolefins (such as vinyl terminated ethylene homo- and co-polymers, and vinyl terminated propylene homo- and co-polymers)). Many of these materials are known in the art and can be reacted using the processes described herein, e.g., contacting an alkene metathesis catalyst (as described herein), a cyclic hydrocarbyl monomer containing at least one internal double bond, and one or more vinyl terminated containing materials. Vinyl terminated polymers include homo- and co-polymers of heteroatom containing monomers, as well as polymers of olefin monomers only. (The term vinyl terminated polymers includes vinyl terminated oligomers.) Preferred vinyl terminated polyolefins include vinyl terminated isotactic polypropylene (preferably having a melting point of 100° C. or more, preferably 155° C. or more), polyethylene (preferably having a melting point of 100° C. or more, preferably 155° C. or more).

Process to Make Vinyl Terminated Oligomers

The vinyl terminated polyolefins described above are typically prepared in a homogeneous process, preferably a bulk process as described in WO 2009/155471, which is incorporated by reference herein. In a preferred embodiment, propylene and optional comonomers (such as ethylene) can be oligomerized by reacting a catalyst system (comprising metallocene compound(s), and one or more activators) with the olefins. Other additives may also be used, as desired, such as scavengers and/or hydrogen. Any conventional suspension, homogeneous bulk, solution, slurry, or high-pressure oligomerization process can be used. Such processes can be run in a batch, semi-batch, or continuous mode. Such processes and modes are well known in the art. Homogeneous polymerization processes are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 volume % or more.)

Alternately, no solvent or diluent is present or added in the reaction medium, (except for the small amounts used as the carrier for the catalyst system or other additives, or amounts typically found with the monomer; e.g., propane in propylene).

Monomers useful in the polymerization processes described herein to produce the vinyl terminated polyolefins include one or more (preferably two or more, three or more, four or more, and the like) of $C_2$ to $C_{40}$ (preferably $C_3$ to $C_{30}$, $C_4$ to $C_{20}$, or $C_5$ to $C_{12}$, preferably ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof).

In some embodiments, where butene is the comonomer, the butene source may be a mixed butene stream comprising various isomers of butene. The 1-butene monomers are expected to be preferentially consumed by the polymerization process. Use of such mixed butene streams will provide an economic benefit, as these mixed streams are often waste streams from refining processes, for example $C_4$ raffinate streams, and can therefore be substantially less expensive than pure 1-butene.

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof such as can be found commercially (Isopars); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, and 1-decene. Mixtures of the foregoing are also suitable. In a preferred embodiment, aliphatic hydrocarbon solvents are preferred, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably at 0.5 wt %, preferably at 0 wt % based upon the weight of the solvents.

In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

In a preferred embodiment, little or no scavenger is used in the process to produce the vinyl terminated polyolefin. Preferably, scavenger is present at zero mol %, alternately the scavenger is present at a molar ratio of scavenger metal to transition metal of less than 100:1, preferably less than 50:1, preferably less than 15:1, preferably less than 10:1.

In a preferred embodiment, hydrogen is present in the polymerization reactor at a partial pressure of 0.001 to 50 psig (0.007 to 345 kPa), preferably from 0.01 to 25 psig (0.07 to 172.4 kPa), more preferably 0.1 to 10 psig (0.7 to 68.95 kPa). It has been found that in the present systems, hydrogen can be used to provide increased activity without significantly impairing the catalyst's ability to produce allylic chain ends. Preferably, the catalyst activity (calculated as g/mmolcatalyst/hr) is at least 20% higher than the same reaction without hydrogen present, preferably at least 50% higher, preferably at least 100% higher.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$hr$^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kgP/molcat).

In an alternate embodiment, the activity of the catalyst is at least 50 g/mmol/hour, preferably 500 or more g/mmol/hour, preferably 5000 or more g/mmol/hr, preferably 50,000 or more g/mmol/hr. In an alternate embodiment, the conversion of olefin monomer is at least 10%, based upon polymer yield and the weight of the monomer entering the reaction zone, preferably 20% or more, preferably 30% or more, preferably 50% or more, preferably 80% or more.

In an alternate embodiment, the productivity at least 4500 g/mmol/hour, preferably 5000 or more g/mmol/hour, preferably 10,000 or more g/mmol/hr, preferably 50,000 or more g/mmol/hr. In an alternate embodiment, the productivity is at least 80,000 g/mmol/hr, preferably at least 150,000 g/mmol/hr, preferably at least 200,000 g/mmol/hr, preferably at least 250,000 g/mmol/hr, preferably at least 300,000 g/mmol/hr. In a preferred embodiment, the productivity of the process is at least 200 g of vinyl terminated polyolefin per mmol of catalyst per hour, preferably at least 5000 g/mmol/hour, preferably at least 10,000 g/mmol/hr, preferably at least 300,000 g/mmol/hr.

Preferred polymerizations can be run at typical temperatures and/or pressures, such as from 25 to 150° C., preferably 40 to 120° C., preferably 45 to 80° C., and preferably from 0.35 to 10 MPa, preferably from 0.45 to 6 MPa, preferably from 0.5 to 4 MPa.

In a typical polymerization, the residence time of the reaction is up to 60 minutes, preferably between 5 to 50 minutes, preferably 10 to 40 minutes.

In a preferred embodiment, little or no alumoxane is used in the process to produce the vinyl terminated polyolefins. Preferably, alumoxane is present at zero mol %, alternately the alumoxane is present at a molar ratio of aluminum to transition metal less than 500:1, preferably less than 300:1, preferably less than 100:1, preferably less than 1:1.

In an alternate embodiment, if an alumoxane is used to produce the vinyl terminated polyolefins then, the alumoxane has been treated to remove free alkyl aluminum compounds, particularly trimethyl aluminum.

Further, in a preferred embodiment, the activator used herein to produce the vinyl terminated polyolefins is bulky as defined herein and is discrete.

In a preferred embodiment, little or no scavenger (such as trialkyl aluminum) is used in the process to produce the vinyl terminated polyolefins. Preferably, scavenger is present at zero mol %, alternately the scavenger is present at a molar ratio of scavenger metal to transition metal of less than 100:1, preferably less than 50:1, preferably less than 15:1, preferably less than 10:1.

In a preferred embodiment, little or no scavenger is used in the process to produce the vinyl terminated polymers. Preferably, scavenger (such as tri alkyl aluminum) is present at zero mol %, alternately the scavenger is present at a molar ratio of scavenger metal to transition metal of less than 100:1, preferably less than 50:1, preferably less than 15:1, preferably less than 10:1.

In a preferred embodiment, the polymerization: 1) is conducted at temperatures of 0 to 300° C. (preferably 25 to 150° C., preferably 40 to 120° C., preferably 45 to 80° C.); 2) is conducted at a pressure of atmospheric pressure to 10 MPa (preferably 0.35 to 10 MPa, preferably from 0.45 to 6 MPa, preferably from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are present in the solvent at less than 1 wt %, preferably at 0.5 wt %, preferably at 0 wt % based upon the weight of the solvents); 4) wherein the catalyst system used in the polymerization comprises less than 0.5 mol %, preferably O mol % alumoxane, alternately the alumoxane is present at a molar ratio of aluminum to transition metal less than 500:1, preferably less than 300:1, preferably less than 100:1, preferably less than 1:1); 5) the polymerization occurs in one reaction zone; 6) the productivity of the catalyst compound is at least 80,000 g/mmol/hr (preferably at least 150,000 g/mmol/hr, preferably at least 200,000 g/mmol/hr, preferably at least 250,000 g/mmol/hr, preferably at least 300,000 g/mmol/hr); 7) optionally, scavengers (such as trialkyl aluminum compounds) are absent (e.g., present at zero mol %, alternately the scavenger is present at a molar ratio of scavenger metal to transition metal of less than 100:1, preferably less than 50:1, preferably less than 15:1, preferably less than 10:1); and 8) optionally, hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In preferred embodiments, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is 23° C. unless otherwise noted.

Catalyst Compound/Systems to Make Vinyl Terminated Polyolefins

A "catalyst system" is combination of at least one catalyst compound, at least one activator, an optional co-activator, and an optional support material, where the system can polymerize monomers to polymer. For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the metallocene catalyst may be described as a catalyst precursor, a pre-catalyst compound, or a transition metal compound, and these terms are used interchangeably. An "anionic ligand" is a negatively charged ligand which donates one or more pairs of electrons to a metal ion. A "neutral donor ligand" is a neutrally charged ligand which donates one or more pairs of electrons to a metal ion.

A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties. This includes other π-bound moieties such as indenyls or fluorenyls or derivatives thereof.

Catalyst compounds useful herein to produce the vinyl terminated polyolefins include one or more metallocene compound(s) represented by the formulae:

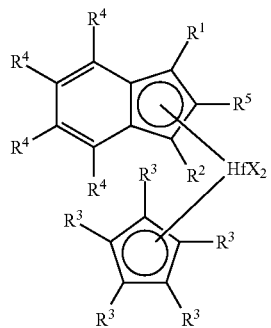

I

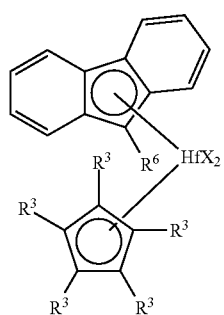

II

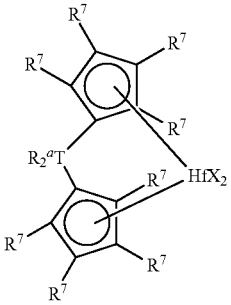

III

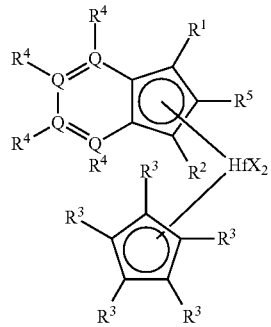

IV where:
Hf is hafnium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, preferably methyl, ethyl, propyl, butyl, phenyl, benzyl, chloride, bromide, iodide, (alternately two X's may form a part of a fused ring or a ring system);
each Q is, independently carbon or a heteroatom, preferably C, N, P, S (preferably at least one Q is a heteroatom, alternately at least two Q's are the same or different heteroatoms, alternately at least three Q's are the same or different heteroatoms, alternately at least four Q's are the same or different heteroatoms);
each $R^1$ is, independently, hydrogen or a $C_1$ to $C_8$ alkyl group, preferably a $C_1$ to $C_8$ linear alkyl group, preferably methyl ethyl, propyl, butyl, pentyl, hexyl, heptyl, or octyl, $R^1$ may the same or different as $R^2$;
each $R^2$ is, independently, hydrogen or a $C_1$ to $C_8$ alkyl group, preferably a $C_1$ to $C_8$ linear alkyl group, preferably methyl ethyl, propyl, butyl, pentyl, hexyl, heptyl, or octyl, provided that at least one of $R^1$ or $R^2$ is not hydrogen, preferably both of $R^1$ and $R^2$ are not hydrogen, preferably $R^1$ and/or $R^2$ are not branched;
each $R^3$ is, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided, however, that at least three $R^3$ groups are not hydrogen (alternately four $R^3$ groups are not hydrogen, alternately five $R^3$ groups are not hydrogen);
{Alternately, when the catalyst compound is to used to make the homo-polymer then each $R^3$ is, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided however that: 1) all five $R^3$ groups are methyl; or 2) four $R^3$ groups are not hydrogen and at least one $R^3$ group is a $C_2$ to $C_8$ substituted or unsubstituted hydrocarbyl (preferably at least two, three, four, or five $R^3$ groups are a $C_2$ to $C_8$ substituted or unsubstituted hydrocarbyl)};

each $R^4$ is, independently, hydrogen or a substituted or unsubstituted hydrocarbyl group, a heteroatom or heteroatom containing group, preferably a substituted or unsubstituted hydrocarbyl group having from 1 to 20 carbon atoms, preferably 1 to 8 carbon atoms, preferably a substituted or unsubstituted $C_1$ to $C_8$ linear alkyl group, preferably methyl ethyl, propyl, butyl, pentyl, hexyl, heptyl, octyl, substituted phenyl (such as propyl phenyl), phenyl, silyl, substituted silyl, (such as $CH_2SiR'$, where R' is a $C_1$ to $C_{12}$ hydrocarbyl, such as methyl, ethyl, propyl, butyl, phenyl);

$R^5$ is hydrogen or a $C_1$ to $C_8$ alkyl group, preferably a $C_1$ to $C_8$ linear alkyl group, preferably methyl, ethyl, propyl, butyl, pentyl, hexyl, heptyl, or octyl;

$R^6$ is hydrogen or a $C_1$ to $C_8$ alkyl group, preferably a $C_1$ to $C_8$ linear alkyl group, preferably methyl, ethyl, propyl, butyl, pentyl, hexyl, heptyl, or octyl;

each $R^7$ is, independently, hydrogen, or a $C_1$ to $C_8$ alkyl group, preferably a $C_1$ to $C_8$ linear alkyl group, preferably methyl ethyl, propyl, butyl, pentyl, hexyl, heptyl, or octyl, provided however that at least seven $R^7$ groups are not hydrogen, alternately at least eight $R^7$ groups are not hydrogen, alternately all $R^7$ groups are not hydrogen, (preferably the $R^7$ groups at the 3 and 4 positions on each Cp ring of Formula IV are not hydrogen);

N is nitrogen;

$R_2{}^aT$ is a bridge, preferably T is Si or Ge, preferably Si, and each $R^a$, is independently, hydrogen, halogen or a $C_1$ to $C_{20}$ hydrocarbyl, such as methyl, ethyl, propyl, butyl, pentyl, hexyl, heptyl, octyl, phenyl, benzyl, substituted phenyl, and two $R^a$ can form a cyclic structure including aromatic, partially saturated, or saturated cyclic or fused ring system; and further provided that any two adjacent R groups may form a fused ring or multicenter fused ring system where the rings may be aromatic, partially saturated or saturated.

In an alternate embodiment, at least one $R^4$ group is not hydrogen, alternately at least two $R^4$ groups are not hydrogen, alternately at least three $R^4$ groups are not hydrogen, alternately at least four $R^4$ groups are not hydrogen, alternately all $R^4$ groups are not hydrogen.

Catalyst compounds that are particularly useful in this invention include one or more of:
(1,3-Dimethylindenyl)(pentamethylcyclopentadienyl)hafniumdimethyl,
(1,3,4,7-Tetramethylindenyl)(pentamethylcyclopentadienyl) hafniumdimethyl,
(1,3-Dimethylindenyl)(tetramethylcyclopentadienyl)hafniumdimethyl,
(1,3-Diethylindenyl)(pentamethylcyclopentadienyl)hafniumdimethyl,
(1,3-Dipropylindenyl)(pentamethylcyclopentadienyl)hafniumdimethyl,
(1-Methyl,3-propylindenyl)(pentamethylcyclopentadienyl) hafniumdimethyl,
(1,3-Dimethylindenyl)(tetramethylpropylcyclopentadienyl) hafniumdimethyl,
(1,2,3-Trimethylindenyl)(pentamethylcyclopentadienyl) hafniumdimethyl,
(1,3-Dimethylbenzindenyl)(pentamethylcyclopentadienyl) hafniumdimethyl,
(2,7-Bis t-butylfluorenyl)(pentamethylcyclopentadienyl) hafniumdimethyl,
(9-Methylfluorenyl)(pentamethylcyclopentadienyl)hafniumdimethyl,
(2,7,9-Trimethylfluorenyl)(pentamethylcyclopentadienyl) hafniumdimethyl,
μ-Dihydrosilyl-bis(tetramethylcyclopentadienyl)hafniumdimethyl,
μ-Dimethylsilyl(tetramethylcyclopentadienyl)(3-propyltrimethylcyclopentadienyl)hafniumdimethyl,
μ-Dicyclopropylsilyl(bis tetramethylcyclopentadienyl) hafniumdimethyl, In an alternate embodiment, the "dimethyl" after the transition metal in the list of catalyst compounds above is replaced with a dihalide (such as dichloride, dibromide, or difluoride) or a bisphenoxide, particularly for use with an alumoxane activator.

Preferred activators useful with the above include: dimethylaniliniumtetrakis(pentafluorophenyl)borate, dimethylaniliniumtetrakis(heptafluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis (perfluorobiphenyl)borate, tropillium tetrakis (perfluorobiphenyl)borate, triphenylcarbenium tetrakis (perfluorobiphenyl)borate, triphenylphosphonium tetrakis (perfluorobiphenyl)borate, triethylsilylium tetrakis (perfluorobiphenyl)borate, benzene(diazonium)tetrakis (perfluorobiphenyl)borate, and [4-t-butyl-PhNMe$_2$H][($C_6F_3$($C_6F_5$)$_2$)$_4$B] (where Ph is phenyl and Me is methyl).

In another embodiment the vinyl terminated polyolefins useful here in may be produced using the catalyst compound represented by the formula:

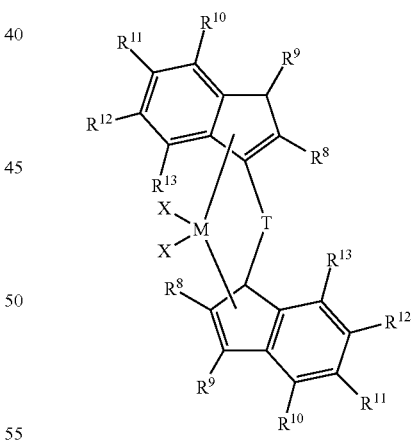

where M is hafnium or zirconium (preferably hafnium); each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system) (preferably each X is independently selected from halides and $C_1$ to $C_5$ alkyl groups, preferably each X is a methyl group); each $R^8$ is, independently, a $C_1$ to $C_{10}$ alkyl group (preferably methyl, ethyl, propyl, butyl, pentyl, hexyl, or isomers thereof, preferably each $R^8$ is a methyl group);

each $R^9$ is, independently, a $C_1$ to $C_{10}$ alkyl group (preferably methyl, ethyl, propyl, butyl, pentyl, hexyl, or isomers thereof, preferably each $R^9$ is a n-propyl group); each $R^{10}$ is hydrogen; each R11, $R12_5$ and $R^{13}$, is, independently, hydrogen or a substituted or unsubstituted hydrocarbyl group, a heteroatom or heteroatom containing group (preferably hydrogen); T is a bridging group (preferably T is dialkyl silicon or dialkyl germanium, preferably T is dimethyl silicon); and further provided that any of adjacent $R^{11}$, $R^{12}$, and $R^{13}$ groups may form a fused ring or multicenter fused ring system where the rings may be aromatic, partially saturated or saturated. For further information on such catalyst compounds and their use to make vinyl terminated macromers, please see concurrently filed U.S. Ser. No. 13/072,280, filed Mar. 25, 2011, entitled "Novel Catalysts and Methods of Use Thereof to Produce Vinyl Terminated Polymers".

Catalyst compounds that are particularly useful in this invention include one or more of:

rac-dimethylsilyl bis(2-methyl,3-propylindenyl)hafniumdimethyl,
rac-dimethylsilyl bis(2-methyl,3-propylindenyl)zirconiumdimethyl,
rac-dimethylsilyl bis(2-ethyl,3-propylindenyl)hafniumdimethyl,
rac-dimethylsilyl bis(2-ethyl,3-propylindenyl)zirconiumdimethyl,
rac-dimethylsilyl bis(2-methyl,3-ethylindenyl)hafniumdimethyl,
rac-dimethylsilyl bis(2-methyl,3-ethylindenyl)zirconiumdimethyl,
rac-dimethylsilyl bis(2-methyl,3-isopropylindenyl)hafniumdimethyl,
rac-dimethylsilyl bis(2-methyl,3-isopropylindenyl)zirconiumdimethyl,
rac-dimethylsilyl bis(2-methyl,3-butyllindenyl)hafniumdimethyl,
rac-dimethylsilyl bis(2-methyl,3-butyllindenyl)zirconiumdimethyl,
rac-dimethylgermanyl bis(2-methyl,3-propylindenyl)hafniumdimethyl,
rac-dimethylgermanyl bis(2-methyl,3-propylindenyl)zirconiumdimethyl,
rac-dimethylgermanyl bis(2-ethyl,3-propylindenyl)hafniumdimethyl,
rac-dimethylgermanyl bis(2-ethyl,3-propylindenyl)zirconiumdimethyl,
rac-dimethylgermanyl bis(2-methyl,3-ethylindenyl)hafniumdimethyl,
rac-dimethylgermanyl bis(2-methyl,3-ethylindenyl)zirconiumdimethyl,
rac-dimethylgermanyl bis(2-methyl,3-isopropylindenyl)hafniumdimethyl,
rac-dimethylgermanyl bis(2-methyl,3-isopropylindenyl)zirconiumdimethyl,
rac-dimethylgermanyl bis(2-methyl,3-butyllindenyl)hafniumdimethyl,
rac-dimethylgermanyl bis(2-methyl,3-propylindenyl)zirconiumdimethyl,
rac-dimethylsilyl bis(2-propyl,3-methylindenyl)hafniumdimethyl,
rac-dimethylsilyl bis(2-propyl,3-methylindenyl)zirconiumdimethyl,
rac-dimethylsilyl bis(2-propyl,3-ethylindenyl)hafniumdimethyl,
rac-dimethylsilyl bis(2-propyl,3-ethylindenyl)zirconiumdimethyl,
rac-dimethylsilylbis(2-propyl,3-butylindenyl)hafniumdimethyl,
rac-dimethylsilylbis(2-propyl,3-butylindenyl)zirconiumdimethyl,
rac-dimethylsilyl bis(2-methyl,3-butylindenyl)hafniumdimethyl,
rac-dimethylsilyl bis(2-methyl,3-butylindenyl)zirconiumdimethyl,
rac-dimethylsilyl bis(2,3-dimethyl)hafniumdimethyl,
rac-dimethylsilyl bis(2,3-dimethyl)zirconiumdimethyl,
rac-dimethylgermanyl bis(2-propyl,3-methylindenyl)hafniumdimethyl,
rac-dimethylgermanyl bis(2-propyl,3-methylindenyl)zirconiumdimethyl,
rac-dimethylgermanyl bis(2-propyl,3-ethylindenyl)hafniumdimethyl,
rac-dimethylgermanyl bis(2-propyl,3-ethylindenyl)zirconiumdimethyl,
rac-dimethylgermanyl bis(2-propyl,3-butylindenyl)hafniumdimethyl,
rac-dimethylgermanyl bis(2-propyl,3-butylindenyl)zirconiumdimethyl,
rac-dimethylgermanyl bis(2-methyl,3-butylindenyl)hafniumdimethyl,
rac-dimethylgermanyl bis(2-methyl,3-butylindenyl)zirconiumdimethyl,
rac-dimethylgermanyl bis(2,3-dimethyl)hafniumdimethyl, and
rac-dimethylgermanyl bis(2,3-dimethyl)zirconiumdimethyl.

In an alternate embodiment, the "dimethyl" after the transition metal in the list of catalyst compounds above is replaced with a dihalide (such as dichloride or difluoride) or a bisphenoxide, particularly for use with an alumoxane activator.

In particular embodiments, the catalyst compound is rac-dimethylsilylbis(2-methyl,3-propylindenyl)hafniumdimethyl or dichloride, or rac-dimethylsilylbis(2-methyl,3-propylindenyl)zirconiumdimethyl or dichloride.

Preferred activators useful with the above include: dimethylaniliniumtetrakis(pentafluorophenyl)borate, dimethylaniliniumtetrakis(heptafluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl) ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, and [4-t-butyl-PhNMe$_2$H][(C$_6$F$_3$(C$_6$F$_5$)$_2$)$_4$B] (where Ph is phenyl and Me is methyl).

Preferred combinations of catalyst and activator include: N,N-dimethylanilinium tetrakis(perfluorobiphenyl)borate and rac-dimethylsilylbis(2-methyl,3-propylindenyl)hafniumdimethyl, or rac-dimethylsilylbis(2-methyl,3-propylindenyl)zirconiumdimethyl.

In another embodiment, the vinyl terminated polyolefins useful here in may be produced using the catalyst compound represented by the formula:

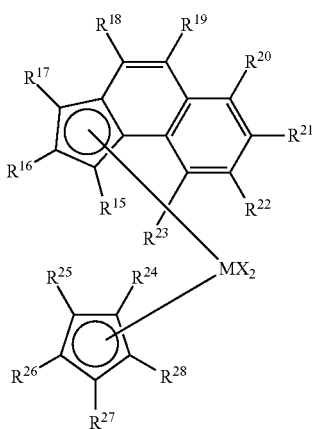

wherein M is hafnium or zirconium; each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof; each $R^{15}$ and $R^{17}$ are, independently, a $C_1$ to $C_8$ alkyl group (preferably a $C_1$ to $C_8$ linear alkyl group, preferably methyl ethyl, propyl, butyl, pentyl, hexyl, heptyl, or octyl); and each $R^{16}$, $R^{18}$, $R^{19}$, $R^{20}$, $R^{21}$, $R^{22}$, $R^{23}$, $R^{24}$ $R^{25}$, $R^{26}$, $R^{27}$, and $R^{28}$ are, independently, hydrogen, or a substituted or unsubstituted hydrocarbyl group having from 1 to 8 carbon atoms (preferably 1 to 6 carbon atoms, preferably a substituted or unsubstituted $C_1$ to $C_8$ linear alkyl group, preferably methyl ethyl, propyl, butyl, pentyl, hexyl, heptyl, octyl). In a preferred embodiment, at least three of $R^{24}$-$R^{28}$ groups are not hydrogen (alternately four of $R^{24}$-$R^{28}$ groups are not hydrogen, alternately five of $R^{24}$-$R^{28}$ groups are not hydrogen). In a preferred embodiment, all five groups of $R^{24}$-$R^{28}$ are methyl. In a preferred embodiment, four of the $R^{24}$-$R^{28}$ groups are not hydrogen and at least one of the $R^{24}$-$R^{28}$ groups is a $C_2$ to $C_8$ substituted or unsubstituted hydrocarbyl (preferably at least two, three, four, or five of $R^{24}$-$R^{28}$ groups are a $C_2$ to $C_8$ substituted or unsubstituted hydrocarbyl). In another preferred embodiment, $R^{15}$ and $R^{17}$ are methyl groups, $R^{16}$ is a hydrogen, $R^{18}$-$R^{23}$ are all hydrogens, $R^{24}$-$R^{28}$ are all methyl groups, and each X is a methyl group. For further information on such catalyst compounds and their use to make vinyl terminated macromers, please see concurrently filed U.S. Ser. No. 13/072,279, filed Mar. 25, 2011, entitled "Enhanced Catalyst Performance for Production of Vinyl Terminated Propylene and Ethylene/Propylene Macromere."

Catalyst compounds that are particularly useful in this invention include (CpMe$_5$)(1,3-Me$_2$-benz[e]indenyl)HfMe$_2$, (CpMe$_5$)(1-methyl-3-n-propylbenz[e]indenyl)HfMe$_2$, (CpMe$_5$)(1-n-propyl,3-methylbenz[e]indenyl)HfMe$_2$, (CpMe$_5$)(1-methyl-3-n-butylbenz[e]indenyl)HfMe$_2$, (CpMe$_5$)(1-n-butyl,3-methylbenz[e]indenyl)HfMe$_2$, (CpMe$_5$)(1-ethyl,3-methylbenz[e]indenyl)HfMe$_2$, (CpMe$_5$)(1-methyl, 3-ethylbenz[e]indenyl)HfMe$_2$, (CpMe$_4$n-propyl)(1,3-Me$_2$-benz[e]indenyl)HfMe$_2$, (CpMe$_4$-n-propyl)(1-methyl-3-n-propylbenz[e]indenyl)HfMe$_2$, (CpMe$_4$-n-propyl)(1-n-propyl,3-methylbenz[e]indenyl)HfMe$_2$, (CpMe$_4$-n-propyl)(1-methyl-3-n-butylbenz[e]indenyl)HfMe$_2$, (CpMe$_4$-n-propyl)(1-n-butyl,3-methylbenz[e]indenyl)HfMe$_2$, (CpMe$_4$-n-propyl)(1-ethyl,3-methylbenz[e]indenyl)HfMe$_2$, (CpMe$_4$-n-propyl)(1-methyl, 3-ethylbenz[e]indenyl)HfMe$_2$, (CpMe$_4$n-butyl)(1,3-Me$_2$-benz[e]indenyl)HfMe$_2$, (CpMe$_4$n-butyl)(1-methyl-3-n-propylbenz[e]indenyl)HfMe$_2$, (CpMe$_4$n-butyl)(1-n-propyl,3-methylbenz[e]indenyl)HfMe$_2$, (CpMe$_4$n-butyl)(1-methyl-3-n-butylbenz[e]indenyl)HfMe$_2$, (CpMe$_4$n-butyl)(1-n-butyl,3-methylbenz[e]indenyl)HfMe$_2$, (CpMe$_4$n-butyl)(1-ethyl,3-methylbenz[e]indenyl)HfMe$_2$, (CpMe$_4$n-butyl)(1-methyl,3-ethylbenz[e]indenyl)HfMe$_2$, and the zirconium analogs thereof.

In an alternate embodiment, the "dimethyl" (Me$_2$) after the transition metal in the list of catalyst compounds above is replaced with a dihalide (such as dichloride or difluoride) or a bisphenoxide, particularly for use with an alumoxane activator.

Other activators useful with the above catalysts include: dimethylaniliniumtetrakis(pentafluorophenyl)borate, dimethylaniliniumtetrakis(heptafluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-diethylanilinium tetrakis(perfluorobiphenyl)borate, N,N-dimethyl-(2,4,6-trimethylanilinium)tetrakis (perfluorobiphenyl)borate, tropillium tetrakis (perfluorobiphenyl)borate, triphenylcarbenium tetrakis (perfluorobiphenyl)borate, triphenylphosphonium tetrakis (perfluorobiphenyl)borate, triethylsilylium tetrakis (perfluorobiphenyl)borate, benzene(diazonium)tetrakis (perfluorobiphenyl)borate, and [4-t-butyl-PhNMe$_2$H][(C$_6$F$_3$(C$_6$F$_5$)$_2$)$_4$B].

In a preferred embodiment, the branched polymers described herein may be produced as described in concurrently filed U.S. Ser. No. 61/467,681, filed Mar. 25, 2011, entitled "Branched Vinyl Terminated Polymers and Methods for Production Thereof".

With regard to the above catalyst compounds, the term "substituted" means that a hydrogen group has been replaced with a hydrocarbyl group, a heteroatom or a heteroatom containing group. For example, methyl cyclopentadiene (Cp) is a Cp group substituted with a methyl group and ethyl alcohol is an ethyl group substituted with an —OH group.

Activators and Activation Methods for Catalyst Compounds to Make Vinyl Terminated Polymers The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract one reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally polymeric compounds containing —Al(R$^1$)—O— subunits, where R$^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator at a 5000-fold molar excess Al/M over the catalyst precursor (per metal catalytic site). The minimum activator-to-catalyst-precursor is a 1:1 molar ratio. Alternate preferred ranges include up to 500:1, alternately up to 200:1, alternately up to 100:1 alternately from 1:1 to 50:1.

In a preferred embodiment, little or no alumoxane is used in the process to produce the vinyl terminated polyolefin. Preferably, alumoxane is present at zero mol %, alternately the alumoxane is present at a molar ratio of aluminum to transition metal less than 500:1, preferably less than 300:1, preferably less than 100:1, preferably less than 1:1.

In an alternate embodiment, if an alumoxane is used to produce the VTM's then, the alumoxane has been treated to remove free alkyl aluminum compounds, particularly trimethyl aluminum.

Further, in a preferred embodiment, the activator used herein to produce the vinyl terminated polyolefin is bulky as defined herein and is discrete.

Aluminum alkyl or organoaluminum compounds which may be utilized as co-activators (or scavengers) include trimethylaluminum, triethylaluminum, triisobutylaluminum, tri-n-hexylaluminum, tri-n-octylaluminum, and the like.

Ionizing Activators

It is within the scope of this invention to use an ionizing or stoichiometric activator, neutral or ionic non-coordinating anion (as defined in U.S. Ser. No. 12/143,663, filed on Jun. 20, 2008), such as tri (n-butyl)ammonium tetrakis (pentafluorophenyl)borate, a tris perfluorophenyl boron metalloid precursor or a tris perfluoronapthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators. Preferably the activator is N,N-dimethylanilinium tetrakis(perfluoronapthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetrakis (perfluorophenyl)borate. For additional activators useful herein, please see U.S. Ser. No. 12/143,663, filed on Jun. 20, 2008.

In another embodiment, the activator is a bulky activator represented by the formula:

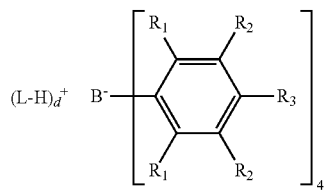

where:

each $R_1$ is, independently, a halide, preferably a fluoride;

each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group);

each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);

L is an neutral Lewis base;

$(L-H)^+$ is a Bronsted acid;

d is 1, 2, or 3;

wherein the anion has a molecular weight of greater than 1020 g/mol; and wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
| --- | --- |
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

Exemplary bulky substituents of activators suitable herein and their respective scaled volumes and molecular volumes are shown in the table below. The dashed bonds indicate binding to boron, as in the general formula above.

| Activator | Structure of boron substituents | Molecular Formula of each substituent | $V_S$ | MV Per subst. (Å³) | Total MV (Å³) |
|---|---|---|---|---|---|
| Dimethylanilinium tetrakis(perfluoronaphthyl)borate | [perfluoronaphthyl]₄ | $C_{10}F_7$ | 34 | 261 | 1044 |
| Dimethylanilinium tetrakis(perfluorobiphenyl)borate | [perfluorobiphenyl]₄ | $C_{12}F_9$ | 42 | 349 | 1396 |
| [4-t-butyl-PhNMe₂H][(C₆F₃(C₆F₅)₂)₄B] | [C₆F₃(C₆F₅)₂]₄ | $C_{18}F_{13}$ | 62 | 515 | 2060 |

Exemplary bulky activators useful in catalyst systems herein include: trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, [4-t-butyl-PhNMe₂H][(C₆F₃(C₆F₅)₂)₄B], and the types disclosed in U.S. Pat. No. 7,297,653.

The typical activator-to-catalyst-precursor ratio is a 1:1 molar ratio for non-alumoxane activators. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

Activator Combinations

It is within the scope of this invention that catalyst compounds can be combined with one or more activators or activation methods described above. For example, a combination of activators have been described in U.S. Pat. Nos. 5,153,157; 5,453,410; European publication EP 0 573 120 B1; PCT publications WO 94/07928; and WO 95/14044. These documents all discuss the use of an alumoxane in combination with an ionizing activator.

Support Materials

In embodiments herein, the catalyst system may comprise an inert support material. Preferably the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in metallocene catalyst systems herein include Groups 2, 4, 13, and 14 metal oxides such as silica, alumina and mixtures thereof. Other inorganic oxides that may be employed either alone or in combination with the silica, or alumina are magnesia, titania, zirconia, and the like. Other suitable support materials, however, can be employed, for example, finely divided functionalized polyolefins such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 μm. More preferably, the surface area of the support material is in the range of from about 50 to about 500 $m^2/g$, pore volume of from about 0.5 to about 3.5 cc/g and average particle size of from about 10 to about 200 μm. Most preferably the surface area of the support material is in the range is from about 100 to about 400 $m^2/g$, pore volume from about 0.8 to about 3.0 cc/g and average particle size is from about 5 to about 100 μm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 $m^2/gm$; pore volume of 1.65 $cm^3/gm$), examples of which are marketed under the tradenames of DAVISON 952 or DAVISON 955 by the Davison Chemical Division of W.R. Grace and Company. In other embodiments, DAVIDSON 948 is used.

The support material should be dry, that is, free of absorbed water. Drying of the support material can be effected by heating or calcining at about 100° C. to about 1000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce the catalyst system of this invention. The calcined support material is then contacted with at least one polymerization catalyst comprising at least one metallocene compound and an activator.

Methods of Making the Supported Catalyst Systems

The support material, having reactive surface groups, typically hydroxyl groups, is slurried in a non-polar solvent and the resulting slurry is contacted with a solution of a metallocene compound and an activator. The slurry of the support material in the solvent is prepared by introducing the support material into the solvent, and heating the mixture to about 0 to about 70° C., preferably to about 25 to about 60° C., preferably at room temperature. Contact times typically range from about 0.5 hours to about 24 hours, from about 0.5 hours to about 8 hours, or from about 0.5 hours to about 4 hours.

Suitable non-polar solvents are materials in which all of the reactants used herein, i.e., the activator, and the metallocene compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene and ethylbenzene, may also be employed.

In embodiments herein, the support material is contacted with a solution of a metallocene compound and an activator, such that the reactive groups on the support material are titrated, to form a supported polymerization catalyst. The period of time for contact between the metallocene compound, the activator, and the support material is as long as is necessary to titrate the reactive groups on the support material. To "titrate" is meant to react with available reactive groups on the surface of the support material, thereby reducing the surface hydroxyl groups by at least 80%, at least 90%, at least 95%, or at least 98%. The surface reactive group concentration may be determined based on the calcining temperature and the type of support material used. The support material calcining temperature affects the number of surface reactive groups on the support material available to react with the metallocene compound and an activator: the higher the drying temperature, the lower the number of sites. For example, where the support material is silica which, prior to the use thereof in the first catalyst system synthesis step, is dehydrated by fluidizing it with nitrogen and heating at about 600° C. for about 16 hours, a surface hydroxyl group concentration of about 0.7 millimoles per gram (mmols/gm) is typically achieved. Thus, the exact molar ratio of the activator to the surface reactive groups on the carrier will vary. Preferably, this is determined on a case-by-case basis to assure that only so much of the activator is added to the solution as will be deposited onto the support material without leaving excess of the activator in the solution.

The amount of the activator which will be deposited onto the support material without leaving excess in the solution can be determined in any conventional manner, e.g., by adding the activator to the slurry of the carrier in the solvent, while stirring the slurry, until the activator is detected as a solution in the solvent by any technique known in the art, such as by $^1H$ NMR. For example, for the silica support material heated at about 600° C., the amount of the activator added to the slurry is such that the molar ratio of B to the hydroxyl groups (OH) on the silica is about 0.5:1 to about 4:1, preferably about 0.8:1 to about 3:1, more preferably about 0.9:1 to about 2:1 and most preferably about 1:1. The amount of boron on the silica may be determined by using ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, Eds., Butterworth-Heinemann, Boston, Mass., 1992, pp. 633-644. In another embodiment, it is also possible to add such an amount of activator which is in excess of that which will be deposited onto the support, and then remove, e.g., by filtration and washing, any excess of the activator.

The following paragraphs provide for various aspects of the present invention.

1. A composition comprising a multiblock polyolefin represented by the formula:

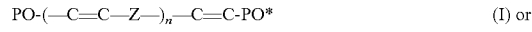

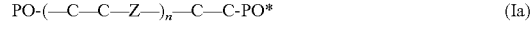

wherein Z is the portion of a cyclic monomer having at least one internal double bond that remains after a ring-opening metathesis reaction, preferably Z is a $C_1$ to $C_{18}$ hydrocarbyl or substituted hydrocarbyl, preferably a $C_1$ to $C_{12}$ hydrocarbyl or substituted hydrocarbyl, preferably a $C_1$ to $C_{10}$ hydrocarbyl or substituted hydrocarbyl (preferably the substituent on the substituted hydrocarbyl is a $C_1$ to $C_5$ hydrocarbyl or a $C_1$ to $C_5$ substituted hydrocarbyl (such as methyl, ethyl, propyl, butyl, pentyl, or an isomer thereof), a halogen (such as Br, Cl, I, or F), or an ether (such as an alkyl ether or an aryl ether, where the alkyl is a $C_1$ to $C_{20}$ alkyl group and the aryl is a $C_6$ to $C_{20}$ aryl group, preferably methyl ether, ethyl ether, methyl ethyl ether, butyl ether, propyl ether, and the like);

PO and PO* are polyolefins, preferably PO and PO* are each, independently, a substituted or unsubstituted hydrocarbyl group having 9 to 10,000 carbon atoms (preferably 20 to 7500 carbon atoms, preferably 30 to 4000, preferably from 40 to 2000), preferably at least one of PO and PO* has from 20 to 10,000 carbon atoms, preferably 30 to 2000; and n is 1 to about 10,000, in particular from about 10 to about 7500, more particularly from about 50 to about 5000 and in one aspect from about 100 to about 2000.

2. The composition of paragraph 1, wherein at least one of PO and PO* are $C_{20}$ to $C_{10,000}$.

3. The composition of either paragraph 1 or 2, wherein the multiblock polyolefin has an internal unsaturation as shown by the $^{13}C$ NMR a peak at between about 128 and about 132 ppm.

4. The composition of any of paragraphs 1 through 3, wherein PO* is PO or PO is PO*.

5. The composition of any of paragraphs 1 to 4, wherein the multiblock polyolefin is a mixture of:

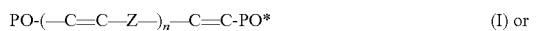

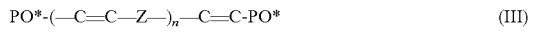

where PO, PO*, n, and Z are as defined in paragraph 1, preferably, the mixture of I, II, and III comprises about 30% to about 70% of multiblock polyolefin (I), about 1% to about 30% of multiblock polyolefin (II), and about 1% to about 30% multiblock polyolefin (III).

6. The composition of any of paragraphs 1 to 4, wherein the multiblock polyolefin is a mixture of:

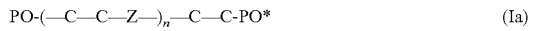

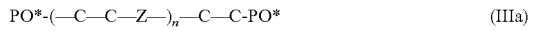

where PO, PO*, n, and Z are as defined in paragraph 1, preferably, the mixture of Ia, IIa, and IIIa comprises about 30% to about 70% of multiblock polyolefin (Ia), about 1% to about 30% of multiblock polyolefin (IIa), and about 1% to about 30% multiblock polyolefin (IIIa).

7. The composition of any of paragraphs 1 through 6, wherein the multiblock polyolefin has a Mn of 200 to 200,000 g/mol, preferably from 400 to 20,000 g/mol, preferably 300 to 1500 g/mol.

8. The composition of any of paragraphs 1 through 7, wherein PO is a polypropylene and has a Mn of about 300 to about 20,000 g/mol, preferably PO* is also is a polypropylene and has a Mn of about 300 to about 20,000 g/mol.

9. The composition of any of paragraphs 1 through 7, wherein PO is an ethylene/propylene copolymer of a Mn of about 300 to about 20,000 g/mol, preferably PO* is also an ethylene/propylene copolymer of a Mn of about 300 to about 20,000 g/mol.

10. The composition of any of paragraphs 1 through 7, wherein PO is a polypropylene and has a Mn of 200 to 200,000 g/mol, preferably from 400 to 20,000 g/mol, preferably 300 to 1500 g/mol, preferably about 300 to about 20,000 g/mol and PO* is also an ethylene/propylene copolymer of a Mn of 200 to 200,000 g/mol, preferably from 400 to 20,000 g/mol, preferably 300 to 1500 g/mol, preferably about 300 to about 20,000 g/mol.

11. The composition of any of paragraphs 1 through 10, wherein at least one of the substituted or unsubstituted hydrocarbyl groups of PO and PO* contain from about 2 to about 18 carbon atoms.

12. The composition of any of paragraphs 1 through 11, wherein the Mn of the multiblock polyolefin is from about 300 to about 40,000 g/mol.

13. The composition of any of paragraphs 1 through 17, wherein the PO and the PO* comprise about 15 wt % to about 95 wt % ethylene, preferably about 30 wt % to about 95 wt % ethylene.

14. The composition of any of paragraphs 1 through 13, wherein the multiblock polyolefin is a liquid at 25° C.

15. The composition of any of paragraphs 1 through 13, wherein the multiblock polyolefin has a viscosity at 60° C. of greater than 1000 cP, greater than 12,000 cP, or greater than 100,000 cP, and less than 200,000 cP, less than 150,000 cP, or less than 100,000 cP.

16. A process to prepare a multiblock polyolefin of any of paragraphs 1 to 15 comprising the step of: contacting an alkene metathesis catalyst with a dimer represented by the formula PO-C=C—PO* and a cyclic hydrocarbyl monomer comprising at least one internal double bond, wherein PO and PO* are polyolefins, preferably PO and PO* are each, independently, a substituted or unsubstituted hydrocarbyl group having 9 to 10,000 carbon atoms (preferably 20 to 7500 carbon atoms, preferably 30 to 4000, preferably from 40 to 2000), preferably at least one of PO and PO* has from 20 to 10,000 carbon atoms, preferably 30 to 2000, and preferably the cyclic hydrocarbyl monomer is a $C_3$ to $C_{20}$ hydrocarbyl or substituted hydrocarbyl, preferably a $C_3$ to $C_{14}$ hydrocarbyl or substituted hydrocarbyl, preferably a $C_3$ to $C_{12}$ hydrocarbyl or substituted hydrocarbyl (preferably the substituent on the substituted hydrocarbyl is a $C_1$ to $C_5$ hydrocarbyl or a $C_1$ to $C_5$ substituted hydrocarbyl (such as methyl, ethyl, propyl, butyl, pentyl, or an isomer thereof), a halogen (such as Br, Cl, I, or F), or an ether (such as an alkyl ether or an aryl ether, where the alkyl is a $C_1$ to $C_{20}$ alkyl group and the aryl is a $C_6$ to $C_{20}$ aryl group, preferably methyl ether, ethyl ether, methyl ethyl ether, butyl ether, propyl ether, and the like).

17. The process of paragraph 16, wherein the alkene metathesis catalyst is represented by the Formula (IA):

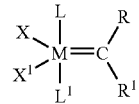

Formula (IA)

where:

M is a Group 8 metal;

X and $X^1$ are, independently, any anionic ligand, or X and $X^1$ may be joined to form a dianionic group and may form single ring of up to 30 non-hydrogen atoms or a multinuclear ring system of up to 30 non-hydrogen atoms;

L and $L^1$ are neutral two electron donors, L and $L^1$ may be joined to form a single ring of up to 30 non-hydrogen atoms or a multinuclear ring system of up to 30 non-hydrogen atoms;

L and X may be joined to form a bidentate monoanionic group and may form single ring of up to 30 non-hydrogen atoms or a multinuclear ring system of up to 30 non-hydrogen atoms;

L¹ and X¹ may be joined to form a multidentate monoanionic group and may form single ring of up to 30 non-hydrogen atoms or a multinuclear ring system of up to 30 non-hydrogen atoms;

R and R¹ are, independently, hydrogen or $C_1$ to $C_{30}$ substituted or unsubstituted hydrocarbyl;

R¹ and L¹ or X¹ may be joined to form single ring of up to 30 non-hydrogen atoms or a multinuclear ring system of up to 30 non-hydrogen atoms; and R and L or X may be joined to form single ring of up to 30 non-hydrogen atoms or a multinuclear ring system of up to 30 non-hydrogen atoms.

18. The process of paragraph 17, wherein:

M is Ru or Os;

X and X¹ are, independently, a halogen, an alkoxide or a triflate, or X and X¹ may be joined to form a dianionic group and may form single ring of up to 30 non-hydrogen atoms or a multinuclear ring system of up to 30 non-hydrogen atoms;

L and L¹ are, independently, a phosphine or a N-heterocyclic carbene, L and L¹ may be joined to form a single ring of up to 30 non-hydrogen atoms or a multinuclear ring system, of up to 30 non-hydrogen atoms;

L and X may be joined to form a multidentate monoanionic group and may form single ring of up to 30 non-hydrogen atoms or a multinuclear ring system of up to 30 non-hydrogen atoms;

L¹ and X¹ may be joined to form a multidentate monoanionic group and may form single ring of up to 30 non-hydrogen atoms or a multinuclear ring system of up to 30 non-hydrogen atoms;

R and R¹ are, independently, hydrogen or a $C_1$ to $C_{30}$ substituted or unsubstituted alkyl or a substituted or unsubstituted $C_4$ to $C_{30}$ aryl;

R¹ and L¹ or X¹ may be joined to form single ring of up to 30 non-hydrogen atoms or a multinuclear ring system of up to 30 non-hydrogen atoms; and R and L or X may be joined to form single ring of up to 30 non-hydrogen atoms or a multinuclear ring system of up to 30 non-hydrogen atoms.

19. The process of any of paragraphs 16 or 17, wherein the alkene metathesis catalyst is one or more of: tricyclohexylphosphine[1,3-bis(2,4,6-trimethylphenyl)imidazol-2-ylidene][3-phenyl-1H-inden-1-ylidene]ruthenium(II) dichloride, tricyclohexylphosphine [3-phenyl-1H-inden-1-yliden][1,3-bis(2,4,6-trimethylphenyl)-4,5-dihydroimidazol-2-ylidene]ruthenium(II)dichloride, tricyclohexylphosphine[1,3-bis(2,4,6-trimethylphenyl)-4,5-dihydroimidazol-2-ylidene][(phenylthio)methylene]ruthenium(II)dichloride, bis(tricyclohexylphosphine)-3-phenyl-1H-inden-1-ylideneruthenium(II)dichloride, 1,3-Bis(2,4,6-trimethylphenyl)-4,5-dihydroimidazol-2-ylidene[2-(i-propoxy)-5-(N,N-dimethylaminosulfonyl)phenyl]methyleneruthenium(II)dichloride, and [1,3-Bis (2,4,6-trimethylphenyl)-2-imidazolidinylidene]-[2-[[(4-methylphenyl)imino]methyl]-4-nitrophenolyl]-[3-phenyl-1H-inden-1-ylidene]ruthenium(II)chloride, benzylidene-bis(tricyclohexylphosphine)dichlororuthenium, benzylidene[1,3-bis(2,4,6-trimethylphenyl)-2-imidazolidinylidene]dichloro(tricyclohexylphosphine)ruthenium, dichloro(o-isopropoxyphenylmethylene)(tricyclohexylphosphine)ruthenium(II), (1,3-Bis-(2,4,6-trimethylphenyl)-2-imidazolidinylidene)dichloro(o-isopropoxyphenylmethylene)ruthenium, 1,3-Bis(2-methylphenyl)-2-imidazolidinylidene]dichloro(2-isopropoxyphenylmethylene)ruthenium(II), [1,3-Bis(2,4, 6-trimethylphenyl)-2-imidazolidinylidene]dichloro[3-(2-pyridinyl)propylidene]ruthenium(II), [1,3-Bis(2-methylphenyl)-2-imidazolidinylidene]dichloro(phenylmethylene) (tricyclohexylphosphine)ruthenium(II), [1,3-Bis(2,4,6-trimethylphenyl)-2-imidazolidinylidene]dichloro(3-methyl-2-butenylidene)(tricyclohexylphosphine) ruthenium(II), and [1,3-Bis(2,4,6-trimethylphenyl)-2-imidazolidinylidene]dichloro(benzylidene)bis(3-bromopyridine)ruthenium(II).

20. The process of any of paragraphs 16 to 19, wherein the cyclic hydrocarbyl monomer comprising at least one internal double bond comprises one or more of cyclopropene, cyclobutene, cyclopentene, cyclohexene, methylcyclohexene, cycloheptene, cyclooctadiene, cyclooctene, norbornadiene, norbornene, cyclobutadiene, cyclohexadiene, cycloheptadiene, cyclooctatetraene, 1,5-cyclooctadiene, 1,5-dimethyl-1,5-cyclooctadiene, dicyclopentadiene, and isomers thereof.

EXAMPLES

Tests and Materials

Products were characterized by ¹H NMR and DSC as follows:

¹H NMR

¹H NMR data was collected at either room temperature or 120° C. (for purposes of the claims, 120° C. shall be used) in a 5 mm probe using a Varian spectrometer with a ¹Hydrogen frequency of at least 400 MHz. Data was recorded using a maximum pulse width of 45°, 8 seconds between pulses and signal averaging 120 transients. Spectral signals were integrated and the number of unsaturation types per 1000 carbons was calculated by multiplying the different groups by 1000 and dividing the result by the total number of carbons.

¹³C NMR

¹³C NMR data was collected at either room temperature or 120° C. in a 10 mm probe using a Varian spectrometer with a ¹Hydrogen frequency of at least 400 MHz. A 90 degree pulse, an acquisition time adjusted to give a digital resolution between 0.1 and 0.12 Hz, at least a 10 second pulse acquisition delay time with continuous broadband proton decoupling using swept square wave modulation without gating was employed during the entire acquisition period. The spectra were acquired using time averaging to provide a signal to noise level adequate to measure the signals of interest. Samples were dissolved in tetrachloroethane-$d_2$ at concentrations between 10 wt % to 15 wt % prior to being inserted into the spectrometer magnet. Prior to data analysis spectra were referenced by setting the chemical shift of the (—CH$_2$—)$_n$ signal where n>6 to 29.9 ppm. Internal sites of unsaturation for quantization were identified using the signals at about 128 to about 132 ppm for internal unsaturation sites and at about 114 and 137 ppm for reactive termini peaks in the ¹³C NMR spectrum.

Polypropylene microstructure is determined by ¹³C NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso and "r" to racemic. Samples are dissolved in d$_2$-1,1,2,2-tetrachloroethane, and spectra recorded at 125° C. using a 100 MHz (or higher) NMR spectrometer. Polymer resonance peaks are referenced to mmmm=21.8 ppm. Calculations involved in the characterization of polymers by NMR are described by F. A. Bovey in POLYMER CONFORMATION AND CONFIGURATION (Academic Press, New York 1969) and J. Randall in POLYMER SEQUENCE DETERMINATION, $^{13}$C NMR METHOD (Academic Press, New York, 1977).

The "propylene tacticity index", expressed herein as [m/r], is calculated as defined in H. N. Cheng, *Macromolecules*, 17, pg. 1950 (1984). When [m/r] is 0 to less than 1.0, the polymer is generally described as syndiotactic, when [m/r] is 1.0 the polymer is atactic, and when [m/r] is greater than 1.0 the polymer is generally described as isotactic.

GPC

To determine various molecular weight related values by GPC, high temperature size exclusion chromatography was performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388; each of which is fully incorporated herein by reference for US purposes. This apparatus has a series of three 30 cm×7.5 mm linear columns, each containing PLgel 10 um, Mix B. The GPC system was calibrated using polystyrene standards ranging from 580-3,390,000 g/mol. The system was operated at an eluent flow rate of 2.0 mL/min and an oven temperature of 165° C. 1,2,4-trichlorobenzene was used as the eluent. The polymer samples were dissolved in 1,2,4-trichlorobenzene at a concentration of 0.1-0.9 mg/mL. 250 uL of a polymer solution was injected into the system. The concentration of the polymer in the eluent was monitored using an evaporative light scattering detector. The molecular weights presented are relative to linear polystyrene standards.

DSC

Differential Scanning calorimetry (DSC) measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./min and then cooled at a rate of 50° C./min. Melting points were collected during the heating period. The ratio of 1-octene to ethylene incorporated in the polymers (weight %) was determined by rapid FT-IR spectroscopy on a Bruker Equinox 55+ IR in reflection mode. Samples were prepared in a thin film format by evaporative deposition techniques. Weight percent 1-octene was obtained from the ratio of peak heights at 1378 and 4322 cm$^{-1}$. This method was calibrated using a set of ethylene/1-octene copolymers with a range of known wt % 1-octene content.

All molecular weights are number average unless otherwise noted. All Molecular weights are reported in g/mol.

The following abbreviations are used in the Examples: Catalyst Zhan 1B is 1,3-Bis(2,4,6-trimethylphenyl)-4,5-dihydroimidazol-2-ylidene[2-(1-propoxy)-5-(N,N-dimethylaminosulfonyl)phenyl]methyleneruthenium(II)dichloride (Strem Chemicals, catalog #44-0082) and Catalyst Neolyst M2 is tricyclohexylphosphine[3-phenyl-1H-inden-1-ylidene][1,3-bis(2,4,6-trimethylphenyl)-4,5-dihydroimidazol-2-ylidene]ruthenium(II)dichloride (Strem Chemicals, catalog #44-7777), aPP is atactic polypropylene, iPP is isotactic polypropylene, EP is ethylene-propylene copolymer, TCE is 1,1,2,2-tetrachloroethane, h is hours, min is minutes, $M_n$ is the number average molecular weight as determined by $^1$H NMR spectroscopy by comparison of integrals of the aliphatic region to the olefin region as determined using the protocol described in the Experimental section of U.S. Ser. No. 12/143,663, filed on Jun. 20, 2008.

1,5-cyclooctadiene (1,5-COD) or 1,5-dimethyl-1,5-cyclooctadiene (1,5-Me$_2$-1,5-COD) were purchased from Sigma Aldrich. The vinyl-terminated iPP, vinyl-terminated EP, and vinyl-terminated aPP were prepared as described in WO 2009/155471.

EXAMPLES

Example 1

Production of Dimer

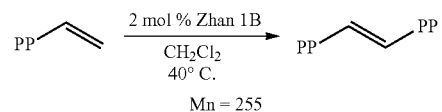

Mn = 255

In a glovebox a 20 mL vial with a stirbar was charged with vinyl-terminated polypropylene (1.0 g, M$_n$=255) prepared by the methods as described in WO 2009/155471. Methylene chloride (3 mL) was added and the mixture was heated to 40° C. Zhan 1B catalyst (17 mg) was added via spatula, and the resulting solution was stirred for 18 h at 40° C. The solution was cooled to ambient temperature, concentrated under a stream of N$_2$, removed from the glovebox, and triturated with MeOH until the oily solid was colorless. The atactic product was dried thoroughly in a vacuum oven. Yield 0.9 g.

Example 2

Production of Dimer

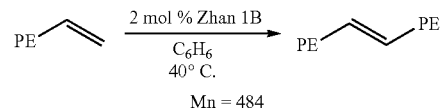

Mn = 484

In a glovebox a 20 mL vial, equipped with a stirbar, was charged with vinyl-terminated polyethylene (1.0 g, Mn=484) prepared by the methods as described in WO 2009/155471. Toluene (6 mL) was added and the mixture was heated to 55° C. Zhan 1B catalyst (30 mg) was added via spatula, and the resulting solution was stirred at 55° C. until $^1$H NMR indicated complete consumption of the vinyl resonances. The solution was cooled to ambient temperature, removed from the glovebox, and added dropwise to MeOH with stirring. The resulting white precipitate was collected by filtration through a course glass frit, and dried thoroughly in a vacuum oven. Yield 0.95 g.

Example 3

Production of Dimer

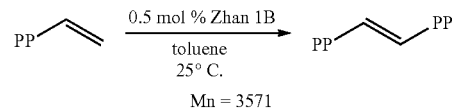

Mn = 3571

In a glovebox a 50 mL round-bottom flask, equipped with a stirbar, was charged with vinyl-terminated polypropylene (3.3 g, Mn=3571), toluene (10 mL). Zhan 1B catalyst (12 mg) was added as a solution in methylene chloride (0.5 mL). The resulting solution was stirred at room temperature until $^1$H NMR indicated complete consumption of the vinyl resonances. The solution was removed from the glovebox, and added dropwise to MeOH with stirring. The resulting white precipitate was collected by decanting, and dried thoroughly in a vacuum oven. Yield 9.8 g.

Example 4

Production of Dimer

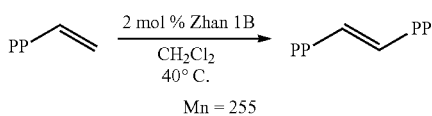

In a glovebox a 20 mL, equipped with a stirbar, vial was charged with vinyl-terminated polypropylene (1.0 g, $M_n$=255) prepared by the methods as described in WO 2009/155471. Methylene chloride (3 mL) was added and the mixture was heated to 40° C. Zhan 1B catalyst (17 mg) was added via spatula, and the resulting solution was stirred for 18 h at 40° C. The solution was cooled to ambient temperature, concentrated under a stream of $N_2$, removed from the glovebox, and triturated with MeOH until the oily solid was colorless. The atatic product was dried thoroughly in a vacuum oven. Yield 0.9 g.

Example 5

Production of Dimer

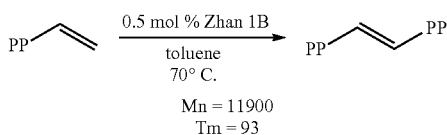

In a glovebox a 250 mL round-bottom flask, equipped with a stir bar, was charged with vinyl-terminated polypropylene (7.7 g, Mn=11,900, $T_m$=93° C.). Toluene (100 mL) was added and the mixture was heated to 70° C. Zhan 1B catalyst (2.4 mg) was added via spatula. A reflux condenser was attached, and the solution was stirred for 18 h at 70° C. The solution was removed from the glovebox, and added dropwise to MeOH with stirring. The resulting white precipitate was collected by filtration through a course glass frit, and dried thoroughly in a vacuum oven. Yield 7.5 g.

Ring Opening Metathesis Polymerization (ROMP) of Cyclooctadiene (COD) in the Presence of Dimers of Vinyl Terminated Polyolefins

Example 6

In a glovebox, test tubes outfitted with stir bars were charged with 1,5-cyclooctadiene (1,5-COD) (123 µL, 1000 µmol) or 1,5-dimethyl-1,5-cyclooctadiene (1,5-Me$_2$-1,5-COD) (157 µL, 1000 µmol). Various amounts of the vinyl-terminated polymer dimers from Examples 1-4 and toluene were added as indicated in Table 1. The test tubes were transferred to a metal block, which was heated to 55° C. Stirring was initiated, and the Zhan 1B catalyst (25 µL of a 0.04 M toluene solution) was added. Heating and stirring were continued for 18 h, during which some solvent loss occurred. Ethyl vinyl ether (0.1 mL) was added to quench any remaining active catalyst. The samples were dried in vacuo and then analyzed by GPC. Results are tabulated in Table 1.

Example 7

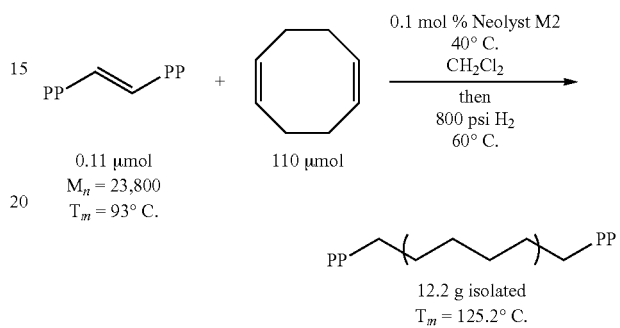

In a glovebox a 20 mL vial, equipped with a stir bar, was charged with cyclooctadiene (13.5 mL), the vinyl-terminated polypropylene dimer from Example 5 (2.62 g), CH$_2$Cl$_2$ (100 mL). The mixture was heated to 40° C. Neolyst M2 (105 mg) was dissolved in CH$_2$Cl$_2$ (2 mL) and added to the round-bottom flask. A reflux condenser was attached to the flask and the solution was stirred for 18 h. The solution was then transferred to a steel Parr reactor. MeOH (20 mL) and Et$_3$N (1 mL) were added to the solution, and the reactor was sealed and pressurized with 800 psi of H$_2$. The solution was heated to 80° C. until no vinyl resonances were detected by $^1$H NMR spectroscopy. The suspension was cooled to ambient temperature, and the solid was collected by filtration through a course glass frit, washed with MeOH, and dried thoroughly in a vacuum oven. Yield 12.2 g.

The product was fractionated into two components using preparative temperature rising elution fractionation (Prep-TREF). The component that eluted below 30° C. (34 area %) was shown to contain both polypropylene and polyethylene by $^1$H NMR spectroscopy. A second component with a peak elution temperature of 98° C. (66 area %) was shown by $^1$H NMR spectroscopy to contain only polyethylene. The polyethylene is presumed to be derived from ROMP of cyclooctadiene.

Example 8

In a glovebox a 20 Ml, equipped with a stir bar, vial was charged with cyclooctadiene (1.35 mL). Various amounts of the vinyl-terminated polymer dimers from Examples 3-4 and solvent were added, and the mixture has heated as indicated in Table 2. Neolyst M2 (11 mg) was dissolved in CH$_2$Cl$_2$ (0.1 mL) and added to the vial via pipette. The solution was stirred for 18 h. Ethyl vinyl ether (0.1 mL) was added to quench any remaining active catalyst, and the vial was removed from the glovebox. The mixture was added dropwise to stirring MeOH, and the precipitated polymer was collected by filtration.

The product was dried in vacuo, and transferred to a round-bottom flask in the glovebox. The flask was then charged with m-xylene (30 mL), p-toluenesulfonyl hydrazide (3.5 equiv per olefin), and triethylamine (3.5 equiv per olefin). A small amount of 2,6-di-tert-butylphenol (~10 mg) was added via spatula. The mixture was heated to 150-° C. until no vinyl resonances were detected by $^1$H NMR spectroscopy in removed aliquots. The suspension was cooled to ambient temperature, removed from the glovebox, and added dropwise to stirring acetone. The precipitated polymer was collected by filtration through a medium porosity glass frit, washed with MeOH, and dried thoroughly in a vacuum oven. Yields are shown in Table 2.

not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Austra-

TABLE 1

| Run | 1,5-COD (μL) | 1,5-Me$_2$-1,5-COD (μL) | VTP Dimer (Ex#) | VTP Dimer (mg) | Toluene (μL) | Yield (g) | Mw* | Mn* | Mw/Mn* |
|---|---|---|---|---|---|---|---|---|---|
| 1 | 123 | 0 | 1 | 0 | 852 | 0.1071 | 60063 | 28681 | 2.09 |
| 2 | 123 | 0 | 1 | 10 | 752 | 0.1130 | 27681 | 13070 | 2.12 |
| 3 | 123 | 0 | 1 | 20 | 652 | 0.1222 | 16624 | 8119 | 2.05 |
| 4 | 123 | 0 | 1 | 31 | 552 | 0.1267 | 4256 | 2706 | 1.57 |
| 5 | 123 | 0 | 1 | 41 | 452 | 0.1394 | 10788 | 5992 | 1.80 |
| 6 | 123 | 0 | 1 | 51 | 352 | 0.1575 | 8508 | 4899 | 1.74 |
| 7 | 0 | 157 | 2 | 0 | 818 | 0.1244 | 29590 | 10068 | 2.94 |
| 8 | 0 | 157 | 2 | 19 | 799 | 0.1518 | 27271 | 8408 | 3.24 |
| 9 | 0 | 157 | 2 | 39 | 780 | 0.1678 | 12630 | 6212 | 2.03 |
| 10 | 0 | 157 | 2 | 58 | 760 | 0.3333 | 17864 | 6327 | 2.82 |
| 11 | 0 | 157 | 2 | 77 | 741 | 0.2091 | 12902 | 5788 | 2.23 |
| 12 | 0 | 157 | 2 | 97 | 722 | 0.2354 | 8815 | 5209 | 1.69 |
| 13 | 0 | 157 | 1 | 0 | 818 | 0.1299 | 40166 | 13287 | 3.02 |
| 14 | 0 | 157 | 1 | 10 | 718 | 0.1334 | 21546 | 10039 | 2.15 |
| 15 | 0 | 157 | 1 | 20 | 618 | 0.1510 | 12169 | 6020 | 2.02 |
| 16 | 0 | 157 | 1 | 31 | 518 | 0.1640 | 9393 | 5076 | 1.85 |
| 17 | 0 | 157 | 1 | 41 | 418 | 0.1677 | 8428 | 4777 | 1.76 |
| 18 | 0 | 157 | 1 | 51 | 318 | 0.1816 | 7464 | 4438 | 1.68 |
| 19 | 2000 | 0 | 3 | 0 | 1705 | 0.1890 | 20193 | 8144 | 2.48 |
| 20 | 2000 | 0 | 3 | 28 | 1505 | 0.2172 | 13683 | 6498 | 2.11 |
| 21 | 2000 | 0 | 3 | 57 | 1305 | 0.2574 | 12731 | 5734 | 2.22 |
| 22 | 2000 | 0 | 3 | 85 | 1105 | 0.2911 | 12774 | 6295 | 2.03 |
| 23 | 2000 | 0 | 3 | 114 | 905 | 0.3413 | 14258 | 7526 | 1.89 |
| 24 | 2000 | 0 | 3 | 142 | 705 | 0.3851 | 14967 | 8310 | 1.80 |
| 25 | 2000 | 0 | 3 | 0 | 1705 | 0.1887 | 17462 | 7643 | 2.28 |
| 26 | 2000 | 0 | 3 | 28 | 1505 | 0.2224 | 11370 | 5286 | 2.15 |
| 27 | 2000 | 0 | 3 | 57 | 1305 | 0.2621 | 15280 | 7301 | 2.09 |
| 28 | 2000 | 0 | 3 | 85 | 1105 | 0.2989 | 17131 | 8949 | 1.91 |
| 29 | 2000 | 0 | 3 | 114 | 905 | 0.3667 | 16606 | 8867 | 1.87 |
| 30 | 2000 | 0 | 3 | 142 | 705 | 0.3808 | 15357 | 8565 | 1.79 |
| 31 | 2000 | 0 | 4 | 0 | 1705 | 0.1976 | 25552 | 10647 | 2.40 |
| 32 | 2000 | 0 | 4 | 38 | 1625 | 0.2156 | 25423 | 10088 | 2.52 |
| 33 | 2000 | 0 | 4 | 76 | 1545 | 0.2509 | 20857 | 5790 | 3.60 |
| 34 | 2000 | 0 | 4 | 114 | 1465 | 0.2624 | 34642 | 11010 | 3.15 |
| 35 | 2000 | 0 | 4 | 152 | 1385 | 0.2685 | 38125 | 21631 | 1.76 |
| 36 | 2000 | 0 | 4 | 190 | 1305 | 0.3204 | 40443 | 25750 | 1.57 |
| 37 | 2000 | 0 | 4 | 0 | 1705 | 0.1862 | 11860 | 5770 | 2.06 |
| 38 | 2000 | 0 | 4 | 38 | 1625 | 0.2165 | 35459 | 15990 | 2.22 |
| 39 | 2000 | 0 | 4 | 76 | 1545 | 0.2386 | 22791 | 8286 | 2.75 |
| 40 | 2000 | 0 | 4 | 114 | 1465 | 0.2688 | 21621 | 5567 | 3.88 |
| 41 | 2000 | 0 | 4 | 152 | 1385 | 0.2874 | 25637 | 6478 | 3.96 |
| 42 | 2000 | 0 | 4 | 190 | 1305 | 0.3196 | 41275 | 24260 | 1.70 |

*determined by GPC

TABLE 2

| Run | 1,5-COD (mL) | [1,5-COD] (M) | VTP Dimer (Example #) | VTP Dimer (mg) | Solvent | Solvent (mL) | Temp (° C.) | Yield (g) |
|---|---|---|---|---|---|---|---|---|
| 1 | 1.35 | 2.0 | 4 | 260 | CH$_2$Cl$_2$ | 5.5 | 40 | 0.78 |
| 2 | 1.35 | 2.0 | 4 | 260 | Toluene | 5.5 | 40 | 0.93 |
| 3 | 1.35 | 2.0 | 3 | 240 | Toluene | 5.5 | 40 | 0.88 |
| 4 | 1.35 | 0.5 | 4 | 260 | CH$_2$Cl$_2$ | 22.0 | 40 | 0.86 |
| 5 | 1.35 | 1.0 | 4 | 260 | CH$_2$Cl$_2$ | 11.0 | 40 | 1.15 |

All documents described herein are incorporated by reference herein for purposes of all jurisdictions where such practice is allowed, including any priority documents, related applications and/or testing procedures to the extent they are lian law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A composition comprising a multiblock polyolefin represented by the formula:

PO-(—C=C—Z—)$_n$—C=C-PO*  (I) or

PO-(—C—C—Z—)$_n$—C—C-PO*  (Ia)

wherein Z is the portion of a cyclic monomer having at least one internal double bond that remains after a ring-opening metathesis reaction; PO and PO* are each independently polyolefins; and n is 1 to 10,000.

2. The composition of claim 1, wherein at least one of PO and PO* are C$_{20}$ or greater.

3. The composition of claim 1, wherein at least one of PO and PO* is a substituted or unsubstituted hydrocarbyl group having 9 to 10,000 carbon atoms.

4. The composition of claim 1, wherein Z is a C$_1$ to C$_{18}$ hydrocarbyl or substituted hydrocarbyl.

5. The composition of claim 1, wherein the multiblock polyolefin of Formula (I) has been hydrogenated and is represented by Formula (Ia).

6. The composition of claim 1, wherein PO* is the same as PO.

7. The composition of claim 1, wherein PO is different from PO*.

8. The composition of claim 1, wherein the multiblock polyolefin is a mixture of:

PO-(—C=C—Z—)$_n$—C=C-PO*  (I),

PO-(—C=C—Z—)$_n$—C=C-PO  (II), and

PO*-(—C=C—Z—)$_n$—C=C-PO*  (III), wherein Z is the portion of a cyclic monomer having at least one internal double bond that remains after a ring-opening metathesis reaction; PO and PO* are each independently polyolefins; and n is 1 to 10,000.

9. The composition of claim 8, wherein the mixture of I, II, and III comprises about 30 wt % to about 70 wt % of multiblock polyolefin (I), about 1 wt % to about 30 wt % of multiblock polyolefin (II), and about 1 wt % to about 30 wt % multiblock polyolefin (III).

10. The composition of claim 1, wherein the multiblock polyolefin is a mixture of:

PO-(—C—C—Z—)$_n$—C—C-PO*  (Ia)

PO-(—C—C—Z—)$_n$—C—C-PO  (IIa), and

PO*-(—C—C—Z—)$_n$—C—C-PO*  (IIIa)

wherein Z is the portion of a cyclic monomer having at least one internal double bond that remains after a ring-opening metathesis reaction; PO and PO* are each independently polyolefins; and n is 1 to 10,000.

11. The composition of claim 10, wherein the mixture of Ia, IIa, and IIIa comprises about 30 wt % to about 70 wt % of multiblock polyolefin (Ia), about 1 wt % to about 30 wt % of multiblock polyolefin (IIa), and about 1 wt % to about 30 wt % multiblock polyolefin (IIIa).

12. The composition of claim 1, wherein the multiblock polyolefin (I) or (Ia) has a Mn of from 200 to 200,000 g/mol.

13. The composition of claim 1, wherein the multiblock polyolefin (I) or (Ia) has a Mn of from 300 to 20,000 g/mol.

14. The composition of claim 1, wherein the multiblock polyolefin (I) or (Ia) has a Mn of from 400 to 10,000 g/mol.

15. The composition of claim 1, wherein PO is a polypropylene and has an Mn of about 300 to about 20,000 g/mol.

16. The composition of claim 1, wherein PO is an ethylene/propylene copolymer and has an Mn of about 300 to about 20,000 g/mol.

17. The composition of claim 1 wherein the multiblock polyolefin has a viscosity at 60° C. of greater than 1000 cP and less than 200,000 cP.

18. The composition of claim 1 wherein the multiblock polyolefin has a bromine number less than 1.8.

19. The composition of claim 1 wherein PO and or PO* are isotactic.

20. A process to prepare a multiblock polyolefin represented by the formula:

PO-(—C=C—Z—)$_n$—C=C-PO*  (I) or

PO-(—C—C—Z—)$_n$—C—C-PO*  (Ia)

wherein Z is the portion of a cyclic monomer having at least one internal double bond that remains after a ring-opening metathesis reaction; PO and PO* are each independently polyolefins; and n is 1 to 10,000;

comprising contacting an alkene metathesis catalyst with a dimer of vinyl terminated polyolefins, and a cyclic hydrocarbyl monomer comprising at least one internal double bond.

21. The process of claim 20, wherein the PO and the PO* comprise about 15 wt % to about 95 wt % ethylene.

22. The process of claim 20, wherein the PO and the PO* comprise about 30 wt % to about 95 wt % ethylene.

23. The process of claim 20, wherein the Mn of the multiblock polyolefin is from about 200 to about 200,000 g/mol.

24. The process of claim 20, wherein the alkene metathesis catalyst is represented by the Formula (IA):

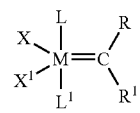

Formula (IA)

where:

M is a Group 8 metal;

X and X$^1$ are, independently, any anionic ligand, or X and X$^1$ may be joined to form a dianionic group and may form single ring of up to 30 non-hydrogen atoms or a multinuclear ring system of up to 30 non-hydrogen atoms;

L and L$^1$ are neutral two electron donors, L and L$^1$ may be joined to form a single ring of up to 30 non-hydrogen atoms or a multinuclear ring system of up to 30 non-hydrogen atoms;

L and X may be joined to form a bidentate monoanionic group and may form single ring of up to 30 non-hydrogen atoms or a multinuclear ring system of up to 30 non-hydrogen atoms;

L$^1$ and X$^1$ may be joined to form a multidentate monoanionic group and may form single ring of up to 30 non-hydrogen atoms or a multinuclear ring system of up to 30 non-hydrogen atoms;

R and R$^1$ are, independently, hydrogen or C$_1$ to C$_{30}$ substituted or unsubstituted hydrocarbyl;

R¹ and L¹ or X¹ may be joined to form single ring of up to 30 non-hydrogen atoms or a multinuclear ring system of up to 30 non-hydrogen atoms; and R and L or X may be joined to form single ring of up to 30 non-hydrogen atoms or a multinuclear ring system of up to 30 non-hydrogen atoms.

25. The process of claim 24, wherein:

M is Ru or Os;

X and X¹ are, independently, a halogen, an alkoxide or a triflate, or X and X¹ may be joined to form a dianionic group and may form single ring of up to 30 non-hydrogen atoms or a multinuclear ring system of up to 30 non-hydrogen atoms;

L and L¹ are, independently, a phosphine or a N-heterocyclic carbene, L and L¹ may be joined to form a single ring of up to 30 non-hydrogen atoms or a multinuclear ring system, of up to 30 non-hydrogen atoms;

L and X may be joined to form a multidentate monoanionic group and may form single ring of up to 30 non-hydrogen atoms or a multinuclear ring system of up to 30 non-hydrogen atoms;

L¹ and X¹ may be joined to form a multidentate monoanionic group and may form single ring of up to 30 non-hydrogen atoms or a multinuclear ring system of up to 30 non-hydrogen atoms;

R and R¹ are, independently, hydrogen or a $C_1$ to $C_{30}$ substituted or unsubstituted alkyl or a substituted or unsubstituted $C_4$ to $C_{30}$ aryl;

R¹ and L¹ or X¹ may be joined to form single ring of up to 30 non-hydrogen atoms or a multinuclear ring system of up to 30 non-hydrogen atoms; and R and L or X may be joined to form single ring of up to 30 non-hydrogen atoms or a multinuclear ring system of up to 30 non-hydrogen atoms.

26. The process of claim 20 wherein the alkene metathesis catalyst is one or more of:

tricyclohexylphosphine [1,3 -bis(2,4,6-trimethylphenyl) imidazol-2-ylidene][3 -phenyl-1H-inden-1-ylidene]ruthenium(II) dichloride, tricyclohexylphosphine[3-phenyl-1H-inden-1-ylidene][1,3-bis(2,4,6-trimethylphenyl)-4,5-dihydro-imidazol-2-ylidene] ruthenium(II) dichloride, tricyclohexylphosphine [1,3-bis(2,4,6-trimethylphenyl)-4,5-dihydroimidazol-2-ylidene][(phenylthio)methylene]ruthenium(II) dichloride, bis(tricyclohexylphosphine)-3-phenyl-1H-inden-1-ylideneruthenium(II) dichloride, 1,3-Bis(2,4,6-trimethylphenyl)-4,5-dihydroimidazol-2-ylidene[2-(i-propoxy)-5-(N,N-dimethylaminosulfonyl)phenyl] methyleneruthenium(II) dichloride, and [1,3-Bis(2,4,6-trimethylphenyl)-2-imidazolidinylidene]-[[(4-methylphenyl)imino]methyl]-4-nitrophenolyl]-[3-phenyl-1H-inden-1-yliden]ruthenium(II)chloride, benzylidene -bis(tricyclohexylphosphine)dichlororuthenium, benzylidene [1,3- bis(2,4,6-trimethylphenyl)-2-imidazolidinylidene]dichloro(tricyclohexylphosphine)ruthenium, dichloro(o -ispropoxyphenylmethylene)(tricyclohexylphosphine)ruthenium(II), (1,3-Bis-(2,4,6-trimethylphenyl)-2-imidazolidinylidene)dichloro(o-ispropoxyphenylmethylene)ruthenium, 1,3-Bis(2-methylphenyl)-2-imidazolidinylidene]dichloro(2-isopropoxyphenylmethylene) ruthenium(II), [1,3-Bis(2,4,6-trimethylphenyl)-2-imidazolidinylidene] dichloro[3-(2-pyridinyl)propylidene]ruthenium(II), [1,3-Bis(2-methylphenyl)-2-imidzolidinylidene] dichloro(phenylmethylene)(tricyclohexylphoine)ruthenium(II), [1,3-Bis(2,4,6-trimethylphenyl)-2-imidazolidinylidene]dichloro(3-methyl-2-butenylidene) (tricyclohexylphosphine)ruthenium(II), and [1,3-Bis(2, 4,6-trimethylphenyl)-2-imidazolidinylidene]dichloro (benzylidene)bis(3-bromopyridine)ruthenium(II).

27. The process of claim 20 wherein the dimer is represented by the formula:

PO-C=C-PO* wherein PO and PO* are each, independently, a substituted or unsubstituted hydrocarbyl group having 9 to 10,000 carbon atoms.

28. The process of claim 27 wherein PO and PO* each, independently, have 20 to 7500 carbon atoms.

29. The process of claim 20 wherein the cyclic hydrocarbyl monomer is a $C_3$ to $C_{20}$ hydrocarbyl or substituted hydrocarbyl.

30. The process of claim 20 wherein the cyclic hydrocarbyl monomer is a $C_3$ to $C_{20}$ hydrocarbyl or substituted hydrocarbyl, where the substituent on the substituted hydrocarbyl is a substituted or unsubstituted $C_1$ to $C_5$ hydrocarbyl, a halogen, an alkyl ether or an aryl ether.

31. The process of claim 20 wherein the cyclic hydrocarbyl monomer comprises one or more of cyclopropene, cyclobutene, cyclopentene, cyclohexene, methylcyclohexene, cycloheptene, cyclooctadiene, cyclooctene, norbornadiene, norbornene, cyclobutadiene, cyclohexadiene, cycloheptadiene, cyclooctatetraene, 1,5-cyclooctadiene, 1,5-dimethyl-1,5-cyclooctadiene, dicyclopentadiene, and isomers thereof.

32. The process of claim 20, further comprising producing the dimer from vinyl terminated polyolefins having at least 30% allyl chain ends.

33. The process of claim 20, further comprising producing the dimer from vinyl terminated polyolefins having at least 70% allyl chain ends.

34. The process of claim 20, further comprising producing the dimer from vinyl terminated polyolefins having at least 80% allyl chain ends.

35. The process of claim 20, further comprising producing the dimer from vinyl terminated polyolefins having at least 90% allyl chain ends.

36. The process of claim 20, further comprising hydrogenating the multiblock polyolefin of formula (I).

* * * * *